US010735721B2

(12) United States Patent
Abe et al.

(10) Patent No.: US 10,735,721 B2
(45) Date of Patent: Aug. 4, 2020

(54) ENCODER, DECODER, ENCODING METHOD, AND DECODING METHOD USING LOCAL ILLUMINATION COMPENSATION

(71) Applicant: Panasonic Intellectual Property Corporation of America, Torrance, CA (US)

(72) Inventors: Kiyofumi Abe, Osaka (JP); Takahiro Nishi, Nara (JP); Tadamasa Toma, Osaka (JP); Ryuichi Kanoh, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/387,007

(22) Filed: Apr. 17, 2019

(65) Prior Publication Data
US 2019/0320167 A1 Oct. 17, 2019

Related U.S. Application Data

(60) Provisional application No. 62/661,913, filed on Apr. 24, 2018, provisional application No. 62/659,435, (Continued)

(51) Int. Cl.
*H04N 19/176* (2014.01)
*H04N 19/159* (2014.01)
(Continued)

(52) U.S. Cl.
CPC ......... *H04N 19/105* (2014.11); *H04N 19/139* (2014.11); *H04N 19/154* (2014.11); (Continued)

(58) Field of Classification Search
CPC ...... H04N 19/119; H04N 19/51; H04N 19/50; G06T 2207/10024
See application file for complete search history.

(56) References Cited

U.S. PATENT DOCUMENTS

| 2013/0188076 A1* | 7/2013 | Okamura | H04N 5/262 |
| | | | 348/239 |
| 2015/0023422 A1* | 1/2015 | Zhang | H04N 19/51 |
| | | | 375/240.16 |

(Continued)

OTHER PUBLICATIONS

Liu et al., 3D-CE2.h : Results of Illumination Compensation for Inter-View Prediction, Joint Collaborative Team on 3D Video Coding Extension Development of ITU-T SG 16 WP 3 and ISO/IEC JTC 1/SC 29/WG 11 2nd Meeting:: Shanghai, CN, Oct. 13-19, 2012, Doc. JCT3V-B0045 (Year: 2012).*

(Continued)

*Primary Examiner* — Alison Slater
(74) *Attorney, Agent, or Firm* — Wenderoth, Lind & Ponack, L.L.P.

(57) ABSTRACT

An encoder includes circuitry and memory. Using the memory, the circuitry: generates a prediction image to be used to encode a current block to be processed; derives a luminance correction parameter by referring to an image region which is included in an image including the current block and is outside the current block; and corrects the prediction image to be used to encode the current block, using the luminance correction parameter. The luminance correction parameter is used in common between a plurality of blocks included in the image.

16 Claims, 43 Drawing Sheets

Related U.S. Application Data filed on Apr. 18, 2018, provisional application No. 62/658,866, filed on Apr. 17, 2018.

(51) Int. Cl.

| | | |
|---|---|---|
| *H04N 19/182* | (2014.01) | |
| *H04N 19/44* | (2014.01) | |
| *H04N 19/51* | (2014.01) | |
| *H04N 19/105* | (2014.01) | |
| *H04N 19/154* | (2014.01) | |
| *H04N 19/513* | (2014.01) | |
| *H04N 19/139* | (2014.01) | |
| *H04N 19/436* | (2014.01) | |
| *H04N 19/196* | (2014.01) | |

(52) U.S. Cl.
CPC ......... *H04N 19/176* (2014.11); *H04N 19/196* (2014.11); *H04N 19/436* (2014.11); *H04N 19/521* (2014.11)

(56) References Cited

U.S. PATENT DOCUMENTS

| | | | |
|---|---|---|---|
| 2017/0150186 A1* | 5/2017 | Zhang | H04N 19/82 |
| 2017/0263054 A1* | 9/2017 | Yamasaki | G06T 7/90 |
| 2017/0330498 A1* | 11/2017 | Orio | G09G 3/2003 |
| 2018/0098086 A1* | 4/2018 | Chuang | H04N 19/126 |
| 2018/0184085 A1* | 6/2018 | Yang | H04N 19/115 |
| 2018/0288425 A1* | 10/2018 | Panusopone | H04N 19/176 |
| 2019/0246133 A1* | 8/2019 | Lee | H04N 19/105 |
| 2019/0313113 A1* | 10/2019 | Lee | H04N 19/176 |

OTHER PUBLICATIONS

H.265 (ISO/IEC 23008-2 High efficiency video coding (HEVC)), Dec. 1, 2013, Sections 8.5.1 and 8.5.2, pp. 110-113.

* cited by examiner

FIG. 3

| TRANSFORM TYPE | BASIS FUNCTION $T_i(j)$, $i, j = 0, 1, ..., N - 1$ |
|---|---|
| DCT - II | $T_i(j) = \omega_0 \cdot \sqrt{\dfrac{2}{N}} \cdot \cos\left(\dfrac{\pi \cdot i \cdot (2j + 1)}{2N}\right)$<br>WHERE $\omega_0 = \begin{cases} \sqrt{\dfrac{2}{N}} & i = 0 \\ 1 & i \neq 0 \end{cases}$ |
| DCT - V | $T_i(j) = \omega_0 \cdot \omega_1 \cdot \sqrt{\dfrac{2}{2N - 1}} \cdot \cos\left(\dfrac{2\pi \cdot i \cdot j}{2N - 1}\right)$<br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT - VIII | $T_i(j) = \sqrt{\dfrac{4}{2N + 1}} \cdot \cos\left(\dfrac{\pi \cdot (2i + 1) \cdot (2j + 1)}{4N + 2}\right)$ |
| DST - I | $T_i(j) = \sqrt{\dfrac{2}{N + 1}} \cdot \sin\left(\dfrac{\pi \cdot (i + 1) \cdot (j + 1)}{N + 1}\right)$ |
| DST - VII | $T_i(j) = \sqrt{\dfrac{4}{2N + 1}} \cdot \sin\left(\dfrac{\pi \cdot (2i + 1) \cdot (j + 1)}{2N + 1}\right)$ |

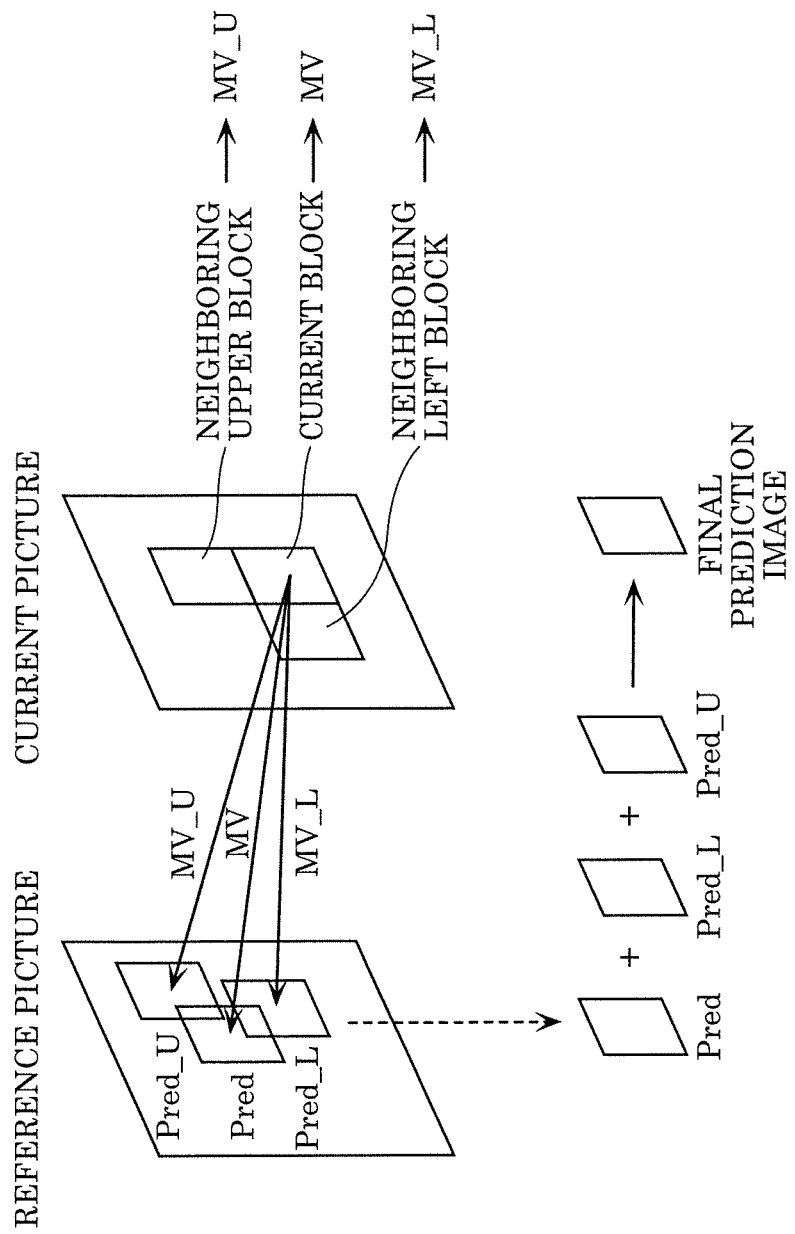

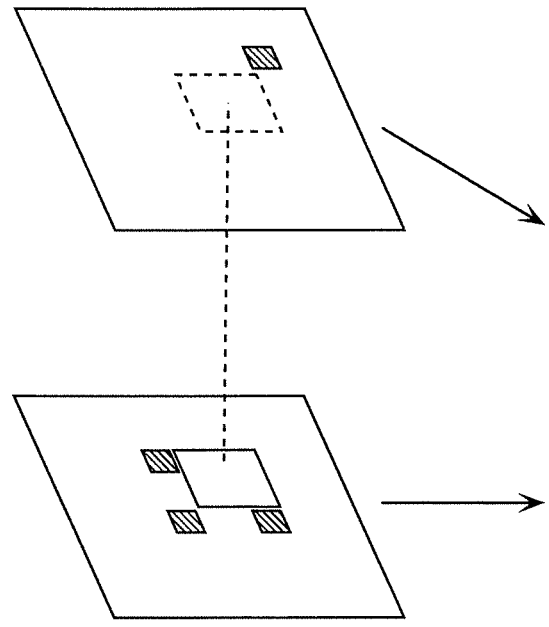

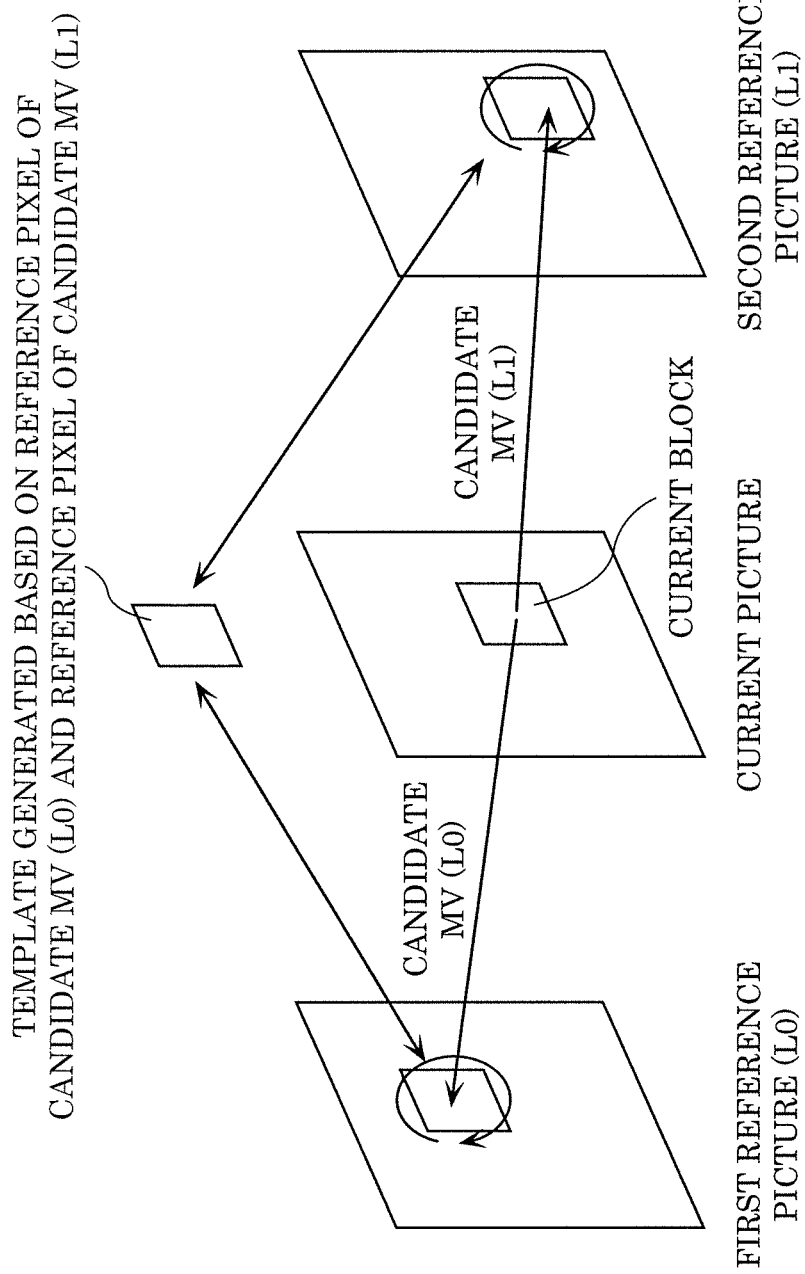

CURRENT CODING UNIT TO BE PROCESSED

CURRENT CODING UNIT TO BE PROCESSED

CURRENT CODING UNIT TO BE PROCESSED

CURRENT CODING UNIT TO BE PROCESSED

CURRENT CODING UNIT TO BE PROCESSED

CURRENT CODING UNIT TO BE PROCESSED

CURRENT CODING UNIT TO BE PROCESSED

CURRENT CODING UNIT TO BE PROCESSED

ENCODER, DECODER, ENCODING METHOD, AND DECODING METHOD
USING LOCAL ILLUMINATION
COMPENSATION

CROSS REFERENCE TO RELATED APPLICATION

The present application claims the benefit of the following U.S. Provisional Patent Application No. 62/658,866 filed Apr. 17, 2018; No. 62/659,435 filed Apr. 18, 2018; and No. 62/661,913 filed Apr. 24, 2018. The entire disclosures of the above-identified applications, including the specifications, drawings and claims are incorporated herein by reference in their entirety.

FIELD

The present disclosure relates to encoders, etc. for processing an image in units of a block.

BACKGROUND

As a standard for coding a moving picture, there has conventionally been H.265 that is also referred to as high efficiency video coding (HEVC) (Non-Patent Literature 1).

CITATION LIST

Non Patent Literature

[NPL 1] H.265 (ISO/IEC 23008-2 HEVC)/HEVC High Efficiency Video Coding)

SUMMARY

Technical Problem

However, enhancement in quality of an image may increase the coding amount delay the processing.

In view of this, non-limiting and exemplary embodiments provide encoders, etc. which make it possible to reduce the processing delay while reducing the coding amount.

Solution to Problem

An encoder according to an aspect of the present disclosure includes circuitry and memory. Using the memory, the circuitry generates a prediction image to be used to encode a current block to be processed; derives a luminance correction parameter by referring to an image region which is included in an image including the current block and is outside the current block; and corrects the prediction image to be used to encode the current block, using the luminance correction parameter. The luminance correction parameter is used in common between a plurality of blocks included in the image.

These general and specific aspects may be implemented using a system, a device, a method, an integrated circuit, a computer program, or a non-transitory computer-readable recording medium such as a CD-ROM, or any combination of systems, devices, methods, integrated circuits, computer programs, or computer-readable recording media.

Further benefits and advantageous effects provided by the disclosed embodiments are known from the Specification and the drawings. These benefits and advantageous effects may be provided by various embodiments and/or each of the features in the Specification and the drawings, and all of these benefits and advantageous effects do not always need to be provided.

Advantageous Effects

The encoder, etc. according to the aspect of the present disclosure make it possible to reduce the processing delay while reducing the coding amount.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type.

FIG. 5C is a conceptual diagram for illustrating an outline of a prediction image correction process performed via OBMC processing.

FIG. 9B is for illustrating an outline of a process for deriving a motion vector via merge mode.

FIG. 9C is a conceptual diagram for illustrating an outline of DMVR processing.

FIG. 18A is a schematic diagram indicating a first example regarding a process for determining that a processed surrounding coding unit located above a coding tree unit can be referred to.

FIG. 18B is a schematic diagram indicating a second example regarding a process for determining that a processed surrounding coding unit located above a coding tree unit can be referred to.

FIG. 19A is a schematic diagram indicating a first example regarding a process for determining that one of a left coding unit and an upper coding unit which succeeds the other in processing order cannot be referred to.

FIG. 19B is a schematic diagram indicating a second example regarding a process for determining that one of a left coding unit and an upper coding unit which succeeds the other in processing order cannot be referred to.

FIG. 20A is a schematic diagram indicating a first example regarding a process for determining that at least one left or upper coding unit including N coding units which immediately precede a current coding unit to be processed cannot be referred to.

FIG. 20B is a schematic diagram indicating a second example regarding a process for determining that at least one left or upper coding unit including N coding units which immediately precede a current coding unit to be processed cannot be referred to.

FIG. 20C is a schematic diagram indicating a third example regarding a process for determining that at least one left or upper coding unit including N coding units which immediately precede a current coding unit to be processed cannot be referred to.

FIG. 20D is a schematic diagram indicating a fourth example regarding a process for determining that at least one left or upper coding unit including N coding units which immediately precede a current coding unit to be processed cannot be referred to.

FIG. 21A is a schematic diagram indicating a first example regarding a process for determining that N coding units which immediately precede a current coding unit to be processed cannot be referred to, FIG. 21B is a schematic diagram indicating a second example regarding a process for determining that N coding units which immediately precede a current coding unit to be processed cannot be referred to.

FIG. 21C is a schematic diagram indicating a third example regarding a process for determining that N coding units which immediately precede a current coding unit to be processed cannot be referred to.

FIG. 21D is a schematic diagram indicating a fourth example regarding a process for determining that N coding units which immediately precede a current coding unit to be processed cannot be referred to.

DESCRIPTION OF EMBODIMENTS

Figure 1:
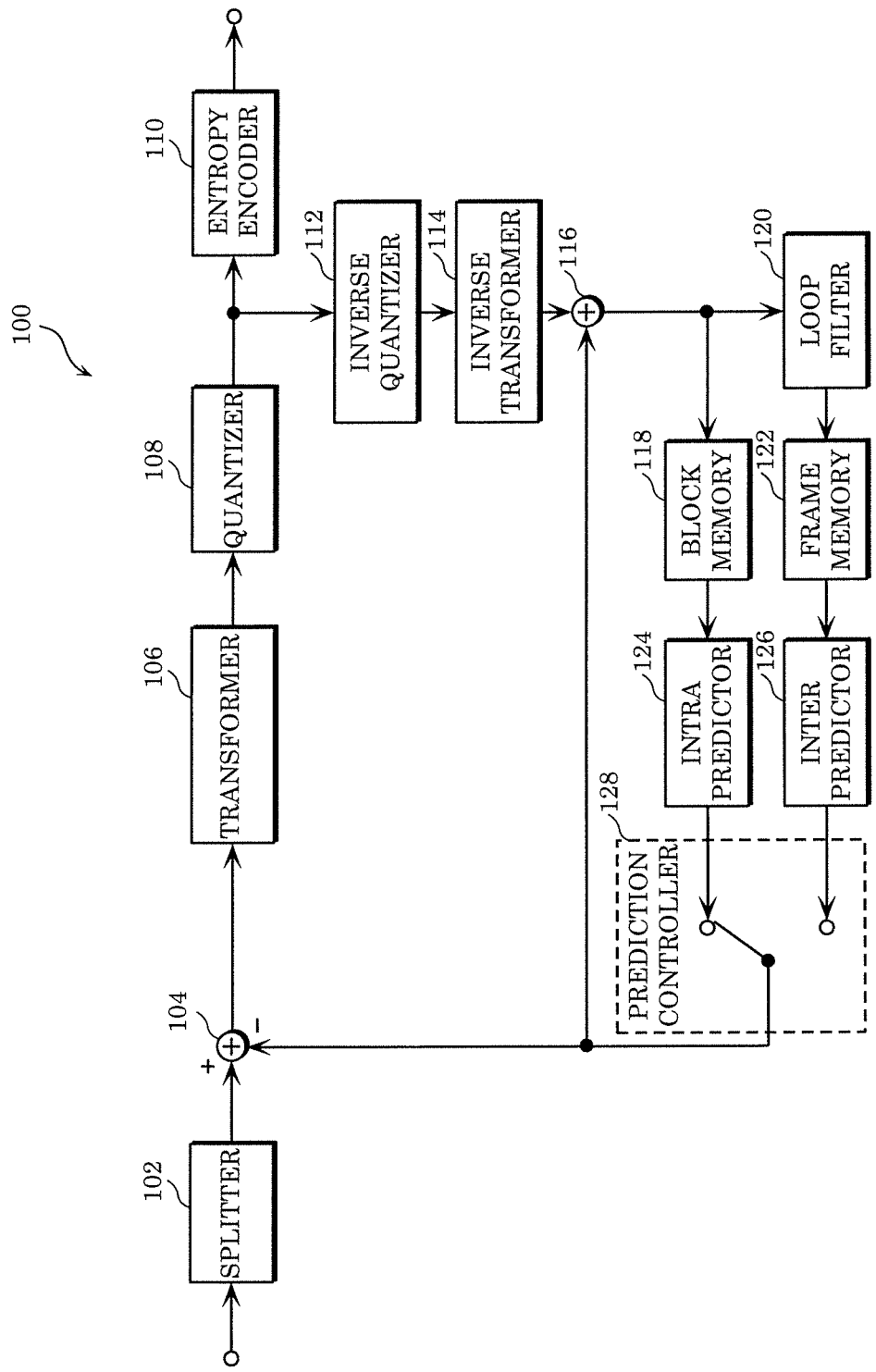
FIG. 1 is a block diagram illustrating a functional configuration of an encoder according to Embodiment 1.

Underlying Knowledge Forming Basis of the Present Disclosure

For example, an encoder encodes an image (a video) in units of a block. The encoder may use inter prediction or intra prediction when encoding the image in units of a block. When the encoder uses inter prediction to encode a current block to be processed, the encoder identifies a reference block, and generates a prediction block for the current block by referring to the reference block. The encoder then encodes a difference image between a prediction image for the current block and an original image of the current block, to reduce the coding amount.

In addition, a decoder decodes the difference image when decoding the image. The decoder then generates a prediction image for the current block by referring to the reference block, and adds the prediction image and the difference image to reconstruct the original image. In this way, the decoder can decode the image.

In addition, for example, the encoder and the decoder may perform a correction process on the prediction image using a reconstructed image of a surrounding region of the current block in order to make the prediction image closer to the original image. The correction process may be a process referred to as a local illumination compensation (LIC) process. More specifically, the encoder and the decoder derive a luminance correction parameter using a luminance of a region around a current block and a luminance of a region around a reference block, and correct the prediction image using the luminance correction parameter. In this way, the coding amount is further reduced.

However, the encoder and the decoder are not capable of using the luminance of the region around the current block until a reconstructed image of the region around the current block is generated. Accordingly, when a correction process using the reconstructed image of the surrounding region is performed, a delay may occur.

In view of this, for example, an encoder according to an aspect of the present disclosure includes circuitry and memory. Using the memory, the circuitry: generates a prediction image to be used to encode a current block to be processed; derives a luminance correction parameter by referring to an image region which is included in an image including the current block and is outside the current block; and corrects the prediction image to be used to encode the current block, using the luminance correction parameter. The luminance correction parameter is used in common between a plurality of blocks included in the image.

In this way, the encoder is capable of supporting the reduction in coding amount using the correction process. In addition, the encoder is capable of reducing the number of times of derivation of a luminance correction parameter. Accordingly, the encoder is capable of reducing occurrence of waiting time for obtaining a reconstructed image. Thus, the encoder is capable of reducing the processing delay while supporting the reduction in coding amount. Furthermore, the encoder is capable of reducing the computation amount.

In addition, for example, the circuitry: derives the luminance correction parameter by referring to the image region which is located around a current coding tree unit to be processed, the current coding tree unit including the plurality of blocks including the current block; and for each of the plurality of blocks included in the current coding tree unit, corrects a prediction image to be used to encode the block using the luminance correction parameter.

In this way, the encoder is capable of efficiently performing the correction process using the luminance correction parameter which is common in the coding tree unit.

In addition, for example, the image region is a region in a neighboring coding tree unit located above the current coding tree unit.

In this way, the encoder is capable of using a region in a coding tree unit which is located above the current coding tree unit and is considered to be sufficiently distant from the current block in the coding tree unit in processing order, to derive a luminance correction parameter. Accordingly, the encoder is capable of appropriately reducing the processing delay.

In addition, for example, when the neighboring coding tree unit located above the current coding tree unit is a coding tree unit which immediately precedes the current coding tree unit in processing order, the circuitry encodes each of the plurality of blocks without correcting the prediction image to be used to encode the block.

In this way, the encoder is capable of appropriately reducing the processing delay without performing a correction process when the coding tree unit located above the current coding tree unit is close to the block in the current coding tree unit in processing order.

In addition, for example, the circuitry: when the current block is located at an upper end of a current coding tree unit including the current block, derives the luminance correction parameter for the current block by referring to the image region which is in a neighboring current coding tree unit located above the current coding tree unit; when the current block is not located at the upper end of the current coding tree unit, derives a luminance correction parameter derived for a processed block located around the current block in the image as the luminance correction parameter for the current block; and corrects the prediction image to be used to encode the current block using the luminance correction parameter for the current block.

In addition, the encoder is capable of using a region in the coding tree unit which is located above the current block and is considered to be sufficiently distant from the current block in processing order, to derive the luminance correction parameter. Alternatively, the encoder is capable of using a luminance correction parameter derived for another block. Accordingly, the encoder is capable of appropriately reducing the processing delay.

In addition, for example, the processed block is a processed block located at a predetermined position relative to the current block.

In this way, the encoder is capable of performing a correction process using the luminance correction parameter derived for the block identified appropriately based on the position of the block.

In addition, for example, the processed block is a most forward processed block for which a prediction image has been corrected using a luminance correction parameter in predetermined order, among a plurality of processed blocks located around the current block in the image.

In this way, the encoder is capable of performing the correction process using the luminance correction parameter derived for the block which appears first as a block which has been subjected to the correction process in the predetermined preference order.

In addition, for example, the processed block is a processed block which is specified by a merge index used to derive a motion vector for the current block.

In this way, the encoder is capable of performing a correction process using the luminance correction parameter derived for the block identified appropriately based on the merge index.

In addition, for example, when the neighboring coding tree unit located above the current coding tree unit is a coding tree unit which immediately precedes the current coding tree unit in processing order, the circuitry encodes the current block without correcting the prediction image for the current block.

In this way, the encoder is capable of appropriately reducing the processing delay without performing a correction process when the coding tree unit located above the current coding tree unit is close to the block in the current coding tree unit in processing order.

In addition, for example, the circuitry stores, in the memory, the luminance correction parameter derived for the current block.

In this way, the encoder is capable of using the luminance correction parameter derived for the current block, later for another block.

In addition, for example, the circuitry: encodes the image by a pipeline structure including, as two different stages, a correction stage in which the prediction image is corrected using the luminance correction parameter and a reconstruction stage in which a reconstructed image is generated; and delays input of a reconstructed image of the current block into the correction stage for another block located after the current block in processing order by a period of time from an end of a process in the correction stage for the current block to an end of all processes in M stages for the current block OM is a natural number).

In this way, the encoder is capable of delaying the reconstructed image of the current block in the pipeline processing, and using the reconstructed image in the correction process on the prediction image of the other block. Thus, the encoder is capable of appropriately performing the correction process on the prediction image.

In addition, for example, M is a number obtainable by subtracting 1 from the number of stages from the correction stage to the reconstruction stage including the correction stage and the reconstruction stage.

In this way, the encoder is capable of delaying the reconstructed image appropriately according to the number of stages from the correction stage to the reconstruction stage.

In addition, for example, the decoder according to an aspect of the present disclosure includes circuitry and memory. Using the memory, the circuitry; generates a prediction image to be used to decode a current block to be processed; derives a luminance correction parameter by referring to an image region which is included in an image including the current block and is outside the current block; and corrects the prediction image to be used to decode the current block, using the luminance correction parameter. The luminance correction parameter is used in common between a plurality of blocks included in the image.

In this way, the decoder is capable of supporting the reduction in coding amount using the correction process. In addition, the decoder is capable of reducing the number of times of derivation of a luminance correction parameter. Accordingly, the decoder is capable of reducing occurrence of waiting time for obtaining a reconstructed image. Thus, the decoder is capable of reducing the processing delay while supporting the reduction in coding amount. Furthermore, the decoder is capable of reducing the computation amount.

In addition, for example, the circuitry; derives the luminance correction parameter by referring to the image region which is located around a current coding tree unit to be processed, the current coding tree unit including the plurality of blocks including the current block; and for each of the plurality of blocks included in the current coding tree unit, corrects a prediction image to be used to decode the block using the luminance correction parameter.

In this way, the decoder is capable of efficiently performing the correction process using the luminance correction parameter which is common in the coding tree unit.

In addition, for example, the image region is a region in a neighboring coding tree unit located above the current coding tree unit.

In this way, the decoder is capable of using a region in a coding tree unit which is located above the current coding tree unit and is considered to be sufficiently distant from the current block in the coding tree unit in processing order, to derive the luminance correction parameter. Accordingly, the decoder is capable of appropriately reducing the processing delay.

In addition, for example, when the neighboring coding tree unit located above the current coding tree unit is a coding tree unit which immediately precedes the current coding tree unit in processing order, the circuitry decodes each of the plurality of blocks without correcting the prediction image to be used to decode the block.

In this way, the decoder is capable of appropriately reducing the processing delay without performing a correction process when the coding tree unit located above the current coding tree unit is close to a current block in the current coding tree unit in processing order.

In addition, for example, the circuitry: when the current block is located at an upper end of a current coding tree unit including the current block, derives the luminance correction parameter for the current block by referring to the image region which is in a neighboring current coding tree unit located above the current coding tree unit; when the current block is not located at the upper end of the current coding tree unit, derives a luminance correction parameter derived for a processed block located around the current block in the image as the luminance correction parameter for the current block; and corrects the prediction image to be used to decode the current block using the luminance correction parameter for the current block.

In addition, the decoder is capable of using a region in the coding tree unit which is located above the current block and is considered to be sufficiently distant from the current block in processing order, to derive the luminance correction parameter. Alternatively, the decoder is capable of using a luminance correction parameter derived for another block. Accordingly, the decoder is capable of appropriately reducing the processing delay.

In addition, for example, the processed block is a processed block located at a predetermined position relative to the current block.

In this way, the decoder is capable of performing a correction process using the luminance correction parameter derived for the block identified appropriately based on the position of the block.

In addition, for example, the processed block is a most forward processed block for which a prediction image has been corrected using a luminance correction parameter in predetermined order, among a plurality of processed blocks located around the current block in the image.

In this way, the decoder is capable of performing the correction process using the luminance correction parameter derived for the block which appears first as a block which has been subjected to the correction process in the predetermined preference order.

In addition, for example, the processed block is a processed block which is specified by a merge index used to derive a motion vector for the current block.

In this way, the decoder is capable of performing a correction process using the luminance correction parameter derived for the block identified appropriately based on the merge index.

In addition, for example, when the neighboring coding tree unit located above the current coding tree unit is a coding tree unit which immediately precedes the current coding tree unit in processing order, the circuitry decodes the current block without correcting the prediction image for the current block.

In this way, the decoder is capable of appropriately reducing the processing delay without performing a correction process when the coding tree unit located above the current coding tree unit is close to a current block in the current coding tree unit in processing order.

In addition, for example, the circuitry stores, in the memory, the luminance correction parameter derived for the current block.

In this way, the decoder is capable of using the luminance correction parameter derived for the current block, later for another block.

In addition, for example, the circuitry: decodes the image by a pipeline structure including, as two different stages, a correction stage in which the prediction image is corrected using the luminance correction parameter and a reconstruction stage in which a reconstructed image is generated; and delays input of a reconstructed image of the current block into the correction stage for another block located after the current block in processing order by a period of time from an end of a process in the correction stage for the current block to an end of all processes in M stages for the current block (M is a natural number)).

In this way, the decoder is capable of delaying the reconstructed image of the current block in the pipeline processing, and using the reconstructed image in the correction process on the prediction image of the other block. Thus, the decoder is capable of appropriately performing the correction process on the prediction image.

In addition, for example, M is a number obtainable by subtracting 1 from the number of stages from the correction stage to the reconstruction stage including the correction stage and the reconstruction stage.

In this way, the decoder is capable of delaying the reconstructed image appropriately according to the number of stages from the correction stage to the reconstruction stage.

In addition, for example, an encoding method according to an aspect of the present disclosure includes: generating a prediction image to be used to encode a current block to be processed; deriving a luminance correction parameter by referring to an image region which is included in an image including the current block and is outside the current block; and correcting the prediction image to be used to encode the current block, using the luminance correction parameter, herein the luminance correction parameter is used in common between a plurality of blocks included in the image.

In this way, it is possible to support the reduction in coding amount using the correction process. In addition, it is possible to reduce the number of times of derivation of a luminance correction parameter. Accordingly, it is possible to reduce occurrence of waiting time for obtaining a reconstructed image. Thus, it is possible to reduce the processing delay while supporting the reduction in coding amount. Furthermore, it is possible to reduce the computation amount.

In addition, for example, the encoding method includes: deriving the luminance correction parameter by referring to the image region which is located around a current coding tree unit to be processed, the current coding tree unit including the plurality of blocks including the current block; and for each of the plurality of blocks included in the current coding tree unit, correcting a prediction image to be used to encode the block using the luminance correction parameter.

In this way, it is possible to efficiently perform the correction process using the luminance correction parameter which is common in the coding tree unit.

In addition, for example, the encoding method includes: when the current block is located at an upper end of a current coding tree unit including the current block, deriving the luminance correction parameter for the current block by referring to the image region which is in a neighboring current coding tree unit located above the current coding tree unit; when the current, block is not located at the upper end of the current coding tree unit, deriving a luminance correction parameter derived for a processed block located around the current block in the image as the luminance correction parameter for the current block; and correcting the prediction image to be used to encode the current block using the luminance correction parameter for the current block.

In this way, it is possible to use a region in the coding tree unit which is located above the current block and is considered to be sufficiently distant from the current block in processing order, to derive the luminance correction parameter. Alternatively, it is possible to use a luminance correction parameter derived for another block. Accordingly, it is possible to appropriately reduce the processing delay.

For example, a decoding method according to an aspect of the present disclosure includes: generating a prediction image to be used to decode a current block to be processed; deriving a luminance correction parameter by referring to an image region which is included in an image including the current block and is outside the current block; and correcting the prediction image to be used to decode the current block, using the luminance correction parameter, wherein the luminance correction parameter is used in common between a plurality of blocks included in the image.

In this way, it is possible to support the reduction in coding amount using the correction process. In addition, it is possible to reduce the number of times of derivation of a luminance correction parameter. Accordingly, it is possible to reduce occurrence of waiting time for obtaining a reconstructed image. Thus, it is possible to reduce the processing delay while supporting the reduction in coding amount. Furthermore, it is possible to reduce the computation amount.

In addition, for example, the decoding method includes: deriving the luminance correction parameter by referring to the image region which is located around a current coding tree unit to be processed, the current coding tree unit including the plurality of blocks including the current block; and for each of the plurality of blocks included in the current coding tree unit, correcting a prediction image to be used to decode the block using the luminance correction parameter.

In this way, it is possible to efficiently perform the correction process using the luminance correction parameter which is common in the coding tree unit.

In addition, for example, the decoding method includes: when the current block is located at an upper end of a current coding tree unit including the current block, deriving the luminance correction parameter for the current block by referring to the image region which is in a neighboring current coding tree unit located above the current coding tree unit; when the current block is not located at the upper end of the current coding tree unit, deriving a luminance correction parameter derived for a processed block located around the current block in the image as the luminance correction parameter for the current block; and correcting the prediction image to be used to decode the current block using the luminance correction parameter for the current block.

In this way, it is possible to use a region in the coding tree unit which is located above the current block and is considered to be sufficiently distant from the current block in processing order, to derive the luminance correction parameter. Alternatively, it is possible to use a luminance correction parameter derived for another block. Accordingly, it is possible to appropriately reduce the processing delay.

In addition, for example, an encoder according to an aspect of the present disclosure is an encoder which: processes, in processing order, a plurality of blocks in an image according to, for at least one of the plurality of blocks, a method for correcting a prediction image for a current block to be processed, using a luminance correction parameter which is derived by referring to an image region around the current block among the plurality of blocks; and encodes the image. The encoder includes circuitry and memory. Using the memory, the circuitry: determines, based on the processing order, reference availability of each of at least one processed surrounding block which is the at least one block processed among the plurality of blocks and is located around the current block; and derives the luminance correction parameter by referring to the image region included in the at least one reference block determined to be available among the at least one processed surrounding block.

In this way, the encoder is capable of supporting the reduction in coding amount using the correction process. In addition, the encoder is capable of appropriately determining a processed surrounding block to be used to derive a luminance correction parameter, based on a processing order which affects the temporal difference between the timing for processing a current block and the processing timing of a processed surrounding block. Accordingly, the encoder is capable of reducing occurrence of waiting time for obtaining a reconstructed image. Thus, the encoder is capable of reducing the processing delay while supporting the reduction in coding amount.

In addition, for example, the image is composed of a plurality of coding tree units which are equal in size. Each of the plurality of coding tree units includes at least one of the plurality of blocks. When the at least one processed surrounding block located above the current block among the at least one processed surrounding block is (i) outside a coding tree unit including the current block among the plurality of blocks and (ii) included in at least one outside block which precedes the current block by at least one block corresponding to a coding tree unit in processing order, the circuitry determines that the at least one processed surrounding block located above can be referred to.

In addition, the encoder is capable of using the processed surrounding block which is located above the current block and is considered to be sufficiently distant from the current block in processing order, to derive the luminance correction parameter. Accordingly, the encoder is capable of appropriately reducing the processing delay.

In addition, for example, the circuitry determines that at least one processed surrounding block located to the left of the current block among the at least one processed surrounding block cannot be referred to, and, when the at least one processed surrounding block located to the upper side of the current block is not included in the at least one outside block, determines that the at least one processed surrounding block located above cannot be referred to.

In this way, the encoder is capable of reducing the use of a processed surrounding block close to the current block in processing order in the derivation of a luminance correction parameter. Accordingly, the encoder is capable of appropriately reducing the processing delay.

In addition, for example, each of the at least one processed surrounding block is either one of at least one processed surrounding block located to the left side of the current block or one of at least one processed surrounding block located to the upper side of the current block. The circuitry determines that one of the at least one processed surrounding block located to the left side and the at least one processed surrounding block located to the upper side which succeeds the other in processing order cannot be referred to.

In this way, the encoder is capable of reducing the use of the processed surrounding block closer to the current block in processing order among the processed surrounding block located to the left side and the processed surrounding block located to the upper side in the derivation of a luminance correction parameter. Accordingly, the encoder is capable of appropriately reducing the processing delay.

In addition, for example, each of the at least one processed surrounding block is either one of at least one processed surrounding block located to the left side of the current block or one of at least one processed surrounding block located to the upper side of the current block. When the at least one processed surrounding block located to the upper side is included in the at least one outside block, the circuitry determines that the at least one processed surrounding block located to the left side cannot be referred to and determines that the at least one processed surrounding block located to the upper side can be referred to. When the at least one processed surrounding block located to the upper side is not included in the at least one outside block, the circuitry determines that one of the at least one processed surrounding block located to the left side and the at least one processed surrounding block located to the upper side which succeeds the other in processing order cannot be referred to, and determines that the other side can be referred to.

In this way, the encoder is capable of using the processed surrounding block which is located above the current block and is considered to be sufficiently distant from the current block in processing order, to derive the luminance correction parameter in addition, the encoder is capable of reducing the use of the processed surrounding block closer to the current block in processing order among the processed surrounding block located to the left side and the processed surrounding block located to the upper side in the derivation of a luminance correction parameter. Accordingly, the encoder is capable of appropriately reducing the processing delay.

In addition, for example, each of the at least one processed surrounding block is either one of at least one processed surrounding block located to the left side of the current block or one of at least one processed surrounding block located to the upper side of the current block. When the at least one processed surrounding block located to the left side includes at least one of N (N is a natural number) temporally close blocks which (i) have been processed among the plurality of blocks and (ii) immediately precede the current block in processing order, the circuitry determines that the at least one processed surrounding block located to the left side cannot be referred to. When the at least one processed surrounding block located to the upper side includes at least one of the N temporally close blocks, the circuitry determines that the at least one processed surrounding block located to the upper side cannot be referred to.

In this way, the encoder is capable of reducing the use of a left-side or an upper-side region which includes a processed surrounding block close to the current block in processing order in the derivation of a luminance correction parameter. Accordingly, the encoder is capable of appropriately reducing the processing delay.

In addition, for example, each of the at least one processed surrounding block is either one of at least one processed surrounding block located to the left side of the current block or one of at least one processed surrounding block located to the upper side of the current block. When the at least one processed surrounding block located to the left side includes at least one of N (N is a natural number) temporally close blocks which (i) have been processed among the plurality of blocks and (ii) immediately precede the current block in processing order, the circuitry determines that the at least one processed surrounding block located to the left side cannot be referred to. When the at least one processed surrounding block located to the left side does not includes any of the N temporally close blocks, the circuitry determines that the at least one processed surrounding block located to the left side can be referred to. When the at least one processed surrounding block located to the upper side (i) includes at least one of the N temporally close blocks, and (ii) is not included in the at least one outside block, the circuitry determines that the at least one processed surrounding block located to the upper side cannot be referred to. When the at least one processed surrounding block located to the upper side does not include any of the N temporally close blocks or is included in the at least one outside block, the circuitry determines that the at least one processed surrounding block located to the upper side can be referred to.

In this way, the encoder is capable of using the processed surrounding block which is located above the current block and is considered to be sufficiently distant from the current block in processing order, to derive the luminance correction parameter. In this way, the encoder is capable of reducing the use of a left-side or an upper-side region which includes a processed surrounding block close to the current block in processing order in the derivation of a luminance correction parameter. Accordingly, the encoder is capable of appropriately reducing the processing delay.

In addition, for example, each of the at least one processed surrounding blocks is either one of at least one processed surrounding block located to the left side of the current block or one of at least one processed surrounding block located to the upper side of the current block. As for each of the at least one processed surrounding block located to the left side, when the processed surrounding block located to the left side is included in N (N is a natural number) temporally close blocks which (i) have been processed among the plurality of blocks and (ii) immediately precede the current block in processing order, the circuitry determines that the at least one processed surrounding block located to the left side cannot be referred to. As for each of the at least one processed surrounding block located to the upper side, when the at least one processed surrounding block located to the upper side is included in the N temporally close blocks, the circuitry determines that the at least one processed surrounding block located to the upper side cannot be referred to.

In this way, the encoder is capable of reducing the use of a processed surrounding block close to the current block in processing order in the derivation of a luminance correction parameter. In addition, the encoder is capable of controlling derivation of a luminance correction parameter so that part of a left-side or upper-side region is not used to derive a luminance correction parameter. Accordingly, the encoder is capable of appropriately deriving a luminance correction parameter for correcting a prediction image while appropriately reducing the processing delay.

In addition, for example, each of the at least one processed surrounding blocks is either one of at least one processed surrounding block located to the left side of the current block or one of at least one processed surrounding block located to the upper side of the current block. As for each of the at least one processed surrounding block located to the left side: the circuitry determines that the at least one processed surrounding block located to the left side cannot be referred to when the processed surrounding block located to the left side is included in N (N is a natural number) temporally close blocks which (i) have been processed among the plurality of blocks and (ii) immediately precede the current block in processing order; and the circuitry determines that the at least one processed surrounding block located to the left side can be referred to when the processed surrounding block located to the left side is not included in the N temporally close blocks. As for each of the at least one processed surrounding block located to the upper side: the circuitry determines that the at least one processed surrounding block located to the upper side cannot be referred to when (i) the at least one processed surrounding block located to the upper side is included in the N temporally close blocks, and (ii) the at least one processed surrounding block located to the upper side is not included in the at least one outside block; and the circuitry determines that the at least one processed surrounding block located to the upper side can be referred to when the at least one processed surrounding block located to the upper side is not included in the N temporally close blocks, or when the at least one processed surrounding block located to the upper side is included in the at least one outside block.

In this way, the encoder is capable of using the processed surrounding block which is located above the current block and is considered to be sufficiently distant from the current block in processing order, to derive the luminance correction parameter. In addition, the encoder is capable of controlling derivation of a luminance correction parameter so that part of a left-side or upper-side region is not used to derive a luminance correction parameter. Accordingly, the encoder is capable of appropriately deriving a luminance correction parameter for correcting a prediction image while appropriately reducing the processing delay.

In addition, for example, N is 1.

In this way, the encoder is capable of performing inter prediction including a correction process on the current block without waiting for a reconstructed image of the block which immediately precedes the current block in processing order. Accordingly, the encoder is capable of appropriately reducing the processing delay.

In addition, for example, N is 2.

In this way, the encoder is capable of performing a correction process on the current block without waiting for reconstructed images of the two blocks which immediately precede the current block in processing order. Accordingly, the encoder is capable of further reducing the processing delay.

In addition, for example, the circuitry encodes the image by a pipeline structure including, as two different stages, a correction stage in which the prediction image is corrected using the luminance correction parameter and a reconstruction stage in which a reconstructed image is generated, and delays input of a reconstructed image of the current block to the correction stage of another block which succeeds the current block in processing order by a period of time from the end of the process in the correction stage on the current block to the end of the processes of M is a natural number) stages on the current block.

In this way, the encoder is capable of delaying the reconstructed image of the current block in the pipeline processing, and using the reconstructed image in the correction process of the prediction image of the other block. Thus, the encoder is capable of appropriately performing the correction process on the prediction image.

In addition, for example, M equals to N.

In this way, the encoder is capable of limiting the reference to a processed surrounding block according to the delay amount of the reconstructed image. Accordingly, the encoder is capable of reducing the processing delay.

In addition, for example, M is smaller than N.

In this way, the encoder is capable of further limiting reference and allowing a correction process to be started earlier. Accordingly, the encoder is capable of further reducing the processing delay.

In addition, for example, M is a number obtainable by subtracting 1 from the number of a plurality of stages from the correction stage to the reconstruction stage including the correction stage and the reconstruction stage.

In this way, the encoder is capable of delaying the reconstructed image appropriately according to the number of stages from the correction stage to the reconstruction stage.

In addition, for example, the circuitry encodes a parameter related to a determination on reference availability in a supplemental information area which stores parameters other than a plurality of parameters stored in: (i) a sequence header area in which a common parameter for an image stream is stored; (ii) a picture header area in which a common parameter for the pictures of the image is stored; (iii) a slice header area in which a common parameter for the slices of the image is stored; and (iv) a supplemental information area in which parameters other than the plurality of parameters stored in the sequence header area, the picture header area, and the slice header area are stored.

In this way, the encoder is capable of notifying the decoder of the parameter related to a determination on reference availability. Accordingly, the encoder and the decoder are capable of using the same parameters related to the determination on reference availability.

In addition, for example, the circuitry may determine a parameter related to a determination on reference availability according to the size of a current picture including the current block.

In this way, the encoder is capable of appropriately changing the parameter related to the determination on reference availability according to the size that affects the processing delay.

In addition, for example, the circuitry obtains information indicating the processing capability of the decoder, and determines a parameter related to a determination on reference availability according to the processing capability of the decoder.

In this way, the encoder is capable of appropriately changing the parameter related to the determination on reference availability according to the processing capability that affects the processing delay.

In addition, for example, the circuitry determines a parameter related to a determination on reference availability according to a profile indicating technical requirements determined for the image stream, or a level indicating parameter requirements determined for the image stream.

In this way, the encoder is capable of appropriately changing the parameter related to the determination on reference availability according to the profile or level related to the processing capability that affects the processing delay.

In addition, for example, the encoder according to an aspect of the present disclosure includes circuitry and memory. Using the memory, the circuitry derives a common luminance correction parameter for a plurality of blocks by referring to an image region around a current coding tree unit including the plurality of blocks, and corrects a prediction image to be used to encode the block using the common luminance correction parameter.

In this way, the encoder is capable of supporting the reduction in coding amount using the correction process. In addition, the encoder is capable of reducing the number of times of derivation of a luminance correction parameter. Accordingly, the encoder is capable of reducing occurrence of waiting time for obtaining a reconstructed image. Thus, the encoder is capable of reducing the processing delay while supporting the reduction in coding amount. Furthermore, the encoder is capable of reducing the computation amount.

In addition, for example, the image region is a region in a neighboring coding tree unit located above the current coding tree unit.

In this way, the encoder is capable of using a region in a coding tree unit which is located above the current coding tree unit and is considered to be sufficiently distant from the current block in the coding tree unit in processing order, to derive a luminance correction parameter. Accordingly, the encoder is capable of appropriately reducing the processing delay.

In addition, for example, when the coding tree unit located above the current coding tree unit is the coding tree unit which immediately precedes the current coding tree unit in processing order, the circuitry encodes each of the plurality of blocks without correcting the prediction image to be used to encode the block.

In this way, the encoder is capable of appropriately reducing the processing delay without performing a correction process when the coding tree unit located above the current coding tree unit is close to a current block in the current coding tree unit in processing order.

In addition, for example, the circuitry encodes an image by a pipeline structure which includes, as two different stages, a correction stage in which the prediction image is corrected using the common luminance correction parameter and a reconstruction stage in which a reconstructed image is generated, and delays input of the reconstructed image of the current block included in the current coding tree unit to the process of the correction stage of another block which succeeds the current block in processing order by a period of time from the end of the process in the correction stage of the current block to the end of the processes in M is a natural number) stages of the current block.

In this way, the encoder is capable of delaying the reconstructed image of the current block in the pipeline processing, and using the reconstructed image in the correction process of the prediction image of the other block.

Thus, the encoder is capable of appropriately performing the correction process on the prediction image.

In addition, for example, M is a number obtainable by subtracting 1 from the number of a plurality of stages from the correction stage to the reconstruction stage including the correction stage and the reconstruction stage.

In this way, the encoder is capable of delaying the reconstructed image appropriately according to the number of stages from the correction stage to the reconstruction stage.

In addition, an encoder according to an aspect of the present disclosure is an encoder which corrects a prediction image to be used to encode a current block to be processed, using a luminance correction parameter which is derived for the current block, and includes circuitry and memory. Using the memory, the circuitry: derives the luminance correction parameter for the current block by referring to an image region in a coding tree unit located above the current coding tree unit when the current block is located at the upper end of the coding tree unit including the current coding unit; and derives, as the luminance correction parameter for the current block, a luminance correction parameter derived for a processed block around the current block when the current block is not located at the upper end of the coding tree unit including the current coding unit, and corrects the prediction image to be used to encode the current block, using the luminance correction parameter for the current block.

In this way, the encoder is capable of supporting the reduction in coding amount using the correction process. In addition, the encoder is capable of using a region in a coding tree unit which is located above the current block and is considered to be sufficiently distant from the current block, to derive a luminance correction parameter. Alternatively, the encoder is capable of using a luminance correction parameter derived for another block. Accordingly, the encoder is capable of appropriately reducing the processing delay. Thus, the encoder is capable of reducing the processing delay while supporting the reduction in coding amount.

In addition, for example, the processed block is a processed block located at a predetermined position relative to the current block.

In this way, the encoder is capable of performing a correction process using the luminance correction parameter derived for the block identified appropriately based on the position of the block.

In addition, for example, the processed block is a most forward processed block for which a prediction image has been corrected using a luminance correction parameter in predetermined order, among a plurality of processed blocks located around the current block in the image.

In this way, the encoder is capable of performing the correction process using the luminance correction parameter derived for the block which appears first as a block which has been subjected to the correction process in the predetermined preference order.

In addition, for example, the processed block is a processed block which is specified by a merge index used to derive a motion vector for the current block.

In this way, the encoder is capable of performing a correction process using the luminance correction parameter derived for the block identified appropriately based on the merge index.

In addition, for example, when the neighboring coding tree unit located above the current coding tree unit is a coding tree unit which immediately precedes the current coding tree unit in processing order, the circuitry encodes the current block without correcting the prediction image for the current block.

In this way, the encoder is capable of appropriately reducing the processing delay without performing a correction process when the coding tree unit located above the current coding tree unit is close to a current block in the current coding tree unit in processing order.

In addition, for example, when the neighboring coding tree unit located above the current coding tree unit is the coding tree unit which immediately precedes the current coding tree unit in processing order, the circuitry derives, for each of all the blocks in the current coding tree unit, a luminance correction parameter derived for a processed block around the block as a luminance correction parameter for the block.

In this way, when the upper-side coding tree unit is close to the block in the current coding tree unit in processing order, the encoder is capable of performing a correction process using the luminance correction parameter derived for the other block. Accordingly, the encoder is capable of appropriately reducing the processing delay.

In addition, for example, the circuitry stores, in the memory, the luminance correction parameter derived for the current block.

In this way, the encoder is capable of using the luminance correction parameter derived for the current block, later for another block.

In addition, for example, the circuitry encodes an image by a pipeline structure which includes, as two different stages, a correction stage in which the prediction image is corrected using the luminance correction parameter and a reconstruction stage in which a reconstructed image is generated, and delays input of the reconstructed image of the current block included in the current coding tree unit to the process in the correction stage of another block which succeeds the current block in processing order by a period of time from the end of the processing in the correction stage of the current block to the end of the processes in M (M is a natural number) stages of the current block.

In this way, the encoder is capable of delaying the reconstructed image of the current block in the pipeline processing, and using the reconstructed image in the correction process of the prediction image of the other block. Thus, the encoder is capable of appropriately performing the correction process on the prediction image.

In addition, for example, M is a number obtainable by subtracting 1 from the number of a plurality of stages from the correction stage to the reconstruction stage including the correction stage and the reconstruction stage.

In this way, the encoder is capable of delaying the reconstructed image appropriately according to the number of stages from the correction stage to the reconstruction stage.

In addition, for example, a decoder according to an aspect of the present disclosure is a decoder which: processes, in processing order, a plurality of blocks in an image according to, for at least one of the plurality of blocks, a method for correcting a prediction image for a current block to be processed, using a luminance correction parameter which is derived by referring to an image region around the current block among the plurality of blocks; and decodes the image. The decoder includes circuitry and memory. Using the memory, the circuitry: determines, based on the processing order, reference availability of each of at least one processed surrounding block which is the at least one block processed among the plurality of blocks and is located around the current block; and derives the luminance correction parameter by referring to the image region included in the at least one reference block determined to be available among the at least one processed surrounding block.

In this way, the decoder is capable of supporting the reduction in coding amount using the correction process. In addition, the decoder is capable of appropriately determining a processed surrounding block to be used to derive a luminance correction parameter, based on a processing order which affects the temporal difference between the timing for processing a current block and the processing timing of a processed surrounding block. Accordingly, the decoder is capable of reducing occurrence of waiting time for obtaining a reconstructed image. Thus, the decoder is capable of reducing the processing delay while supporting the reduction in coding amount.

In addition, for example, the image is composed of a plurality of coding tree units which are equal in size. Each of the plurality of coding tree units includes at least one of the plurality of blocks. When the at least one processed surrounding block located above the current block among the at least one processed surrounding block is (i) outside a coding tree unit including the current block among the plurality of blocks and (ii) included in at least one outside block which precedes the current block by at least one block corresponding to a coding tree unit in processing order, the circuitry determines that the at least one processed surrounding block located above can be referred to.

In this way, the decoder is capable of using the processed surrounding block which is located above the current block and is considered to be sufficiently distant from the current block in processing order, to derive the luminance correction parameter. Accordingly, the decoder is capable of appropriately reducing the processing delay.

In addition, for example, the circuitry determines that at least one processed surrounding block located to the left of the current block among the at least one processed surrounding block cannot be referred to, and, when the at least one processed surrounding block located to the upper side of the current block is not included in the at least one outside block, determines that the at least one processed surrounding block located to the upper side cannot be referred to.

In this way, the decoder is capable of reducing the use of a processed surrounding block close to the current block in processing order in the derivation of a luminance correction parameter. Accordingly, the decoder is capable of appropriately reducing the processing delay.

In addition, for example, each of the at least one processed surrounding block is either one of at least one processed surrounding block located to the left side of the current block or one of at least one processed surrounding block located to the upper side of the current block. The circuitry determines that one of the at least one processed surrounding block located to the left side and the at least one processed surrounding block located to the upper side which succeeds the other in processing order cannot be referred to.

In addition, the decoder is capable of reducing the use of the processed surrounding block closer to the current block in processing order among the processed surrounding block located to the left side and the processed surrounding block located to the upper side in the derivation of a luminance correction parameter. Accordingly, the decoder is capable of appropriately reducing the processing delay.

In addition, for example, each of the at least one processed surrounding block is either one of at least one processed surrounding block located to the left side of the current block or one of at least one processed surrounding block located to the upper side of the current block. When the at least one processed surrounding block located to the upper side is included in the at least one outside block, the circuitry determines that the at least one processed surrounding block located to the left side cannot be referred to and determines that the at least one processed surrounding block located to the upper side can be referred to. When the at least one processed surrounding block located to the upper side is not included in the at least one outside block, the circuitry determines that one of the at least one processed surrounding block located to the left side and the at least one processed surrounding block located to the upper side which succeeds the other in processing order cannot be referred to, and determines that the other side can be referred to.

In this way, the decoder is capable of using the processed surrounding block which is located above the current block and is considered to be sufficiently distant from the current block in processing order, to derive the luminance correction parameter. In addition, the decoder is capable of reducing the use of the processed surrounding block closer to the current block in processing order among the processed surrounding block located to the left side and the processed surrounding block located to the upper side in the derivation of a luminance correction parameter. Accordingly, the decoder is capable of appropriately reducing the processing delay.

In addition, for example, each of the at least one processed surrounding block is either one of at least one processed surrounding block located to the left side of the current block or one of at least one processed surrounding block located to the upper side of the current block. When the at least one processed surrounding block located to the left side includes at least one of N (N is a natural number) temporally close blocks which (i) have been processed among the plurality of blocks and (ii) immediately precede the current block in processing order, the circuitry determines that the at least one processed surrounding block located to the left side cannot be referred to. When the at least one processed surrounding block located to the upper side includes at least one of the N temporally close blocks, the circuitry determines that the at least one processed surrounding block located to the upper side cannot be referred to.

In this way, the decoder is capable of reducing the use of a left-side or an upper-side region which includes a processed surrounding block close to the current block in processing order in the derivation of a luminance correction parameter. Accordingly, the decoder is capable of appropriately reducing the processing delay.

In addition, for example, each of the at least one processed surrounding block is either one of at least one processed surrounding block located to the left side of the current block or one of at least one processed surrounding block located to the upper side of the current block. When the at least one processed surrounding block located to the left side includes at least one of N (N is a natural number) temporally close blocks which (i) have been processed among the plurality of blocks and (ii) immediately precede the current block in processing order, the circuitry determines that the at least one processed surrounding block located to the left side cannot be referred to. When the at least one processed surrounding block located to the upper side does not include any of the N temporally close blocks, the circuitry determines that the at least one processed surrounding block located to the upper side can be referred to. When the at least one processed surrounding block located to the upper side (i) includes at least one of the N temporally close blocks and (ii) is not included in the at least one outside block, the circuitry determines that the at least one processed surrounding block located to the upper side cannot be referred to. When the at least one processed surrounding block located to the upper side does not include any of the N temporally close blocks or when the at least one processed surrounding block located to the upper side is included in the at least one outside block, the circuitry determines that the at least one processed surrounding block located to the upper side can be referred to.

In this way, the decoder is capable of using the processed surrounding block which is located above the current block and is considered to be sufficiently distant from the current block in processing order, to derive the luminance correction parameter. In this way, the decoder is capable of reducing the use of a left-side or an upper-side region which includes a processed surrounding block close to the current block in processing order in the derivation of a luminance correction parameter. Accordingly, the decoder is capable of appropriately reducing the processing delay.

In addition, for example, each of the at least one processed surrounding block is either one of at least one processed surrounding block located to the left side of the current block or one of at least one processed surrounding block located to the upper side of the current block. As for each of the at least one processed surrounding block located to the left side, when the processed surrounding block located to the left side is included in N (N is a natural number) temporally close blocks which (i) have been processed among the plurality of blocks and (ii) immediately precede the current block in processing order, the circuitry determines that the at least one processed surrounding block located to the left side cannot be referred to. As for each of the at least one processed surrounding block located to the upper side, when the at least one processed surrounding block located to the upper side is included in the N temporally close blocks, the circuitry determines that the at least one processed surrounding block located to the upper side cannot be referred to.

In this way, the decoder is capable of reducing the use of a processed surrounding block close to the current block in processing order in the derivation of a luminance correction parameter. In addition, the decoder is capable of controlling derivation of a luminance correction parameter so that part of a left-side or upper-side region is not used to derive a luminance correction parameter. Accordingly, the decoder is capable of appropriately deriving a luminance correction parameter for correcting a prediction image while appropriately reducing the processing delay.

In addition, for example, each of the at least one processed surrounding blocks is either one of at least one processed surrounding block located to the left side of the current block or one of at least one processed surrounding block located to the upper side with respect to the current block. As for each of the at least one processed surrounding block located to the left side: the circuitry determines that the at least one processed surrounding block located to the left side cannot be referred to when the processed surrounding block located to the left side is included in N (N is a natural number) temporally close blocks which (i) have been processed among the plurality of blocks and (ii) immediately precede the current block in processing order; and the circuitry determines that the at least one processed surrounding block located to the left side can be referred to when the processed surrounding block located to the left side is not included in the N temporally close blocks. As for each of the at least one processed surrounding block located to the upper side: the circuitry determines that the at least one processed surrounding block located to the upper side cannot be referred to when (i) the at least one processed surrounding block located to the upper side is included in the N temporally close blocks, and (ii) the at least one processed surrounding block located at the upper side is not included in the at least one outside block; and the circuitry determines that the at least one processed surrounding block located to the upper side can be referred to when the at least one processed surrounding block located to the upper side is not included in the N temporally close blocks, or when the at least one processed surrounding block located to the upper side is included in the at least one outside block.

In this way, the decoder is capable of using the processed surrounding block which is located above the current block and is considered to be sufficiently distant from the current block in processing order, to derive the luminance correction parameter. In addition, the decoder is capable of controlling derivation of a luminance correction parameter so that part of a left-side or upper-side region is not used to derive a luminance correction parameter. Accordingly, the decoder is capable of appropriately deriving a luminance correction parameter for correcting a prediction image while appropriately reducing the processing delay.

In addition, for example, N is 1.

In this way, the decoder is capable of performing inter prediction including a correction process on the current block without waiting for a reconstructed image of the block which immediately precedes the current block in processing order. Accordingly, the decoder is capable of appropriately reducing the processing delay.

In addition, for example, N is 2.

In this way, the decoder is capable of performing a correction process on the current block without waiting for reconstructed images of the two blocks which immediately precede the current block in processing order. Accordingly, the decoder is capable of further reducing the processing delay.

In addition, for example, the circuitry decodes the image by a pipeline structure including, as two different stages, a correction stage in which the prediction image is corrected using the luminance correction parameter and a reconstruction stage in which a reconstructed image is generated, and delays input of a reconstructed image of the current block to the correction stage of another block which succeeds the current block in processing order by a period of time from the end of the process in the correction stage on the current block to the end of the processes of M is a natural number) stages on the current block.

In this way, the decoder is capable of delaying the reconstructed image of the current block in the pipeline processing, and using the reconstructed image in the correction process on the prediction image of the other block. Thus, the decoder is capable of appropriately performing the correction process on the prediction image.

In addition, for example, M equals to N.

In this way, the decoder is capable of limiting the reference to a processed surrounding block according to the delay amount of the reconstructed image. Accordingly, the decoder is capable of reducing the processing delay.

In addition, for example, M is smaller than N.

In this way, the decoder is capable of further limiting reference and allowing a correction process to be started earlier. Accordingly, the decoder is capable of further reducing the processing delay.

In addition, for example, M is a number obtainable by subtracting 1 from the number of a plurality of stages from the correction stage to the reconstruction stage including the correction stage and the reconstruction stage.

In this way, the decoder is capable of delaying the reconstructed image appropriately according to the number of stages from the correction stage to the reconstruction stage.

In addition, for example, the circuitry decodes a parameter related to a determination on reference availability from a supplemental information area which stores parameters other than a plurality of parameters stored in: (i) a sequence header area in which a common parameter for an image stream is stored; (ii) a picture header area in which a common parameter for the pictures of the image is stored; (iii) a slice header area in which a common parameter for the slices of the image is stored; and (iv) a supplemental information area in which parameters other than the plurality of parameters stored in the sequence header area, the picture header area, and the slice header area are stored.

In this way, the decoder is capable of obtaining a notification of the parameter related to the determination on reference availability from the encoder. Accordingly, the encoder and the decoder are capable of using the same parameters related to the determination on reference availability.

In addition, for example, the circuitry may determine a parameter related to a determination on reference availability according to the size of a current picture including a current block.

In this way, the decoder is capable of appropriately changing the parameter related to the determination on reference availability according to the size that affects the processing delay.

In addition, for example, the circuitry obtains information indicating the processing capability of the decoder, and determines a parameter related to a determination on reference availability according to the processing capability of the decoder.

In this way, the decoder is capable of appropriately changing the parameter related to the determination on reference availability according to the processing capability that affects the processing delay.

In addition, for example, the circuitry determines a parameter related to a determination on reference availability according to a profile indicating technical requirements determined for the image stream, or a level indicating parameter requirements determined for the image stream.

In this way, the decoder is capable of appropriately changing the parameter related to the determination on reference availability according to the profile or level related to the processing capability that affects the processing delay.

In addition, for example, the decoder according to an aspect of the present disclosure includes circuitry and memory. Using the memory, the circuitry derives a common luminance correction parameter for a plurality of blocks by referring to an image region around a current coding tree unit including the plurality of blocks, and corrects a prediction image to be used to decode the block using the common luminance correction parameter.

In this way, the decoder is capable of supporting the reduction in coding amount using the correction process. In addition, the decoder is capable of reducing the number of times of derivation of a luminance correction parameter. Accordingly, the decoder is capable of reducing occurrence of waiting time for obtaining a reconstructed image. Thus, the decoder is capable of reducing the processing delay while supporting the reduction in coding amount. Furthermore, the decoder is capable of reducing the computation amount.

In addition, for example, the image region is a region in a neighboring coding tree unit located above the current coding tree unit.

In this way, the decoder is capable of using a region in a coding tree unit which is located above the current coding tree unit and is considered to be sufficiently distant from the current block in the coding tree unit in processing order, to derive the luminance correction parameter. Accordingly, the decoder is capable of appropriately reducing the processing delay.

In addition, for example, when the neighboring coding tree unit located above the current coding tree unit is a coding tree unit which immediately precedes the current coding tree unit in processing order, the circuitry decodes each of the plurality of blocks without correcting the prediction image to be used to decode the block.

In this way, the decoder is capable of appropriately reducing the processing delay without performing a correction process when the coding tree unit located above the current coding tree unit is close to the current block in the current coding tree unit in processing order.

In addition, for example, the circuitry decodes an image by a pipeline structure which includes, two different stages, a correction stage in which the prediction image is corrected using the common luminance correction parameter and a reconstruction stage in which a reconstructed image is generated, and delays input of the reconstructed image of the current block included in the current coding tree unit to the process of the correction stage of another block which succeeds the current block in processing order by a period of time from the end of the process in the correction stage of the current block to the end of the processes in M is a natural number) stages of the current block.

In this way, the decoder is capable of delaying the reconstructed image of the current block in the pipeline processing, and using the reconstructed image in the correction process on the prediction image of the other block. Thus, the decoder is capable of appropriately performing the correction process on the prediction image.

In addition, for example, M is a number obtainable by subtracting 1 from the number of a plurality of stages from the correction stage to the reconstruction stage including the correction stage and the reconstruction stage.

In this way, the decoder is capable of delaying the reconstructed image appropriately according to the number of stages from the correction stage to the reconstruction stage.

In addition, a decoder according to an aspect of the present disclosure is a decoder which corrects a prediction image to be used to decode a current block to be processed, using a luminance correction parameter which is derived for the current block, and includes circuitry and memory. Using the memory, the circuitry: derives the luminance correction parameter for the current block by referring to an image region in a coding tree unit located above the current coding tree unit when the current block is located at the upper end of the coding tree unit including the current coding unit; and derives, as the luminance correction parameter for the current block, a luminance correction parameter derived for a processed block around the current block when the current block is not located at the upper end of the coding tree unit including the current coding unit, and corrects the prediction image to be used to decode the current block, using the luminance correction parameter for the current block.

In this way, the decoder is capable of supporting the reduction in coding amount using the correction process. In addition, the decoder is capable of using a region in a coding tree unit which is located above the current block and is considered to be sufficiently distant from the current block, to derive a luminance correction parameter. Alternatively, the decoder is capable of using a luminance correction parameter derived for another block. Accordingly, the decoder is capable of appropriately reducing the processing delay. Thus, the decoder is capable of reducing the processing delay while supporting the reduction in coding amount.

In addition, for example, the processed block is a processed block located at a predetermined position relative to the current block.

In this way, the decoder is capable of performing a correction process using the luminance correction parameter derived for the block identified appropriately based on the position of the block.

In addition, for example, the processed block is a most forward processed block for which a prediction image has been corrected using a luminance correction parameter in predetermined order, among a plurality of processed blocks located around the current block in the image.

In this way, the decoder is capable of performing the correction process using the luminance correction parameter derived for the block which appears first as a block which has been subjected to the correction process in the predetermined preference order.

In addition, for example, the processed block is a processed block which is specified by a merge index used to derive a motion vector for the current block.

In this way, the decoder is capable of performing a correction process using the luminance correction parameter derived for the block identified appropriately based on the merge index.

In addition, for example, when the neighboring coding tree unit located above the current coding tree unit is a coding tree unit which immediately precedes the current coding tree unit in processing order, the circuitry decodes the current block without correcting the prediction image for the current block.

In this way, the decoder is capable of appropriately reducing the processing delay without performing a correction process when the coding tree unit located above the current coding tree unit is close to a current block in the current coding tree unit in processing order.

In addition, for example, when the neighboring coding tree unit located above the current coding tree unit is the coding tree unit which immediately precedes the current coding tree unit in processing order, the circuitry derives, for each of all the blocks in the current coding tree unit, a luminance correction parameter derived for a processed block around the block as a luminance correction parameter for the block in the current coding tree unit.

In this way, when the upper-side coding tree unit is close to the block in the current coding tree unit in processing order, the decoder is capable of performing a correction process using the luminance correction parameter derived for the other block. Accordingly, the decoder is capable of appropriately reducing the processing delay.

In addition, for example, the circuitry stores, in the memory, the luminance correction parameter derived for the current block.

In this way, the decoder is capable of using the luminance correction parameter derived for the current block, later for another block.

In addition, for example, the circuitry decodes an image by a pipeline structure which includes, as two different stages, a correction stage in which the prediction image is corrected using the luminance correction parameter and a reconstruction stage in which a reconstructed image is generated, and delays input of the reconstructed image of the current block included in the current coding tree unit to the process in the correction stage of another block which succeeds the current block in processing order by a period of time from the end of the process in the correction stage of the current block to the end of the processes in M (M is a natural number) stages of the current block.

In this way, the decoder is capable of delaying the reconstructed image of the current block in the pipeline processing, and using the reconstructed image in the correction process on the prediction image of the other block. Thus, the decoder is capable of appropriately performing the correction process on the prediction image.

In addition, for example, M is a number obtainable by subtracting 1 from the number of a plurality of stages from the correction stage to the reconstruction stage including the correction stage and the reconstruction stage.

In this way, the decoder is capable of delaying the reconstructed image appropriately according to the number of stages from the correction stage to the reconstruction stage.

In addition, for example, an encoding method according to an aspect of the present disclosure is an encoding method for: processing, in processing order, a plurality of blocks in an image according to, for at least one of the plurality of blocks, a method for correcting a prediction image for a current block to be processed, using a luminance correction parameter which is derived by referring to an image region around the current block among the plurality of blocks; and encoding the image. The encoding method includes determining, based on the processing order, reference availability of each of at least one processed surrounding block which is the at least one block processed among the plurality of blocks and is located around the current block; and deriving the luminance correction parameter by referring to the image region included in the at least one reference block determined to be available among the at least one processed surrounding block.

In this way, it is possible to support the reduction in coding amount using the correction process. In addition, it is possible to appropriately determine a processed surrounding block to be used to derive a luminance correction parameter, based on the processing order which affects the temporal difference between the timing for processing a current block and the processing timing of a processed surrounding block. Accordingly, it is possible to reduce occurrence of waiting time for obtaining a reconstructed image. Thus, it is possible to reduce the processing delay while supporting the reduction in coding amount.

In addition, for example, the encoding method according to an aspect of the present disclosure includes: deriving a common luminance correction parameter for a plurality of blocks by referring to an image region around a current coding tree unit including the plurality of blocks; and correcting a prediction image to be used to encode the block using the common luminance correction parameter.

In this way, it is possible to support the reduction in coding amount using the correction process. In addition, it is possible to reduce the number of times of derivation of a luminance correction parameter. Accordingly, it is possible to reduce occurrence of waiting time for obtaining a reconstructed image. Thus, it is possible to reduce the processing delay while supporting the reduction in coding amount. Furthermore, it is possible to reduce the computation amount.

In addition, for example, an encoding method according to an aspect of the present disclosure is an encoding method for correcting a prediction image for a current block to be processed, using a luminance correction parameter which is derived for the current block. The encoding method includes: deriving the luminance correction parameter for the current block by referring to an image region in a coding tree unit located above the current coding tree unit when the current block is located at the upper end of the current coding tree unit including the current block; and derives the luminance correction parameter derived for the current block around the current block as the luminance correction parameter for the current block when the current block is not located at the upper end of the current coding tree unit including the current block, and corrects the prediction image to be used to encode the current block using the luminance correction parameter for the current block.

In this way, it is possible to support the reduction in coding amount using the correction process. In this way, it is possible to use a region in the coding tree unit which is located above; the current block and is considered to be sufficiently distant from the current block in processing order, to derive the luminance correction parameter. Alternatively, it is possible to use a luminance correction parameter derived for another block. Accordingly, it is possible to appropriately reduce the processing delay. Thus, it is possible to reduce the processing delay while supporting the reduction in coding amount.

In addition, for example, a decoding method according to an aspect of the present disclosure is a decoding method for: processing, in processing order, a plurality of blocks in an image according to, for at least one of the plurality of blocks, a method for correcting a prediction image for a current block to be processed, using a luminance correction parameter which is derived by referring to an image region around the current block among the plurality of blocks; and decoding the image. The decoding method includes determining, based on the processing order, reference availability of each of at least one processed surrounding block which is the at least one block processed among the plurality of blocks and is located around the current block; and deriving the luminance correction parameter by referring to the image region included in the at least one reference block determined to be available among the at least one processed surrounding block.

In this way, it is possible to support the reduction in coding amount using the correction process. In addition, it is possible to appropriately determine a processed surrounding block to be used to derive a luminance correction parameter, based on the processing order which affects the temporal difference between the timing for processing a current block and the processing timing of a processed surrounding block. Accordingly, it is possible to reduce occurrence of waiting time for obtaining a reconstructed image. Thus, it is possible to reduce the processing delay while supporting the reduction in coding amount.

In addition, for example, the decoding method according to an aspect of the present disclosure includes: deriving a common luminance correction parameter for a plurality of blocks by referring to an image region around a current coding tree unit including the plurality of blocks; and correcting a prediction image to be used to decode the block using the common luminance correction parameter.

In this way, it is possible to support the reduction in coding amount using the correction process. In addition, it is possible to reduce the number of times of derivation of a luminance correction parameter. Accordingly, it is possible to reduce occurrence of waiting time for obtaining a reconstructed image. Thus, it is possible to reduce the processing delay while supporting the reduction in coding amount. Furthermore, it is possible to reduce the computation amount.

In addition, for example, a decoding method according to an aspect of the present disclosure is a decoding method for correcting a prediction image for a current block to be processed, using a luminance correction parameter which is derived for the current block. The decoding method includes: deriving the luminance correction parameter for the current block by referring to an image region in a coding tree unit located above the current coding tree unit when the current block is located at the upper end of the current coding tree unit including the current block; and deriving the luminance correction parameter derived for the current block around the current block as the luminance correction parameter for the current block when the current block is not located at the upper end of the current coding tree unit including the current block, and correcting the prediction image to be used to decode the current block using the luminance correction parameter for the current block.

In this way, it is possible to support the reduction in coding amount using the correction process. In this way, it is possible to use a region in the coding tree unit which is located above the current block and is considered to be sufficiently distant from the current block in processing order, to derive the luminance correction parameter. Alternatively, it is possible to use a luminance correction parameter derived for another block. Accordingly, it is possible to appropriately reduce the processing delay. Thus, it is possible to reduce the processing delay while supporting the reduction in coding amount.

In addition, for example, an encoder according to the present disclosure includes: a splitter; an intra predictor; an inter predictor; a transformer; a quantizer; an entropy encoder; and a loop filter. The splitter splits an image into a plurality of blocks. The intra predictor performs intra prediction on a block included in the plurality of blocks. The inter predictor performs inter prediction on a block included in the plurality of blocks. The transformer transforms a prediction error between a prediction image obtained by intra prediction or inter prediction and an original image to generate transform coefficients. The quantizer quantizes the transform coefficients to generate quantized coefficients. The entropy encoder encodes the quantized coefficients to generate an encoded bitstream. The loop filter applies a filter to a reconstructed image which is generated using the prediction image.

In addition, for example, the inter predictor generates a prediction image to be used to encode a current block, derives a luminance correction parameter by referring to an image region which is included in an image including the current block and is located outside the current block, and corrects the prediction image to be used to encode the current block using the luminance correction parameter. The luminance correction parameter is used in common for a plurality of blocks.

In addition, for example, the encoder processes, in processing order, a plurality of blocks in an image according to, for at least one of the plurality of blocks, a method for correcting a prediction image for a current block to be processed, using a luminance correction parameter which is derived by referring to an image region around the current block among the plurality of blocks; and encodes the image. The inter predictor determines, based on the processing order, reference availability of each of at least one processed surrounding block which is the at least one block processed among the plurality of blocks and is located around the current block; and derives the luminance correction parameter by referring to the image region included in the at least one reference block determined to be available among the at least one processed surrounding block.

In addition, for example, the inter predictor: derives a common luminance correction parameter for a plurality of blocks by referring to an image region around a current coding tree unit including the plurality of blocks; and corrects a prediction image to be used to encode the block using the common luminance correction parameter.

In addition, for example, the encoder corrects a prediction image to be used to encode a current block using a luminance correction parameter which is derived for the current block. In addition, for example, the inter predictor: when the current block is located at an upper end of a current coding tree unit including the current block, derives the luminance correction parameter for the current block by referring to the image region which is in a neighboring current coding tree unit located above the current coding tree unit; when the current block is not located at the upper end of the current coding tree unit, derives a luminance correction parameter derived for a processed block located around the current block in the image as the luminance correction parameter for the current block; and corrects the prediction image to be used to encode the current block using the luminance correction parameter for the current block.

In addition, for example, a decoder according to an aspect of the present disclosure includes: an entropy decoder; an inverse quantizer; an inverse transformer; an intra predictor; an inter predictor; and a loop filter. The entropy decoder decodes quantized coefficients of a block in an image from an encoded bitstream. The inverse quantizer inverse-quantizes the quantized coefficients to obtain transform coefficients. The inverse transformer inverse-transforms the transform coefficients to obtain a prediction error. The intra predictor performs intra prediction on the block. The inter predictor performs inter prediction on a block included in the plurality of blocks. The loop filter applies a filter to a reconstructed image which is generated using a prediction image obtained by intra prediction or inter prediction and the prediction difference.

In addition, for example, the decoder processes, in processing order, a plurality of blocks in an image according to, for at least one of the plurality of blocks, a method for correcting a prediction image for a current block to be processed, using a luminance correction parameter which is derived by referring to an image region around the current block among the plurality of blocks; and decodes the image. The inter predictor determines, based on the processing order, reference availability of each of at least one processed surrounding block which is the at least one block processed among the plurality of blocks and is located around the current block; and derives the luminance correction parameter by referring to the image region included in the at least one reference block determined to be available among the at least one processed surrounding block.

In addition, for example, the inter predictor generates a prediction image to be used to decode a current block, derives a luminance correction parameter by referring to an image region which is included in an image including the current block and is located outside the current block, and corrects the prediction image to be used to decode the current block using the luminance correction parameter. The luminance correction parameter is used in common for a plurality of blocks.

In addition, for example, the inter predictor: derives a common luminance correction parameter for the plurality of blocks by referring to an image region around a current coding tree unit including the plurality of blocks; and corrects a prediction image to be used to decode the block using the common luminance correction parameter.

In addition, for example, the decoder corrects a prediction image to be used to decode a current block using a luminance correction parameter which is derived for the current block. In addition, for example, the inter predictor: when the current block is located at an upper end of a current coding tree unit including the current block, derives the luminance correction parameter for the current block by referring to the image region which is in a neighboring current coding tree unit located above the current coding tree unit; when the current block is not located at the upper end of the current coding tree unit, derives a luminance correction parameter derived for a processed block located around the current block in the image as the luminance correction parameter for the current block; and corrects the prediction image to be used to decode the current block using the luminance correction parameter for the current block.

Furthermore, these general and specific aspects may be implemented using a system, a device, a method, an integrated circuit, a computer program, or a non-transitory computer-readable recording medium such as a CD-OM, or any combination of systems, devices, methods, integrated circuits, computer programs, or computer-readable recording media.

Hereinafter, embodiments will be described with reference to the drawings. It is to be noted that the embodiments described below each show a general or specific example. The numerical values, shapes, materials, constituent elements, the arrangement and connection of the constituent elements, steps, order of the steps, etc., indicated in the following embodiments are mere examples, and therefore are not intended to limit the claims. In addition, among the constituent elements in the following embodiments, those not recited in any of the independent claims defining the broadest inventive concepts are described as optional constituent elements.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
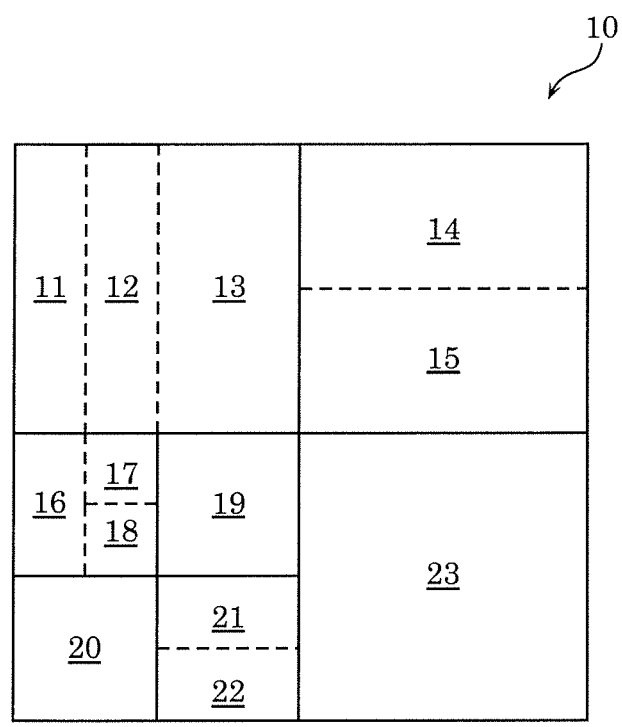
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signaled at the CU level. Note that the signaling of such information need not be performed at the CU level, and may be performed at another level (for example, at the sequence level, picture level, slice level, file level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signaled at the CU level. Note that the signaling of such information need not be performed at the CU level, and may be performed at another level (for example, at the sequence level, picture level, slice level, tile level, or CTU Here, a separable transform is a method in which a transform is performed a plurality of times by separately performing a transform for each direction according to the number of dimensions input. A non-separable transform is a method of performing a collective transform in which two or more dimensions in a multidimensional input are collectively rewarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients inverse transformer 114 then outputs the restored prediction errors to adder 116.

Note that since information is lost in quantization, the restored prediction errors do not match the prediction errors calculated by subtractor 104. In other words, the restored prediction errors include quantization errors,

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
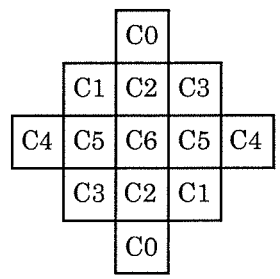
FIG. 4A illustrates one example of a filter shape used in ALF.
Figure 4B:
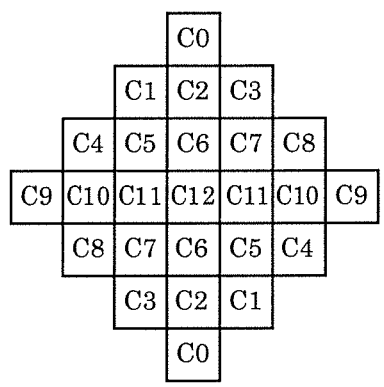
FIG. 4B illustrates another example of a filter shape used in ALF.
Figure 4C:
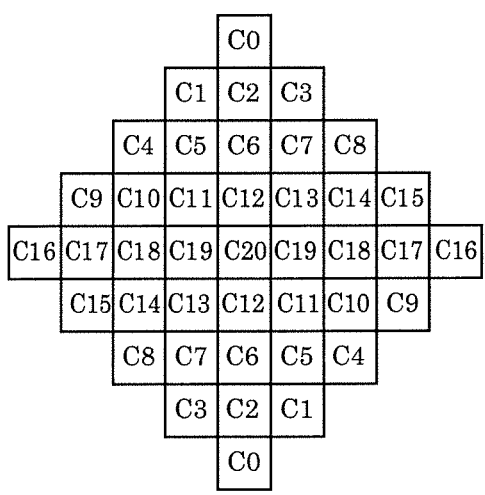
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter. FIG. 4B illustrates a 7×7 diamond shape filter, and FIG. 4C illustrates a 9×9 diamond shape filter. Information indicating the filter shape is signaled at the picture level. Note that the signaling of information indicating the filter shape need not be performed at the picture level, and may be performed at another level (for example, at the sequence level, slice level, tile level, CTU level, or CU Level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signaled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signaled at the picture level. Note that the signaling of the coefficients set need not be performed at the picture level, and may be performed at another level (for example, at the sequence level, slice level, tile level, CTU level, CU level, or sub-block level),

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPTL 1).

Figure 5A:
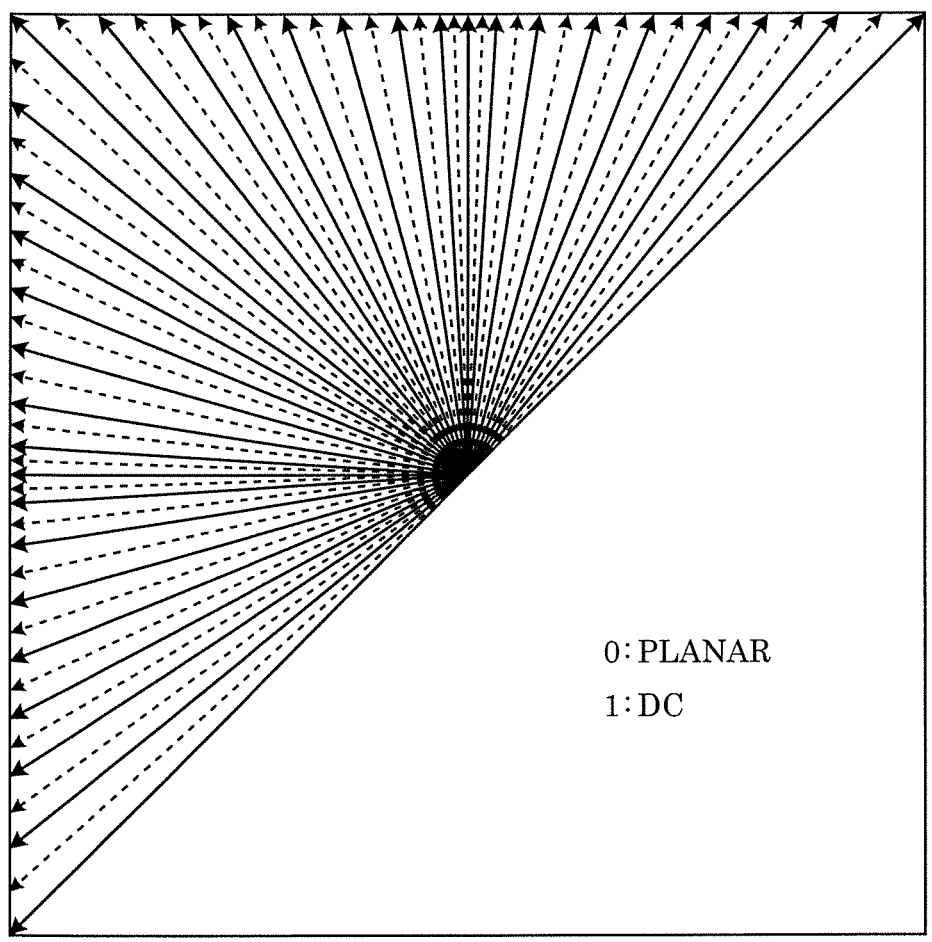
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signaled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signaled. A motion vector predictor may be used for the signaling of the motion vector. In other words, the difference between the motion vector and the motion vector predictor may be signaled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signaled at the sequence level. Moreover, information indicating whether to apply the OBMC mode or not (referred to as, for example, an OBMC flag) is signaled at the CU level. Note that the signaling of such information need not be performed at the sequence level and CU level, and may be performed at another level (for example, at the picture level, slice level, tile level, CTU level, or sub-block level).

Figure 5B:
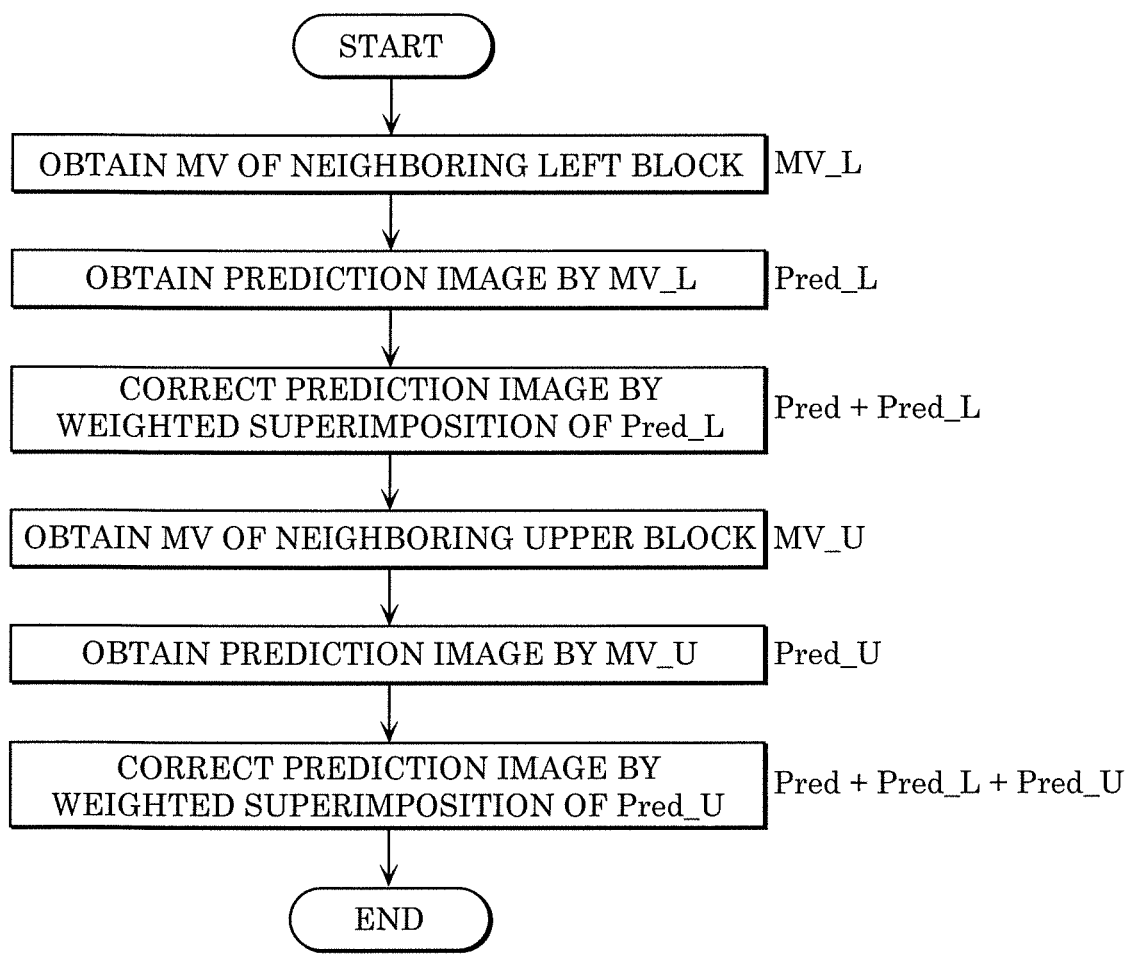
FIG. 5B is a flow chart for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred_L) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signaled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
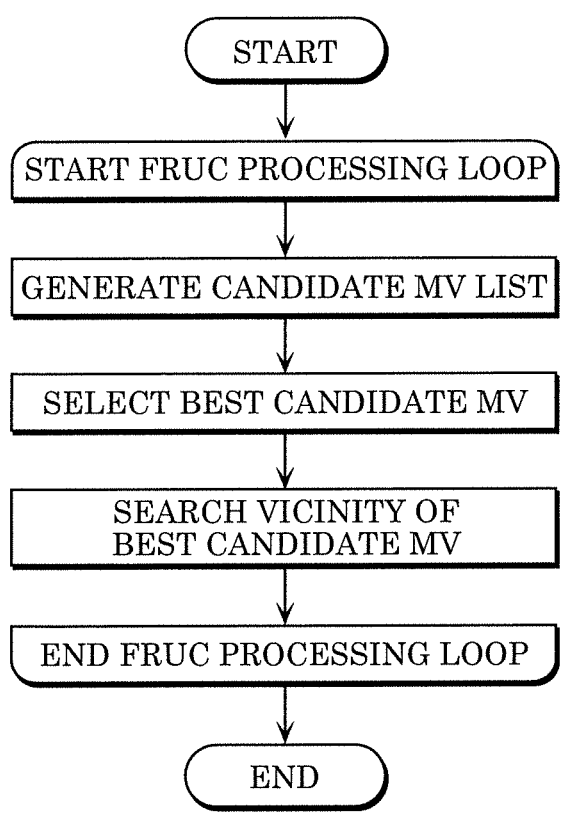
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
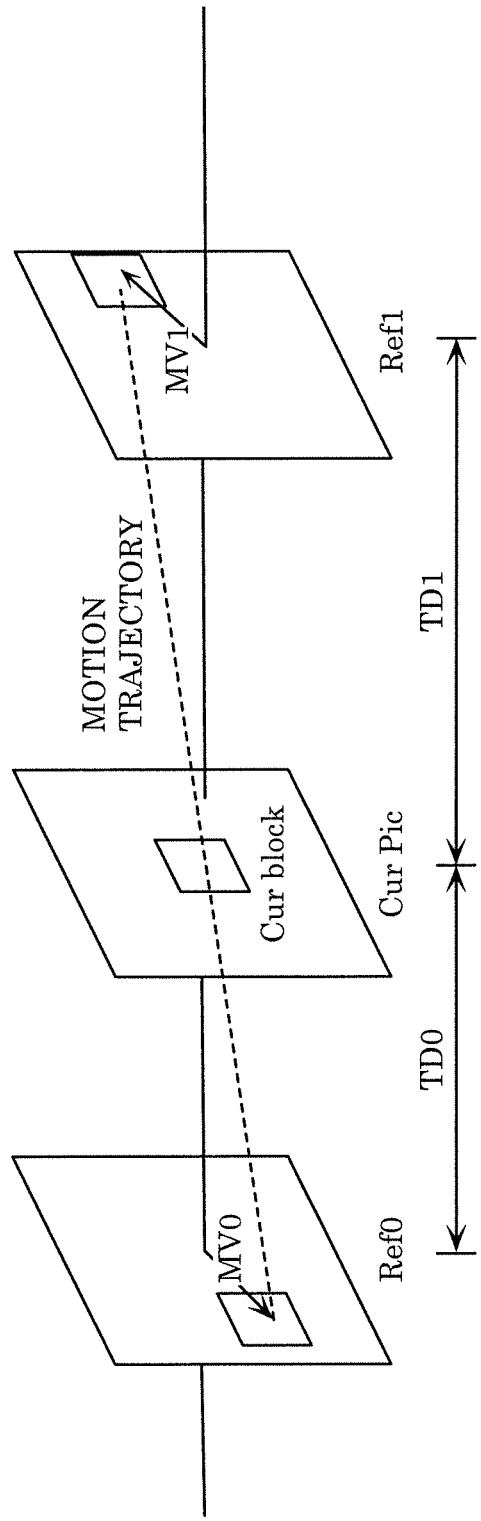
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur_Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
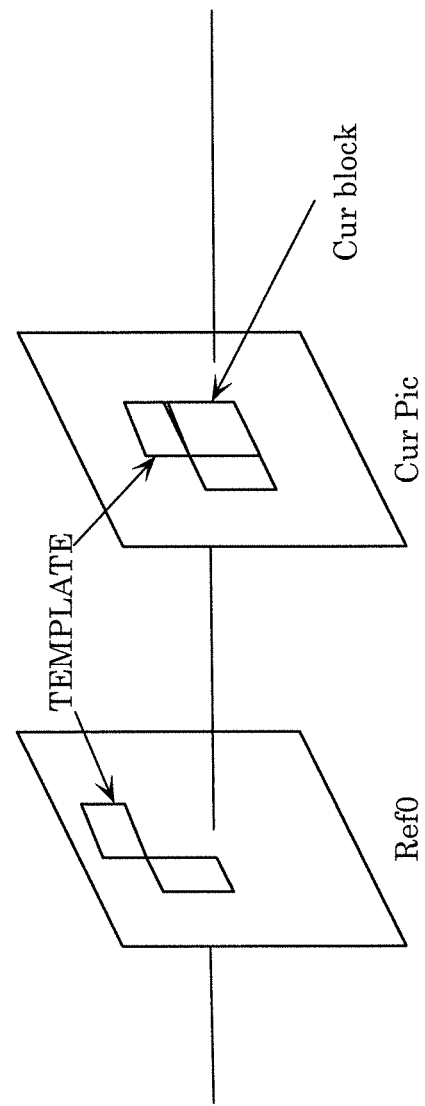
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signaled at the CU level. Moreover, when the FRUC mode is applied (for example, when the FRUC flag is set to true), information indicating the pattern matching method (first pattern matching or second pattern matching) is signaled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
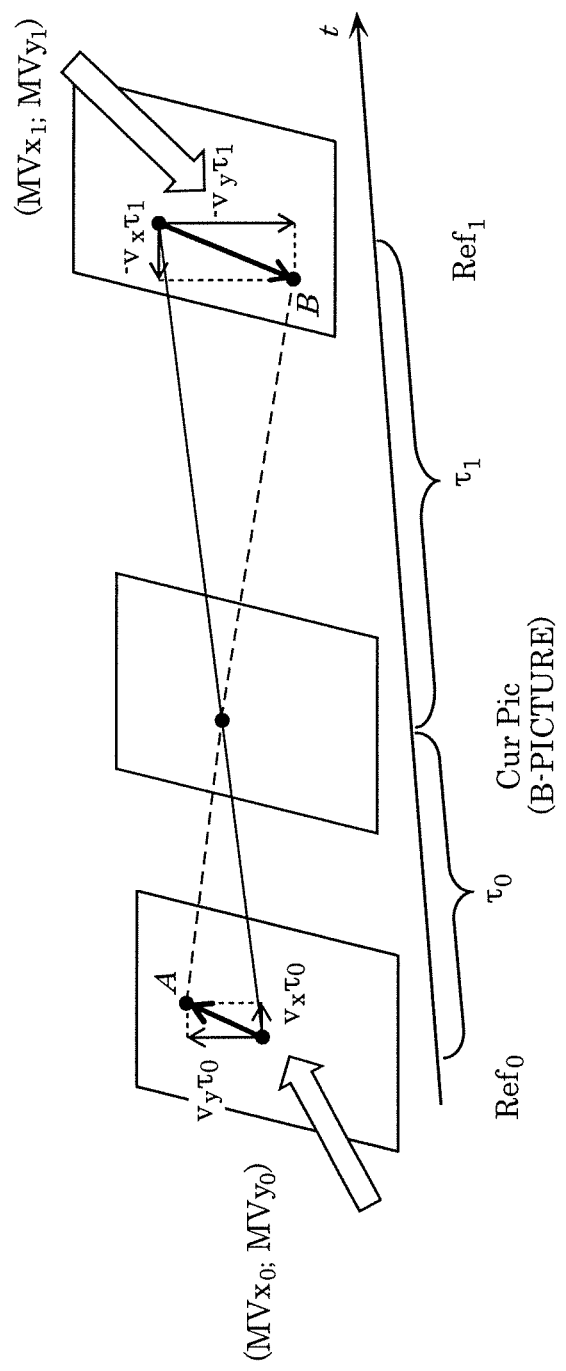
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \qquad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
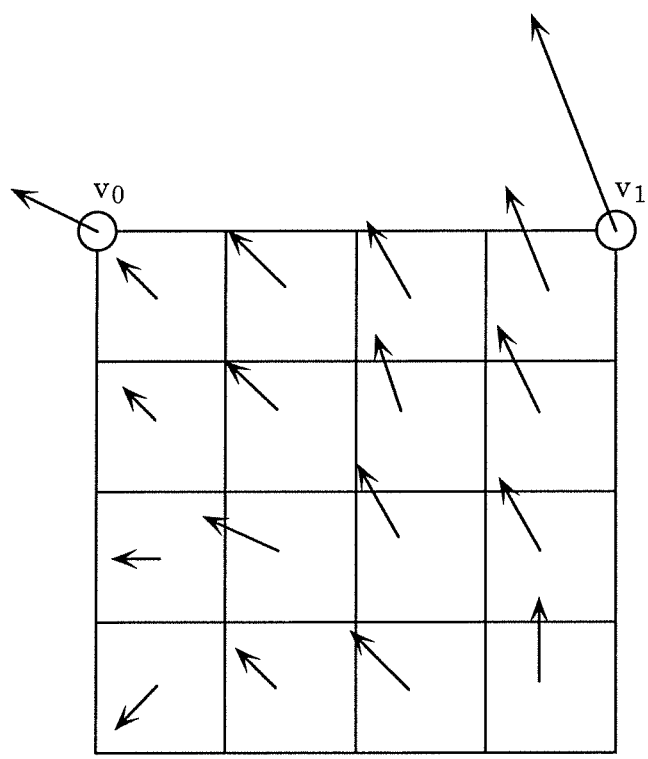
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

Math. 2

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \qquad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signaled at the CU level. Note that the signaling of information indicating the affine motion compensation prediction mode need not be performed at the CU level, and may be performed at another level (for example, at the sequence level, picture level, slice level, tile level, CTU level, or sub-block

[Prediction Controller]

Prediction controller 128 selects either the intra prediction signal or the inter prediction signal, and outputs the selected prediction signal to subtractor 104 and adder 116.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final. MV may be determined by performing DMVR processing (to be described later) by using the MV of the current block derived via merge mode.

Here, an example of determining an MV by using DMVR processing will be given.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
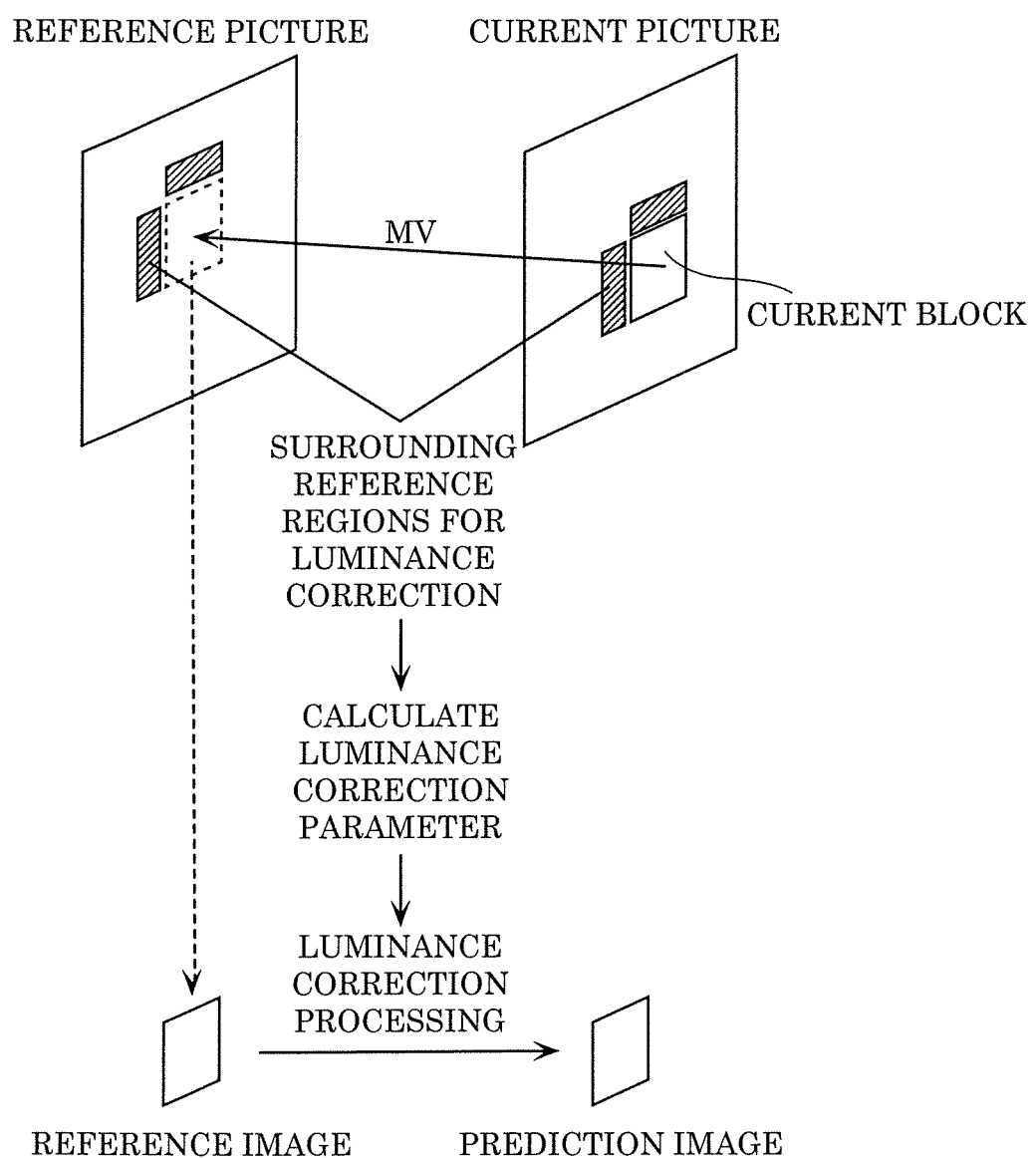
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
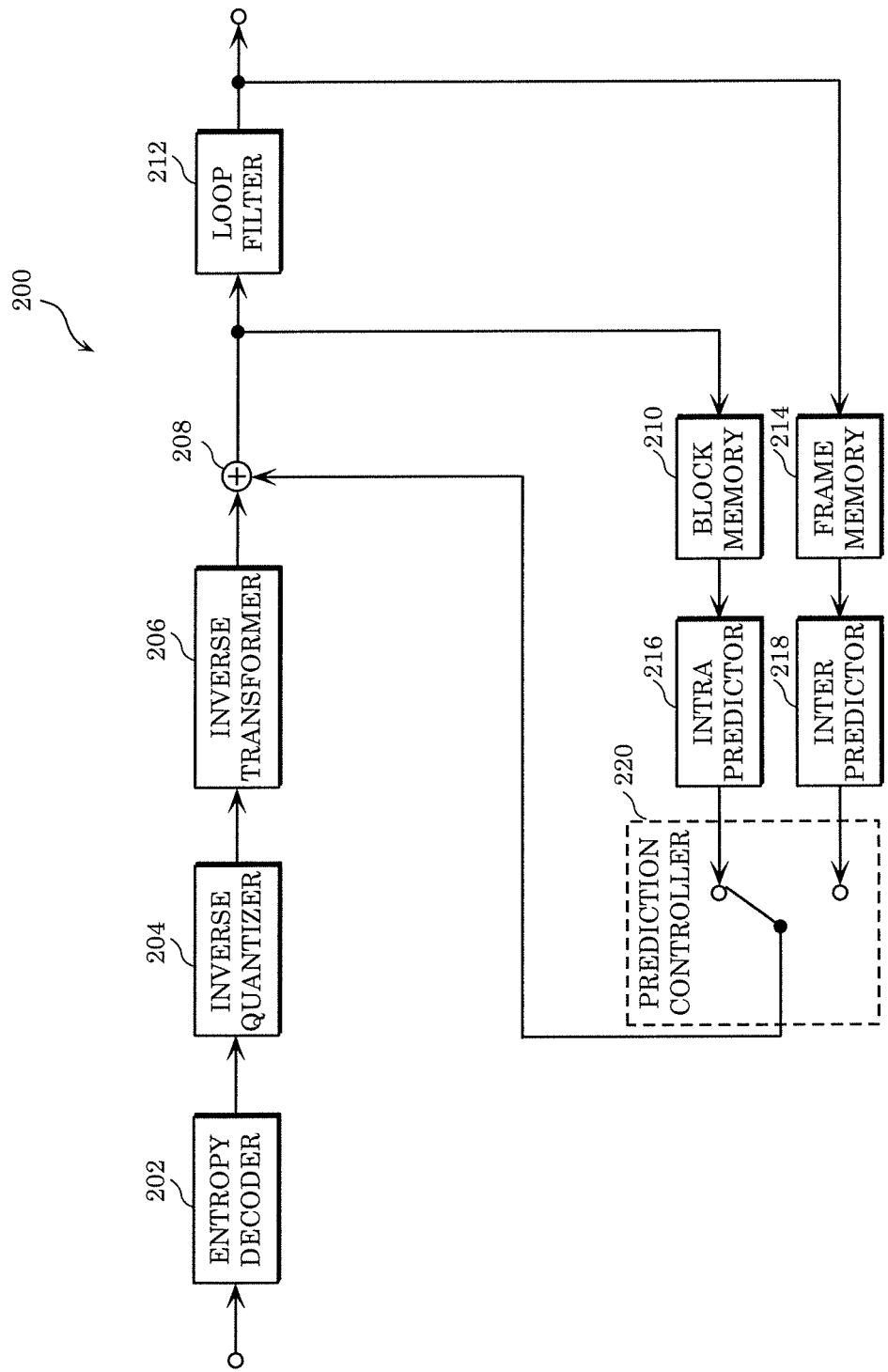
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Infra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BM mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[An Example of a First Pipeline Structure]

Figure 11:
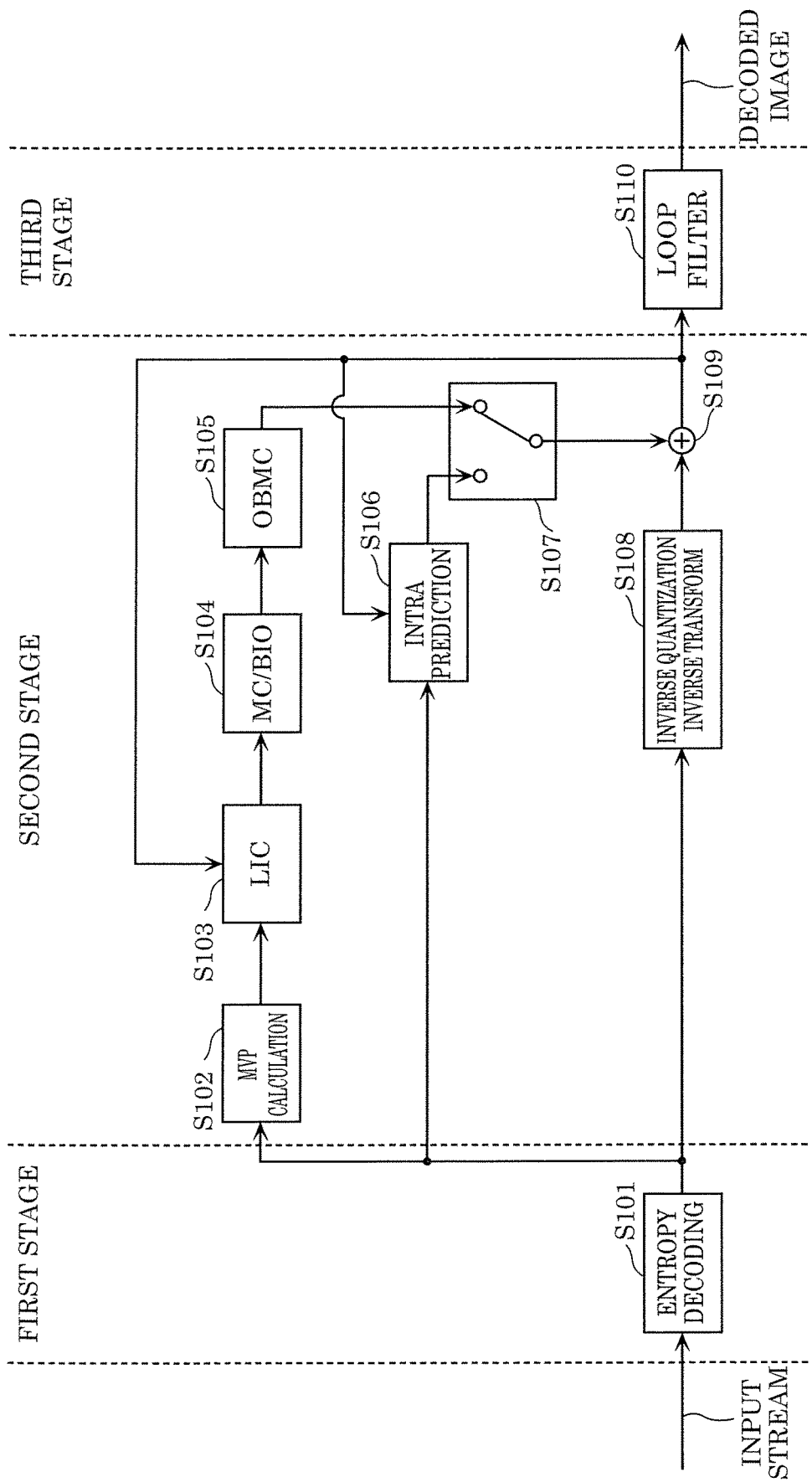
FIG. 11 is a schematic diagram indicating an example of a first pipeline structure.

FIG. 11 is a schematic diagram indicating an example of a first pipeline structure. The example of the first pipeline structure indicated in FIG. 11 is an example of a pipeline structure for decoding an image, and may be used by decoder 200.

The example of the first pipeline structure includes three stages which are a first stage, a second stage, and a third stage in addition, the first stage includes entropy decoding (S101). The second stage includes: MVP calculation (S102); LIC (S103); MC/BIO (S104); OBMC (S105); intra prediction (S106); switch (S107); inverse quantization and inverse transform (S108); and addition (S109). The third stage includes loop filter (S110).

In entropy decoding (S101), for example, entropy decoder 202 of decoder 200 performs variable length decoding on an input stream. In this way, entropy decoder 202 obtains quantized coefficients, etc.

In MVP calculation (S102), inter predictor 218 of decoder 200 calculates a motion vector predictor (MVP) of a current coding unit to be processed. For example, inter predictor 218 calculates a plurality of motion vector predictors for the current coding unit, as a plurality of candidates for motion vectors for the current coding unit. Inter predictor 218 then determines a motion vector for the current coding unit among the plurality of candidates.

In LIC (S103), inter predictor 218 generates or corrects a prediction image for the current coding unit by a local illumination compensation (LIC) process.

For example, inter predictor 218 calculates a luminance correction parameter, using a pixel value in a different region outside the current coding unit. Specifically, inter predictor 218 derives the luminance correction parameter, using a luminance around the current coding unit, and a luminance around a reference block which is identified by the motion vector for the current coding unit Inter predictor 218 then generates or corrects the prediction image for the current coding unit, using the luminance correction parameter.

More specifically, as indicated in FIG. 9D, a reference block in a reference picture is identified by a motion vector for a current coding unit (a current block to be encoded or a current block to be decoded). A luminance correction parameter is calculated according to change in luminance between an image region neighboring the current coding unit and an image region neighboring the reference block.

A prediction image is generated by means of a correction process on a reference image in the reference block being performed using the luminance correction parameter. Alternatively, a prediction image is corrected by means of a correction process on a prediction image derived from a reference image in the reference block being performed using the luminance correction parameter.

In MC/BIO (S104), inter predictor 218 generates or corrects a prediction image for the current coding unit by a bi-directional optical flow (BIO) process. For example, inter predictor 218 generates a prediction image for a current coding unit by a motion compensation (MC) process, and corrects the prediction image for the current coding unit by a BIO process.

Specifically, inter predictor 218 identifies a reference block by a motion vector for a current coding unit, and corrects a prediction image using a spatial gradient of luminance obtainable from the reference block. The spatial gradient of luminance obtainable from the reference block may be a spatial gradient of luminance in an image obtainable from the reference block. The image obtainable from the reference block may be a reference image or a prediction image. The prediction image may be an image which has been motion compensated at a sub-pixel accuracy.

For example, as indicated in FIG. 8, inter predictor 218 identifies two reference blocks by two motion vector predictors for a current coding unit to be processed, and obtains two prediction images from the two reference blocks. Inter predictor 218 then obtains a spatial gradient of luminance for each of the two prediction images to obtain two gradient images.

Inter predictor 218 then derives a plurality of new prediction pixel values at a plurality of pixel positions, based on a plurality of pixel values at a plurality of pixel positions in the two prediction images, a plurality of gradient values at a plurality of pixel positions in the two gradient images, an optical flow equation, etc. In this way, inter predictor 218 generates a prediction image to which a BIO process has been applied. In other words, inter predictor 218 corrects the prediction image by the BIO process.

In OBMC (S105), inter predictor 218 generates or corrects a prediction image for the current coding unit by an overlapped block motion compensation (OBMC) process. For example, the prediction image for the current coding unit is generated or corrected using a reference image identified by a motion vector for the current coding unit and a reference image identified by a motion vector for a neighboring coding unit which neighbors the current coding unit.

More specifically, as indicated in FIGS. 5B and 5C, inter predictor 218 identifies a reference block specified by a motion vector for the current coding unit. In addition, inter predictor 218 identifies at least one reference block specified by at least one motion vector for at least one coding unit which neighbors the current coding unit.

Inter predictor 218 then generates a new prediction image by synthesizing a plurality of prediction images obtainable from a plurality of reference images in the plurality of reference blocks. In other words, inter predictor 218 corrects the prediction image obtainable by the motion vector for the current coding unit, using a reference image obtainable by a motion vector for a processed surrounding coding unit. Here, a processed surrounding coding unit is a coding unit which has been processed and located around the current coding unit.

In intra prediction (S106), intra predictor 216 of decoder 200 generates a prediction image for the current coding unit by referring to a coding unit in a current picture to be processed.

In switch (S107), switching is performed between a prediction image obtainable by inter prediction including MVP calculation (S102), LIC (S103), MC/BIO (S104), OBMC (S105), etc. and a prediction image obtainable by intra prediction (S106).

In inverse quantization and inverse transform (S108), inverse quantizer 204 and inverse transformer 206 of decoder 200 perform inverse quantization and inverse transform on quantized coefficients. In this way, inverse quantizer 204 and inverse transformer 206 reconstruct a difference image which is a prediction error between an original image and a prediction image.

In addition (S109), adder 208 of decoder 200 adds the difference image and the prediction image to reconstruct the original image. In other words, adder 208 generates the reconstructed image.

In loop filter (S110), loop filter 212 of decoder 200 applies a filter to the reconstructed image. In this way, for example, loop filter 212 reduces distortion between coding units. Loop filter 212 then outputs the filtered reconstructed image.

The reconstructed image reproduced at the second stage is to be referred to in the processing of a neighboring coding unit, and thus is fed back to LIC (S103) and intra prediction (S106). In the example of the first pipeline structure, a feedback is included in the second stage and is not across a plurality of stages. Thus, a reconstructed image of a coding unit which immediately precedes the current coding unit in processing order can be referred to in LIC (S103) and intra prediction (S106).

In contrast, in the example of the first pipeline structure, the second stage includes many processes. Accordingly, the processing time in the second stage is long.

It is to be noted that the processing time corresponds to the amount of processing or the number of processing cycles. In addition, the example of the first pipeline structure is an example of a pipeline structure. Part of the processing may be removed, other partial processing may be added, or a method for dividing into stages may be changed. For example, a prediction image may be generated by performing motion compensation (MC) after MVP calculation. Subsequently, the prediction image may be corrected by performing a LIC process, a BIO process, and an OBMC process.

Figure 12:
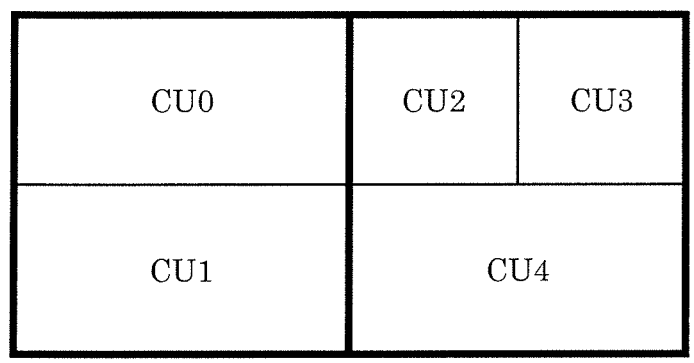
FIG. 12 is a schematic diagram indicating an example of block splitting for use in explanation of pipeline processing.

FIG. 12 is a schematic diagram indicating an example of block splitting for use in explanation of pipeline processing. The example of block splitting indicated in FIG. 12 shows two coding tree units. One of the coding tree units includes two coding units CU0 and CU1, and the other coding tree unit includes three coding units CU2, CU3 and CU4.

Coding units CU0, CU1, and CU4 are mutually the same in size. Coding units CU2 and CU3 are mutually the same in size. The size of each of coding units CU0, CU1, and CU4 is twice the size of each of coding units CU2 and CU3.

It is to be noted that the coding tree unit is a block which includes at least one coding unit and is a square block having a predetermined size. For example, a plurality of coding tree units included in a plurality of pictures included in a video have a predetermined common size. A coding unit is a rectangular block included in a coding tree unit and has a variable size. For example, the size of each coding unit included in a coding tree unit may be determined in units of a coding tree unit.

Figure 13:
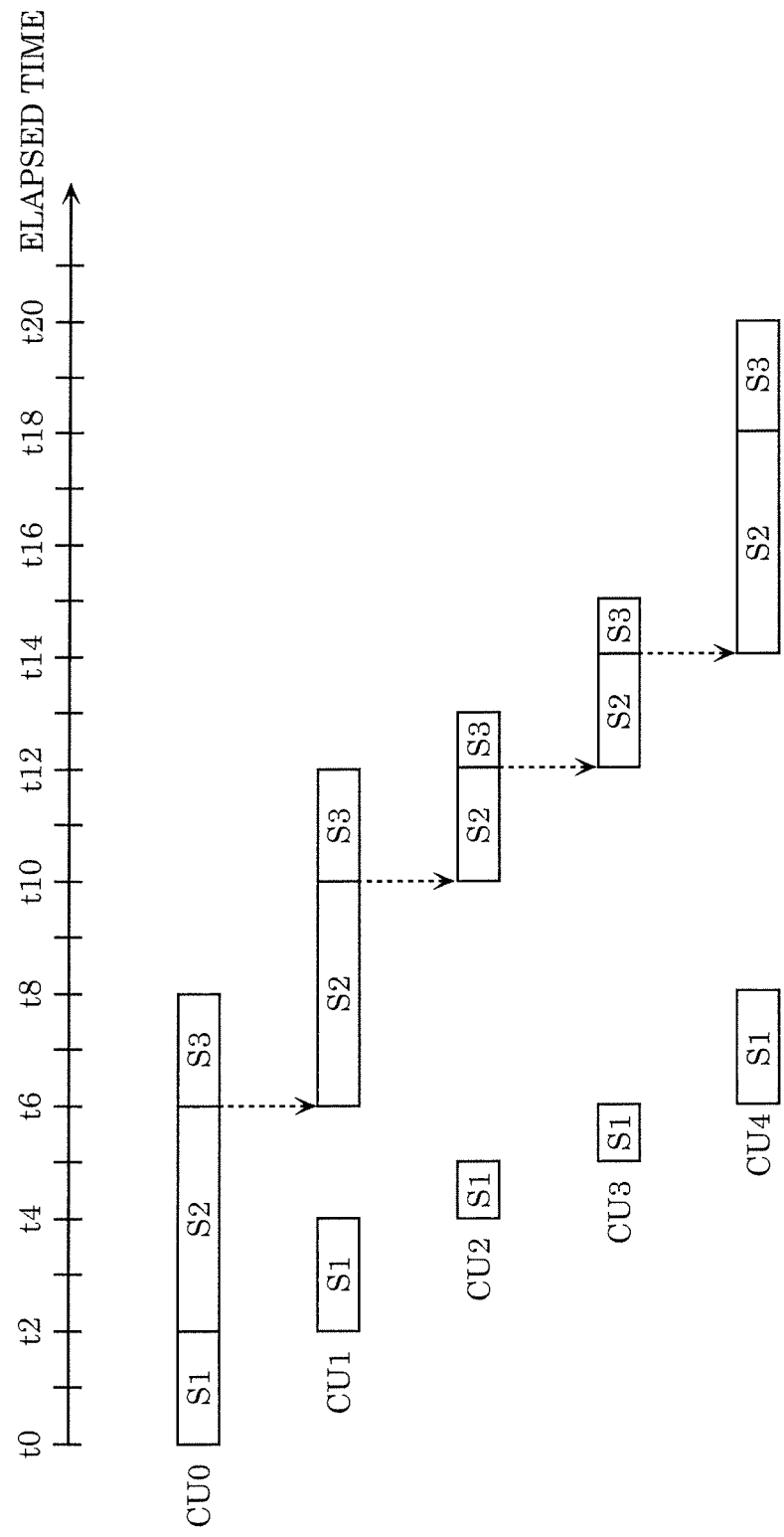
FIG. 13 is a time chart indicating an example of processing timing in the example of the first pipeline structure.

FIG. 13 is a time chart indicating an example of processing timing in the example of the first pipeline structure. FIG. 13 indicates processing timing for each of five coding units CU0 to CU4 indicated in FIG. 12. In addition, S1 to S3 in FIG. 13 indicate processing time in the first stage to the third stage in FIG. 11.

Since the size of each of coding units CU0, CU1, and CU4 is twice the size of each of coding units CU2 and CU3, the processing time for each of coding units CU0, CU1, and CU4 at each stage is also twice the processing time of each of coding units CU2 and CU3. In addition, since the second stage includes many processes, the processing time in the second stage is twice the processing time in each of the other stages. In addition, in each stage, after a process in a stage for an immediately preceding coding unit is ended, a process in the same stage for a current coding unit is started.

For example, the process in the second stage for coding unit CU1 is started at time t6 which is the end time of the process in the second stage for coding unit CU0. In the case of coding unit CU0, the processing time in the second stage is twice the processing time in the first stage. This generates, for coding unit CU1, waiting time from time t4 which is the end time of the first stage to time t6 which is the start time of the second stage.

For each of coding unit CU1 and succeeding coding units, waiting time always occurs before start of the second stage. Waiting time for each of coding units CU1, CU2, CU3, and CU4 are accumulated. In the case of coding unit CU4, long waiting time occurs between time t8 which is the end time of the first stage and time t14 which is the start time of the second stage.

As a result, in the processing of one picture, processing time including the waiting time may increase to approximately twice the processing time which does not include unnecessary waiting time, which may make it difficult to complete the processing of all blocks in the picture within the time assigned to the picture.

[An Example of a Second Pipeline Structure]

Figure 14:
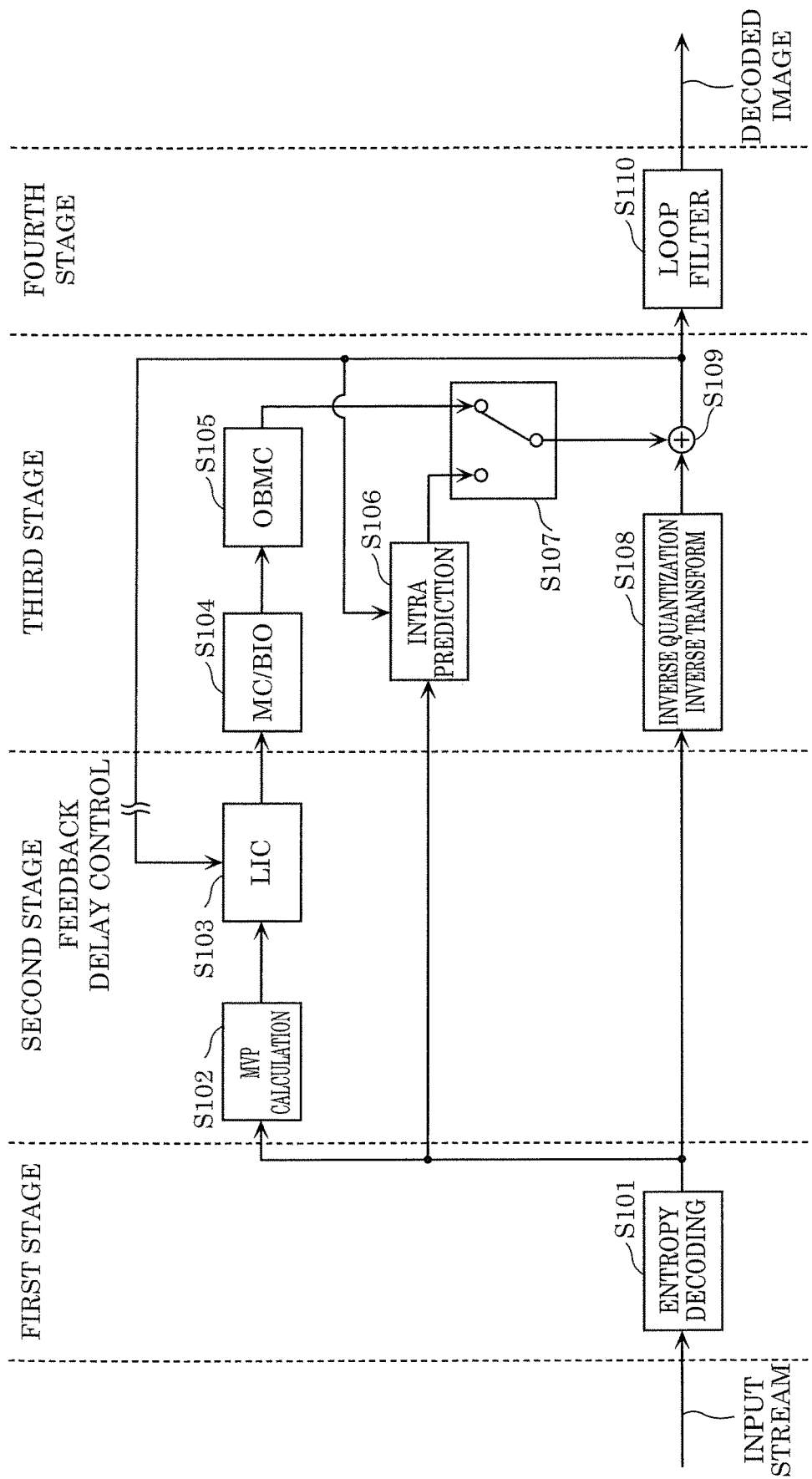
FIG. 14 is a schematic diagram indicating an example of a second pipeline structure.

FIG. 14 is a schematic diagram indicating an example of a second pipeline structure. In the example of the second pipeline structure in FIG. 14, the second stage in the example of the first pipeline structure in FIG. 11 is divided to two stages. In other words, the example of the second pipeline structure includes four stages which are a first stage, a second stage, a third stage, and a fourth stage.

In the example of the second pipeline structure, the first stage includes entropy decoding (S101). The second stage includes MVP calculation (S102) and LIC (S103). The third stage includes; MC/BIO (S104); OBMC (S105); intra prediction (S106); switch (S107); inverse quantization and inverse transform (S108); and addition (S109). The fourth stage includes loop filter (S110).

In addition, in the example of the second pipeline structure, LIC (S103) in which a reconstructed image is referred to and addition (S109) in which a reconstructed image is generated are performed at two different stages under feedback delay control. In this way, the processing time in each of the second stage and the third stage in the example of the second pipeline structure is reduced to approximately the half of the processing time required for the second stage in the example of the first pipeline structure.

It is to be noted that the feedback delay control is control for delaying a reconstructed image generated in a third stage and allowing the reconstructed image to be referred to in LIC (S103) in the second stage.

In addition, the example of the second pipeline structure is an example of a pipeline structure. Part of the processing may be removed, other partial processing may be added, or the method for dividing into stages may be changed. For example, a prediction image may be generated by performing motion compensation (MC) after MVP calculation. Subsequently, the prediction image may be corrected by performing a LIC process, a BIO process, and an OBMC process.

In addition, in the example of the second pipeline structure, intra prediction (S106) in which a reconstructed image is referred to and addition (S109) in which a reconstructed image is generated are performed at the same stage. In this way, a reconstructed image of a coding unit which immediately precedes a current coding unit can be referred to in intra prediction (S106).

Intra prediction (S106) is performed using a smaller amount of processing than the amount of processing required for inter prediction including MVP calculation (S102), LIC (S103), MC/BIO (S104), OBMC (105), etc. Accordingly, even when intra prediction (S106) and addition (S109) are performed at the same stage, waiting time is unlikely to be long compared to waiting time in inter prediction.

Thus, as described above, in the example of the second pipeline structure, intra prediction (S106) in which a reconstructed image is referred to and addition (S109) in which the reconstructed image is generated are performed at the same stage. However, intra prediction (S106) in which a reconstructed image is referred to and addition (S109) in which the reconstructed image is generated may be performed at two different stages under feedback delay control.

For example, in decoder 200, entropy decoder 202 performs entropy decoding (S101). In addition, inter predictor 218 performs: MVP calculation (S102); LIC (S103); MC/BIO (S104); and OBMC (S105).

In addition, intra predictor 216 performs intra prediction (S106). In addition, prediction controller 220 performs switching (S107). In addition, inverse quantizer 204 and inverse transformer 206 perform inverse quantization and inverse transform (S108). In addition, adder 208 performs addition (S109). In addition, loop filter 212 performs loop filter (S110).

A reconstructed image generated by adder 208 is stored in block memory 210. Inter predictor 218 performs LIC (S103) by referring to a reconstructed image stored in block memory 210.

In normal feedback control indicated in FIG. 11, a reconstructed image of a coding unit which immediately precedes a current coding unit is stored in block memory 210, and the reconstructed image is referred to at the time of the LIC (S103) process performed on the current coding unit. In the feedback delay control indicated in FIG. 14, a reconstructed image of a coding unit which immediately precedes a current coding unit is not stored in block memory 210, and the reconstructed image is not referred to at the time of the LIC (S103) process performed on the current coding unit.

Here, an example of decoder 200 is indicated, but encoder 100 also performs feedback delay control in the same manner as decoder 200. For example, decoder 200 and the plurality of constituent elements of decoder 200 may be replaced by encoder 100 and the plurality of constituent elements of encoder 100 in the descriptions provided here.

Figure 15:
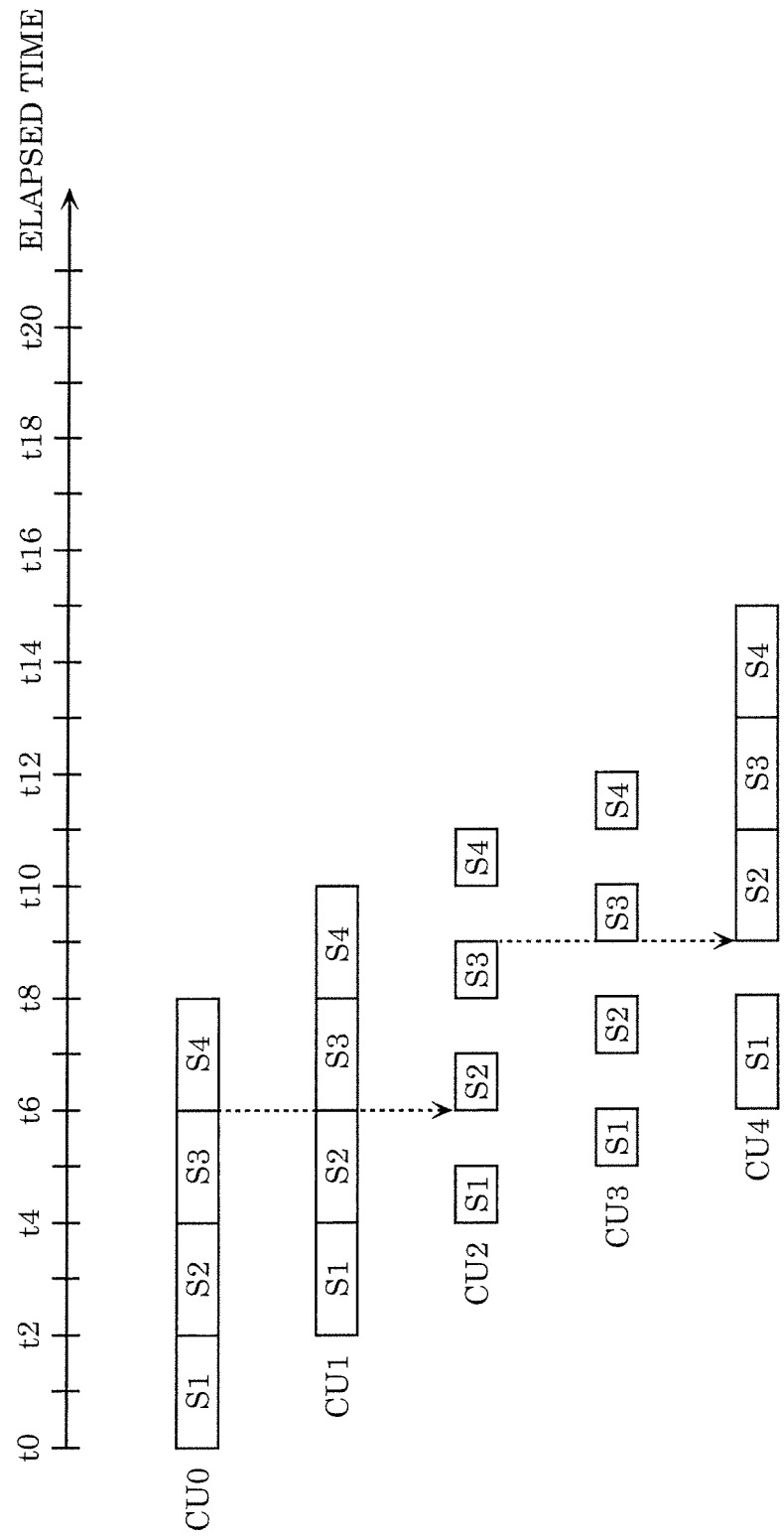
FIG. 15 is a time chart indicating an example of processing timing in the example of the second pipeline structure.

FIG. 15 is a time chart indicating an example of processing timing in the example of the second pipeline structure. FIG. 15 indicates processing timing for each of five coding units CU0 to CU4 indicated in FIG. 12. In addition, S1 to S4 in FIG. 15 indicates processing time in the first stage to the fourth stage in FIG. 14.

Similarly to the example of FIG. 13, since the size of each of coding units CU0, CU1, and CU4 is twice the size of each of coding units CU2 and CU3, the processing time for each of coding units CU0, all, and CU4 at each stage is also twice the processing time of each of coding units CU2 and CU3. However, since the second stage in the example of FIG. 13 has been divided into the two stages, the processing time for each of the two stages is equivalent to the processing time for each of the other stages.

In this example, the delay amount by which a reconstructed image is delayed under feedback delay control corresponds to one coding unit. In other words, in LIC (S103) on each coding unit, a coding unit which immediately precedes a current coding unit in processing order is prohibited from being referred to. Two coding units which immediately precede the current coding unit are not prohibited from being referred to.

For example, since coding unit CU3 is prohibited from being referred to in the second stage for coding unit CU4, a process in the second stage for coding unit CU4 is started without waiting for the end of the third stage for coding unit CU3. Since coding unit CU2 is not prohibited from being referred to, a process in the second stage for coding unit CU4 is started after the end of the third stage for coding unit CU2.

Accordingly, in the case of coding unit CU4, waiting time occurred between time t8 which is the end time of the first stage and time t9 which is the start time of the second stage. However, the waiting time in the example of FIG. 13 is significantly reduced to the waiting time here.

As a result, in the processing of one picture, it is likely that processing time including the waiting time is not increased significantly from the processing time which does not include unnecessary waiting time, and thus that the processing of all blocks in the picture can be completed within the time assigned to the picture.

Figure 16:
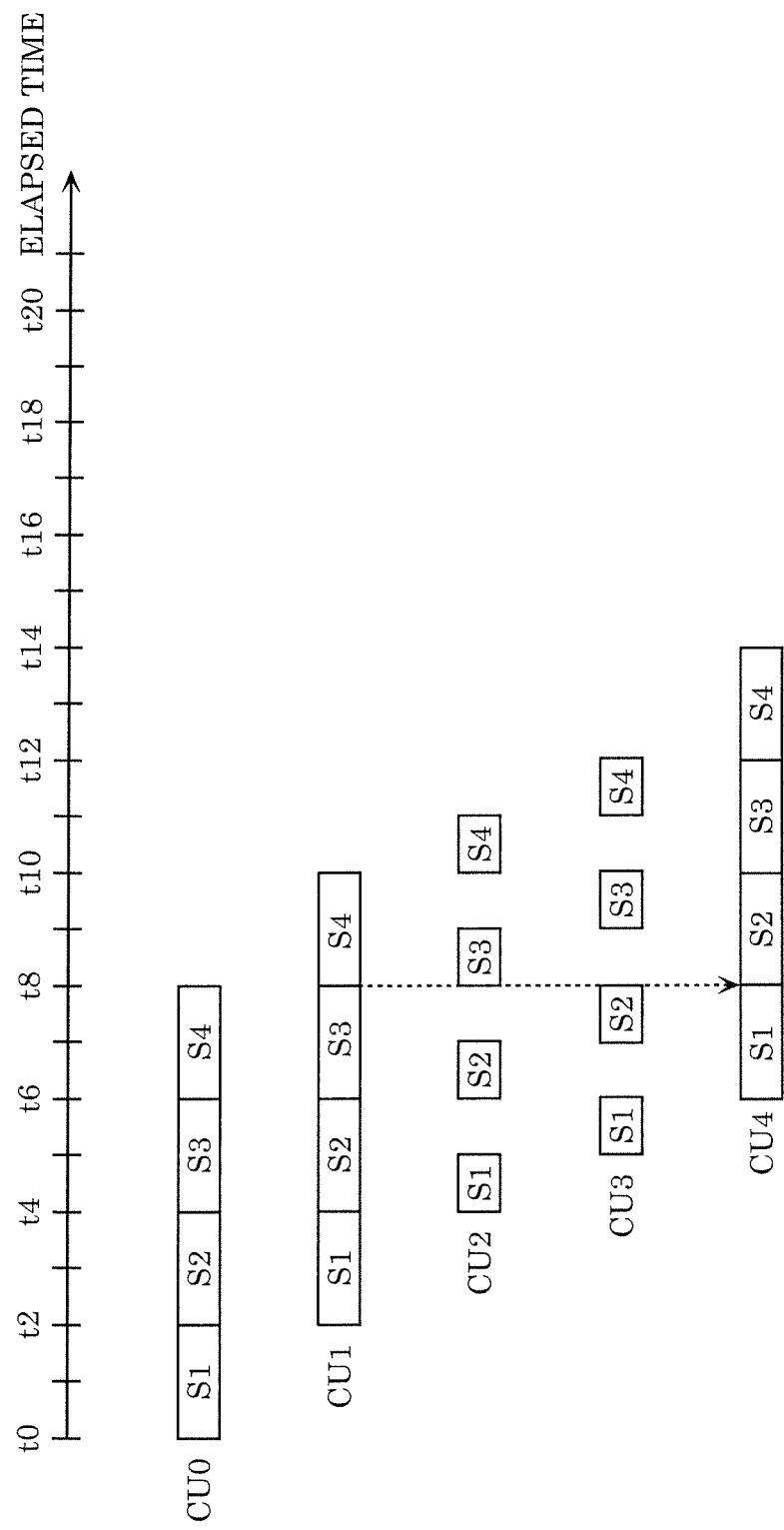
FIG. 16 is a time chart indicating another example of processing timing in the example of the second pipeline structure.

FIG. 16 is a time chart indicating another example of processing timing in the example of the second pipeline structure. This example is basically the same as the example of FIG. 15. However, the delay amount by which a reconstructed image is delayed under feedback delay control corresponds to two coding units. In other words, in LIC (S103) on each coding unit, two coding units which immediately precede a current coding unit in processing order are prohibited from being referred to. Coding units which precede the immediately-preceding two coding units are not prohibited from being referred to.

For example, in the process in the second stage for coding unit CU4, coding units CU2 and CU3 are prohibited from being referred to. For this reason, the process in the second stage for coding unit CU4 is started without waiting for the end of the third stage for coding units CU2 and CU3.

In contrast, in the process in the second stage for coding unit CU4, coding unit CU1 is not prohibited from being referred to. Coding unit CU1 can be referred to at and from time t8 which is the end time of the third stage for coding unit CU1. At time t8, the process in the first stage for coding unit CU4 ends.

Accordingly, in the case of coding unit CU4, the process in the second stage is started without waiting time from time t8 which is the end time of the first stage. As a result, in the processing of one picture, it is likely that processing time including the waiting time is not increased significantly from the processing time which does not include unnecessary waiting time, and thus that the processing of all blocks in the picture can be completed within the time assigned to the picture.

It is to be noted that, in the example of FIG. 16, a process is performed without waiting time, with the delay amount corresponding to two coding units. In other words, a plurality of stages are sequentially performed on one coding unit, without waiting time between the stages. However, even with the delay amount corresponding to the two coding units, waiting time may occur depending on the way of block splitting.

In order to prevent occurrence of such waiting time, a delay amount larger than the delay amount corresponding to two coding units may be used. This increases the possibility that the processes in the third stages for coding units which precede coding units the number of which corresponds to the delay amount end while the second stages for the coding units corresponding to the delay amount are being performed. Accordingly, the use of the delay amount larger than the delay amount corresponding to two coding units prevents occurrence of waiting time.

In order to further prevent occurrence of such waiting time, the delay amount corresponding to a coding tree unit may be used. In other words, a delay amount corresponding to a partial area of coding units which corresponds to the entire area of a coding tree unit may be used. The processes in the third stages for the coding units corresponding to the coding tree unit and preceding a current coding unit end while the process in the second stages for the coding units in the current coding tree unit is being performed. Accordingly, the use of the delay amount corresponding to the coding tree unit further prevents occurrence of waiting time.

In the above description, the number of coding units corresponding to the delay amount in feedback delay control equals to the number of coding units which are prohibited from being referred to according to a processing order. However the number of coding units which are prohibited from being referred to according to a processing order may be larger than the number of coding units corresponding to the delay amount in feedback delay control. In addition, the delay amount in feedback delay control may be equal to or larger than the difference between a stage in which a LIC process is performed and a stage in which a reconstruction process is performed.

[A LIC Process]

Figure 17:
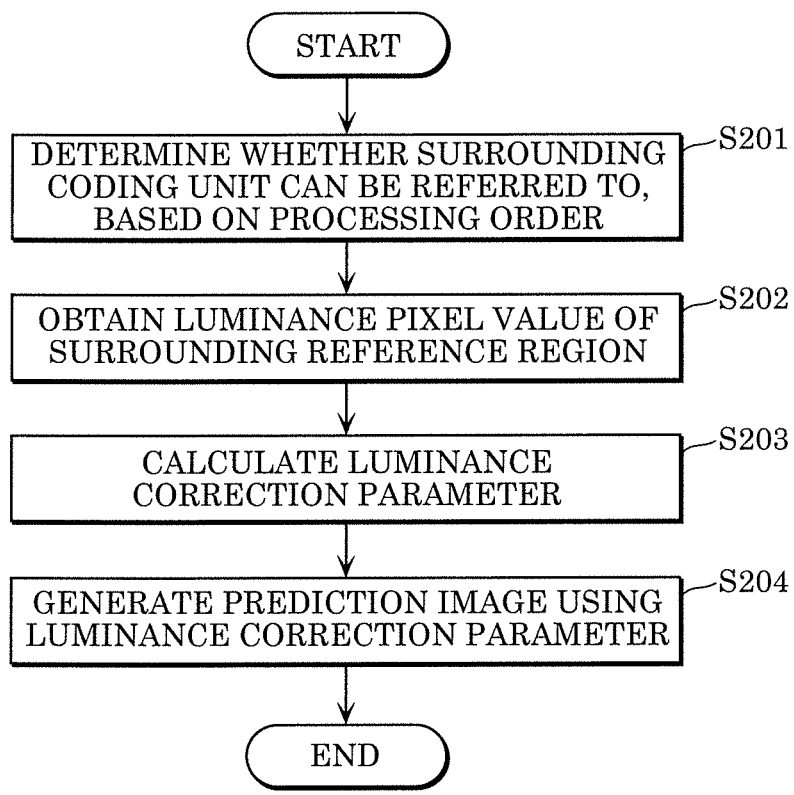
FIG. 17 is a flowchart indicating a local illumination compensation (LIC) process.

FIG. 17 is a flowchart indicating a LIC process. In the LIC process, a luminance correction parameter is derived using a luminance pixel of a surrounding reference region relative to a current block to be processed and a luminance pixel value of a surrounding reference region in a reference block, and a prediction image is generated or corrected according to the luminance correction parameter (see FIG. 9D). For example, decoder 200 indicated in FIG. 10 generates or corrects a prediction image for a current coding unit according to a method indicated in FIG. 17.

Specifically, inter predictor 218 of decoder 200 obtains a motion vector for identifying the reference block in the reference picture for the current coding unit before the LIC process. Here, the reference picture is a processed picture. Inter predictor 218 then obtains a reference image which is an image of the reference block specified by the motion vector.

Next, inter predictor 218 determines whether each of processed surrounding coding units can be referred to according to a processing order (S201). In particular, inter predictor 218 determines whether each of processed surrounding coding units located to the left of or above the current coding unit according to the difference in processing order between the current coding unit and the processed surrounding coding unit.

For example, inter predictor 218 compares the number corresponding to the delay amount in feedback delay control and the number corresponding to the difference in processing order between the current coding unit and the processed surrounding coding unit.

In the case where the number corresponding to the difference in processing order is smaller than the number corresponding to the delay amount, inter predictor 218 then determines that the processed surrounding coding unit cannot be referred to. In other words, in this case, inter predictor 218 determines that the processed surrounding coding unit is prohibited from being referred to. In the opposite case where the number corresponding to the difference in processing order is larger than or equal to the number corresponding to the delay amount, inter predictor 218 then determines that the processed surrounding coding unit can be referred to. It is to be noted that a predetermined number larger than or equal to the number corresponding to the delay amount may be used instead of the number corresponding to the delay amount.

Next, inter predictor 218 obtains a luminance pixel value of a surrounding reference region relative to the current coding unit and a luminance pixel value of a surrounding reference region in a reference block (S202).

Here, the surrounding region relative to the current coding unit is determined within at least one processed reference surrounding coding unit determined to be available. The surrounding reference region in the reference block is determined so that the position relative to the reference block in the surrounding reference region in the reference block is co-located with the position relative to the current coding unit in the surrounding reference region relative to the current coding unit.

More specifically, for example, when the surrounding reference region relative to the current coding unit is determined at the position to the left of the current coding unit, the surrounding reference region in the reference block is determined at the position to the left of the reference block.

In addition, for example, when the surrounding reference region relative to the current coding unit is determined at the position above the current coding unit, the surrounding reference region in the reference block is determined at the position above the reference block.

The surrounding region relative to the current coding unit may be a partial region determined within at least one processed reference surrounding coding unit determined to be available. For example, the surrounding reference region in the current coding unit may be a pixel region which neighbors the current coding unit among regions included in the at least one processed reference surrounding coding unit determined to be available. Next, inter predictor 218 obtains a luminance pixel value in a surrounding reference region relative to the current coding unit and a luminance pixel value in a surrounding reference region in a reference block (S203). For example, inter predictor 218 extracts, using these luminance pixel values, information indicating how the luminance values have changed between the current picture including the current coding unit and the reference picture including the reference block, and derives a luminance correction parameter according to the information.

The luminance correction parameter is, for example, a parameter for linear transform on the luminance pixel values. Specifically, the luminance correction parameter may be $\alpha$ and $\beta$ for performing linear transform on the luminance pixel values according to $\alpha \times a$ luminance value$+\beta$. In addition, when linear transform has been performed on a luminance pixel value in the surrounding reference region in the reference block, inter predictor 218 derives a luminance correction parameter that yields a result close to a luminance pixel value in the surrounding reference region relative to the current coding unit.

Inter predictor 218 then generates a prediction image using the luminance correction parameter (S204). For example, inter predictor 218 generates a prediction image for the current coding unit from a reference image by performing, using the luminance correction parameter, a correction process on the reference image identified by a motion vector for the current coding unit. In other words, inter predictor 218 corrects the prediction image generated from the reference image using the luminance correction parameter.

Inter predictor 218 repeats the processes (S201 to S204) for each coding unit. It is to be noted that inter predictor 218 may perform the same processes for each sub block obtainable by further splitting the coding unit, not for each coding unit.

In the above description, inter predictor 218 of decoder 200 performs a LIC process, but inter predictor 126 of encoder 100 also performs a LIC process in the same manner as performed by inter predictor 218 of decoder 200. In addition, in decoder 200, a constituent element different from inter predictor 218 may perform a LIC process. Likewise, in encoder 100, a constituent element different from inter predictor 126 may perform a LIC process.

In addition, entropy encoder 110 of encoder 100 may encode a parameter related to a determination (S201) as to reference availability, in a sequence header area, a picture header area, a slice header area, or a supplemental information area. In addition, entropy decoder 202 of decoder 200 may decode the parameter related to a determination (S201) as to reference availability, from the sequence header area, the picture header area, the slice header area, or the supplemental information area.

Here, the sequence header area is a region in which a common parameter is stored in an image stream. The sequence header area may be, for example, a sequence parameter set (SPS). In addition, the picture header area is a region in which a common parameter is stored in a picture of an image. The picture header area may be, for example, a picture parameter set (PPS). In addition, the slice header area is a region in which a common parameter is stored in a slice of the image.

In addition, the supplemental information area is a region which stores a parameter other than a plurality of parameters stored in the sequence header area, picture header area, and slice header area. The supplemental information area may be supplemental enhancement information (SEI). In addition, the supplemental information area may be a tile header area in which, for example, a common parameter is stored in a tile of the image.

The parameter related to the determination (S201) on reference availability may indicate whether a determination is made, or the number corresponding to a delay amount in feedback delay control. In addition, the parameter related to the determination on reference availability may indicate the number of coding units which are prohibited from being referred to, or the difference between the stage in which a LIC process is performed and the stage in which a reconstruction process is performed.

In encoder 100, inter predictor 126 then controls the determination on the reference availability according to the parameter related to the determination on the reference availability. Likewise, in decoder 200, inter predictor 218 then controls the determination on the reference availability according to the parameter related to the determination on the reference availability.

In addition, in encoder 100, inter predictor 126 may determine the parameter related to the reference availability, according to a picture size, the processing capability of encoder 100, the processing capability of decoder 200, a profile, a level, or a combination of these. In addition, in decoder 200, inter predictor 218 may determine the parameter related to the reference availability, according to a picture size, the processing capability of encoder 100, the processing capability of decoder 200, a profile, a level, or a combination of these.

The size of a picture corresponds to the number of pixels in the picture. For example, when the size of a picture is larger than or equal to an upper limit, inter predictors 126 and 218 may determine that a processed surrounding coding unit cannot be referred to regardless of the processing order. In other words, when the size of the picture is larger than or equal to the upper limit, the processed surrounding coding unit may not be referred to without such a determination. In this case, no LIC process is performed.

Alternatively, when the size of a picture is smaller than or equal to a lower limit, inter predictors 126 and 218 may determine that a processed surrounding coding unit can be referred to regardless of the processing order. In other words, when the size of the picture is smaller than or equal to the lower limit, the processed surrounding coding unit may not be referred to without such a determination.

In addition, for example, inter predictors 126 and 218 may increase the number of coding units which are prohibited from being referred to as the size of the picture is larger. In this way, the processing delay is reduced although a processing delay is considered to be larger as the size of a picture is larger.

In addition, for example, when the processing capability of decoder 200 is lower than or equal to the lower limit, inter predictors 126 and 218 may determine that a processed surrounding coding unit cannot be referred to regardless of the processing order. In other words, when the processing capability of decoder 200 is lower than or equal to the lower limit, the processed surrounding coding unit may not be referred to without such a determination. In this case, no LIC process is performed.

Alternatively, when the processing capability of decoder 200 is higher than or equal to the upper limit, inter predictors 126 and 218 may determine that a processed surrounding coding unit can be referred to regardless of the processing order. In other words, when the processing capability of decoder 200 is higher than or equal to the upper limit, the processed surrounding coding unit can be referred to without such a determination.

In addition, for example, inter predictors 126 and 218 may increase the number of coding units which are prohibited from being referred to as the processing capability of decoder 200 is lower. In this way, the processing delay is reduced although the processing delay is considered to be larger as the processing capability of decoder 200 is lower.

In addition, a parameter related to a determination on reference availability may be determined according to the processing capability of encoder 100, instead of the processing capability of decoder 200. In addition, a parameter related to a determination on reference availability may be determined according to a combination of the processing capability of decoder 200 and the processing capability of encoder 100. For example, a parameter related to a determination on reference availability may be determined according to a lower one of the processing capability of decoder 200 and the processing capability of encoder 100.

Here, encoder 100 is capable of obtaining the processing capability of encoder 100 from each constituent element, etc. of encoder 100, and decoder 200 is capable of obtaining the processing capability of decoder 200 from each constituent element, etc. of decoder 200. By information exchange which is performed in advance, encoder 100 is capable of obtaining the processing capability of decoder 200 from decoder 200, and decoder 200 is capable of obtaining the processing capability of encoder 100 from encoder 100.

Alternatively, when encoder 100 and decoder 200 are integrally configured, encoder 100 and decoder 200 may determine the processing capabilities of encoder 100 and decoder 200 without performing such information exchange.

In addition, a profile indicates technical requirements determined for an image stream. The technical requirements correspond to a set of functions. More specifically, the technical requirements correspond to a color space format, a color depth size, availability of an entropy slice, etc. In addition, a level indicates, as a numeral, a parameter requirement determined for the image stream. The parameter requirements correspond to a processing load, the amount of use in memory, etc. More specifically, the parameter requirements correspond to a maximum bit rate, a maximum sampling rate, a maximum picture size, etc.

The profile and level may be determined in advance. Inter predictors 126 and 218 may determine, for example, whether to determine reference availability, the number of coding units which are prohibited from being referred to, according to such a profile and level.

As described above, the surrounding reference region in the current coding unit is, for example, a region which is included in at least one processed reference surrounding coding unit determined to be available and is a region of a pixel located to the left of or above the current coding unit. A luminance correction parameter is derived according to a luminance pixel value of a surrounding reference region relative to the current coding unit and a luminance pixel value of a surrounding reference region in a reference block. A prediction image is then generated and corrected using the luminance correction parameter.

It is to be noted that the shape of a surrounding reference region is not limited to the example in FIG. 9D. Another shape is possible for a region included in at least one processed reference surrounding coding unit determined to be available. For example, a surrounding reference region may include a pixel region which does not directly neighbor the current coding unit.

[A First Determination Method for Determining Reference Availability in A LIC Process]

Inter predictors 126 and 218 may prohibit reference to at least one coding unit corresponding to the entire area of a coding tree unit which precedes a current coding unit in processing order. The prohibition control is replaced with control for not prohibiting reference to at least one processed surrounding coding unit which neighbors above the current tree unit and prohibiting reference to the other processed surrounding coding units.

Figure 18A:
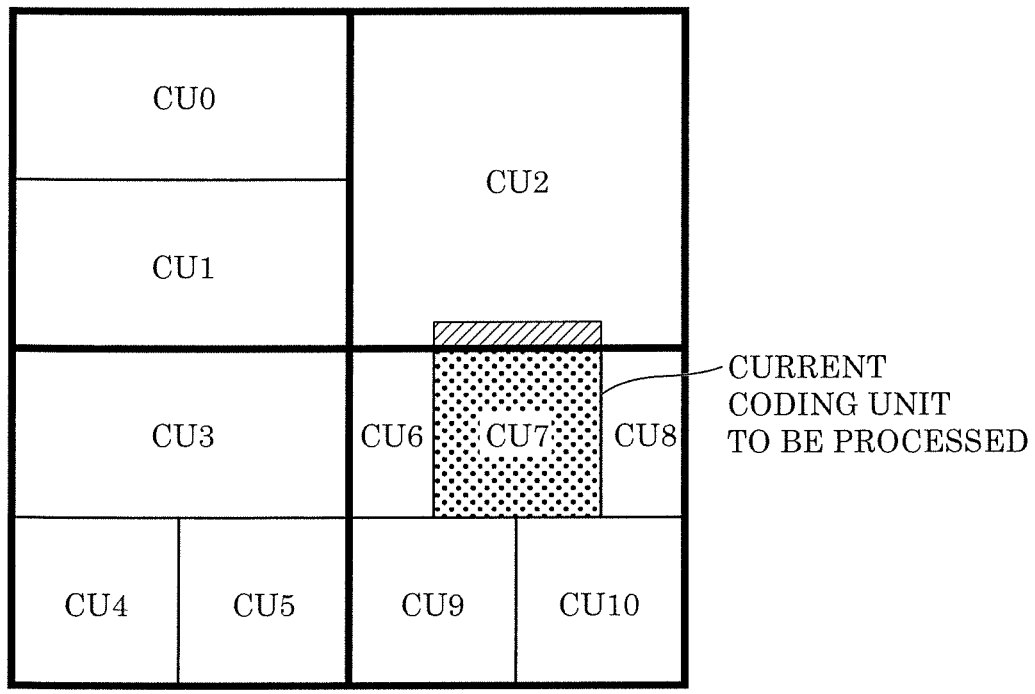

FIG. 18A is a schematic diagram indicating a first example regarding a process for determining that a processed surrounding coding unit which neighbors above a coding tree unit can be referred to.

FIG. 18A indicates coding units CU0 to CU10. Each of the regions enclosed by bold lines is a coding tree unit. For example, two coding units CU0 and CU1 constitute one coding tree unit. The numerical values from 0 to 10 in CU0 to CU10 correspond to the processing order of the coding units. The arrangement, etc. of the coding tree units and coding units in FIG. 18B to FIG. 23B are the same as in FIG. 18A.

Figure 18B:
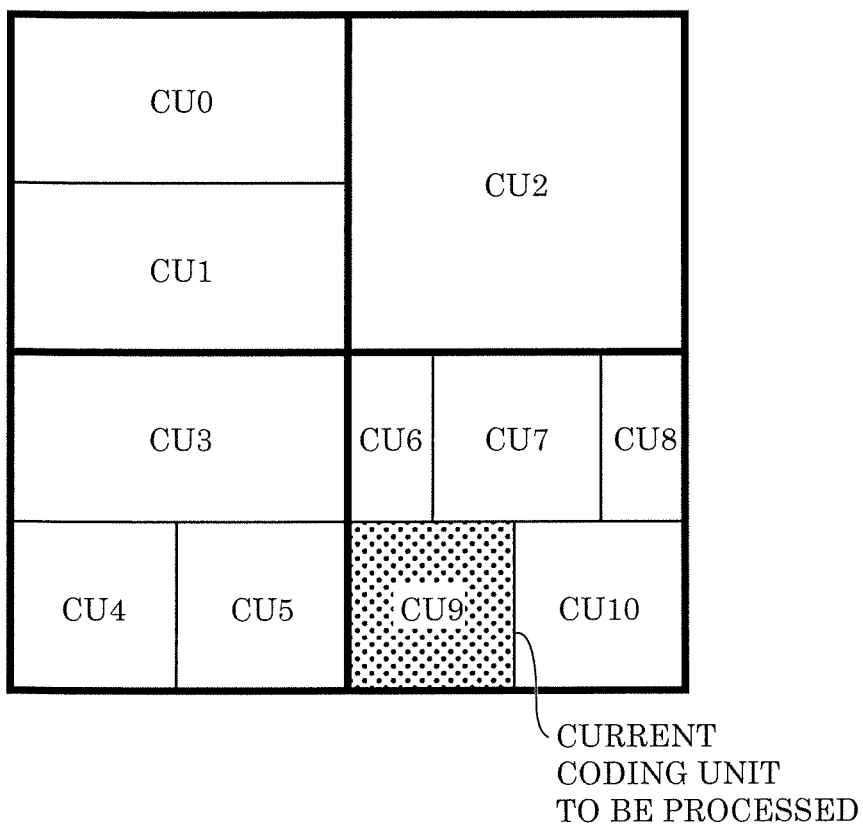

In the example of FIG. 18A, coding unit CU2 which neighbors above the coding tree unit including a current coding unit CU7 can be referred to, and the other processed surrounding coding units cannot be referred to. Accordingly, inter predictors 126 and 218 derive a luminance correction parameter by referring to a reconstructed image in a surrounding reference region indicated by diagonal lines in FIG. 18A, FIG. 18B is a schematic diagram indicating a second example regarding a process for determining that a processed surrounding coding unit which neighbors above a coding tree unit can be referred to. In this example, all the processed surrounding coding units relative to current coding unit CU9 cannot be referred to. Accordingly, no surrounding reference region is defined, and a LIC process is prohibited.

In this determination method, reference availability can be determined based on whether the neighboring coding unit located above is outside the coding tree unit including the current coding unit. Thus, it is possible to always make determinations only using a small amount of processing. In addition, although regions available as surrounding reference regions are limited, it is possible to prevent occurrence of waiting time in pipeline processing, which increases the possibility that the processing is completed within a period of time assigned to one picture.

[A Second Determination Method for Determining Reference Availability in a LIC Process]

Inter predictors 126 and 218 may prohibit reference to one of the left side and the upper side which succeeds the other in processing order relative to the current coding unit. Specifically, inter predictors 126 and 218 may prohibit reference to one of at least one processed surrounding coding unit located to the left of the current coding unit and at least one processed surrounding coding unit located to the upper side of the current coding unit which succeeds the other in processing order.

Figure 19A:
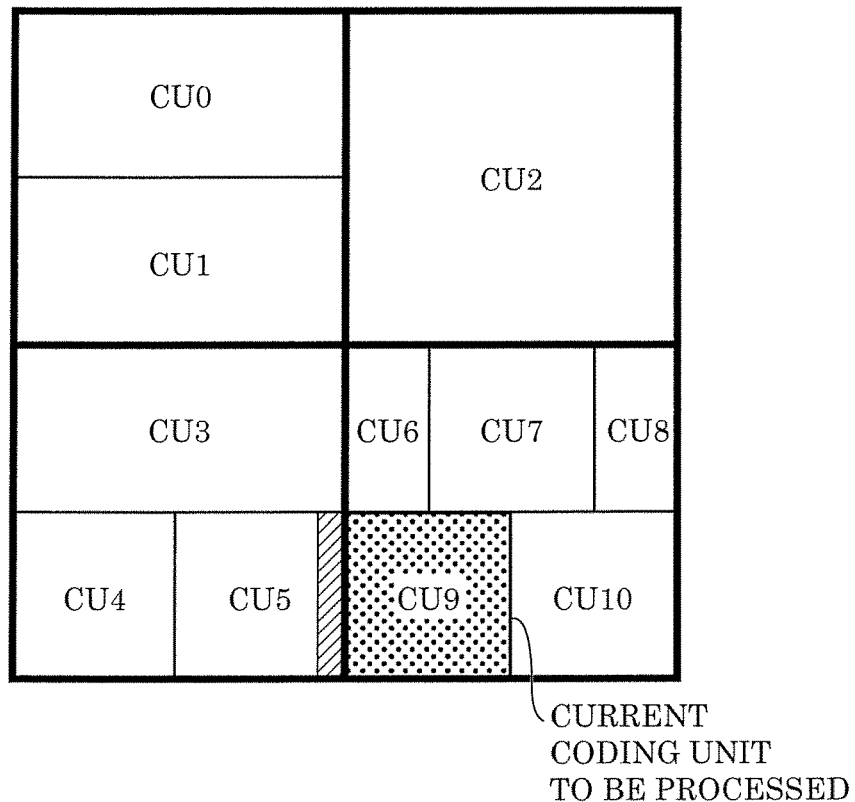

FIG. 19A is a schematic diagram indicating a first example regarding a process for determining that one of a left coding unit and an upper coding unit which succeeds the other in processing order cannot be referred to. In this example, coding units CU6 and CU7 located above current coding unit CU9 succeeds coding unit CU5 located to the left of coding unit CU9 in processing order. Accordingly, inter predictors 126 and 218 determine that coding unit CU5 located left can be referred to, and that coding units CU6 and CU7 located above cannot be referred to.

Accordingly, inter predictors 126 and 218 derive a luminance correction parameter by referring to a reconstructed image in a surrounding reference region indicated by diagonal lines in coding unit CU5 in FIG. 19A.

Figure 19B:
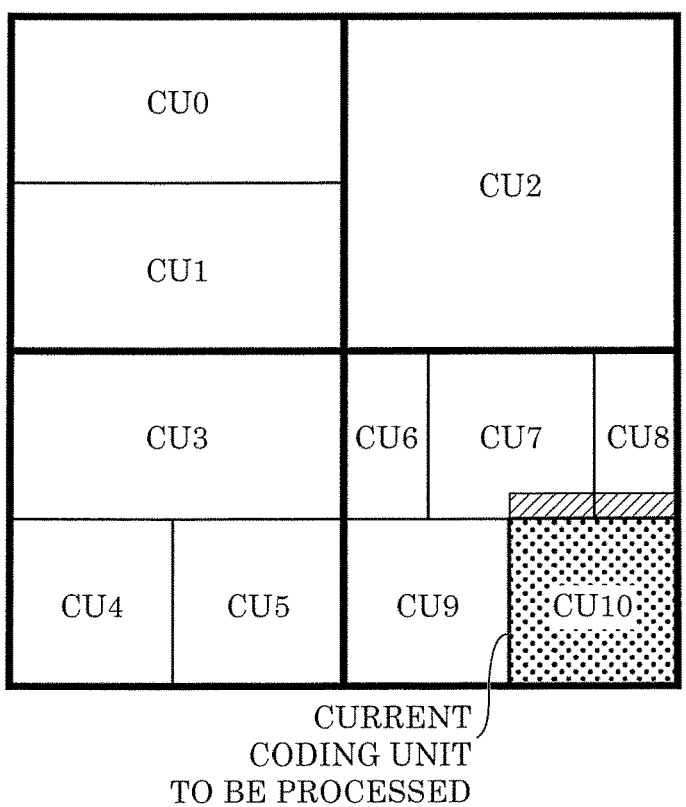

FIG. 19B is a schematic diagram indicating a second example regarding a process for determining that one of a left coding unit and an upper coding unit which succeeds the other in processing order cannot be referred to. In this example, coding unit CU9 located to the left of current coding unit CU10 succeeds coding units CU7 and CU8 located above coding unit CU10 in processing order. Accordingly, inter predictors 126 and 218 determine that coding units CU7 and CU8 located above can be referred to, and that coding unit CU9 located left cannot be referred to.

Accordingly, inter predictors 126 and 218 derive a luminance correction parameter by referring to a reconstructed image in a surrounding reference region indicated by diagonal lines in coding units CU7 and CU8 in FIG. 19B.

In this determination method, it is possible to determine reference availability based on which one of the left side and the upper side has been processed later, which makes it possible to make a determination with an extremely small amount of processing. As a result, a reconstructed image which immediately precedes a coding unit in processing order is not referred to. Accordingly, under feedback delay control in which the number corresponding to a delay amount is 1, it is possible to reduce waiting time in pipeline processing. Accordingly, this increases the possibility that the processing can be completed within a period of time assigned to one picture.

In addition, in the second determination method in FIGS. 19A and 19B, regions available as surrounding reference regions are less limited than in the first determination method in FIGS. 18A and 18B. Accordingly, it is possible to derive a luminance correction parameter more appropriately.

It is to be noted that the first determination method in FIGS. 18A and 18B and the second determination method in FIGS. 19A and 19B can be combined with each other. More specifically, it may be determined that the processed neighboring coding unit located to the upper side relative to a coding tree unit can be referred to regardless of whether the processed surrounding coding unit located above succeeds a processed surrounding coding unit located to the left side of the coding tree unit in processing order.

[A Third Determination Method for Determining Reference Availability in a MC Process]

Inter predictors 126 and 218 may prohibit reference to one side including N coding units which immediately precede a current coding unit in processing order among the left side and the upper side relative to the current coding unit. Specifically, inter predictors 126 and 218 may prohibit reference to the at least one processed surrounding coding unit located to the left side when the at least one processed surrounding coding unit located to the left side includes N coding units which immediately precede a current coding unit in processing order. Likewise, inter predictors 126 and 218 may prohibit reference to the at least one processed surrounding coding unit located to the upper side when the at least one processed surrounding coding unit located to the upper side includes N coding unit which immediately precede the current coding unit in processing order.

It is to be noted that the N processed coding units which immediately precede a current coding unit in processing order can be represented as a temporally close coding units.

Figure 20A:
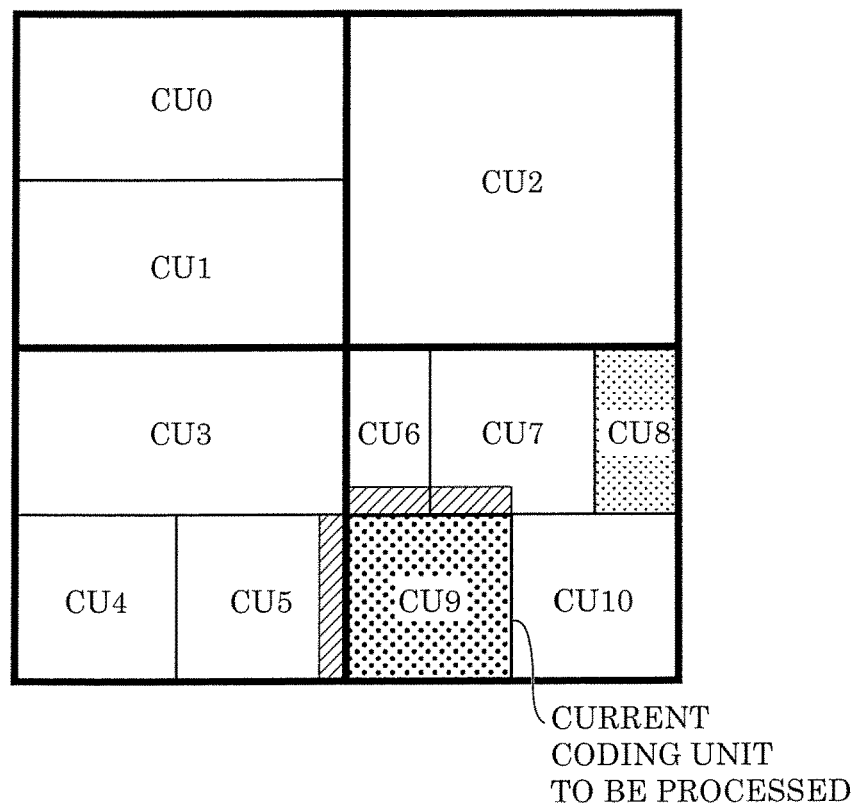

FIG. 20A is a schematic diagram indicating a first example regarding a process for determining that at least one left or upper coding unit including N processed coding units which immediately precede a current coding unit to be processed cannot be referred to. In this case, N is 1.

Processed surrounding coding unit CU5 located to the left of current coding unit CU9 does not include coding unit GU8 which immediately precedes current coding unit CU9. In addition, processed surrounding coding units CU6 and CU7 located above current coding unit CU9 do not include coding unit CU8 which immediately precedes current coding unit CU9. Accordingly, both processed surrounding coding unit CU5 located to the left and processed neighboring coding units CU6 and CU7 located above can be referred to.

Thus, inter predictors 126 and 218 derive a luminance correction parameter by referring to a reconstructed image in surrounding reference regions indicated by diagonal lines in coding units CU5, CU6, and CU7 in FIG. 20A.

It is to be noted that, in FIG. 20A, the part hatched with fine dots and different from a current coding unit indicates an N temporally close coding unit. FIGS. 20B to 21D also indicate parts hatched with fine dots as in FIG. 20A. The N temporally close coding units indicated as the parts hatched with fine dots are not referred to.

Figure 20B:
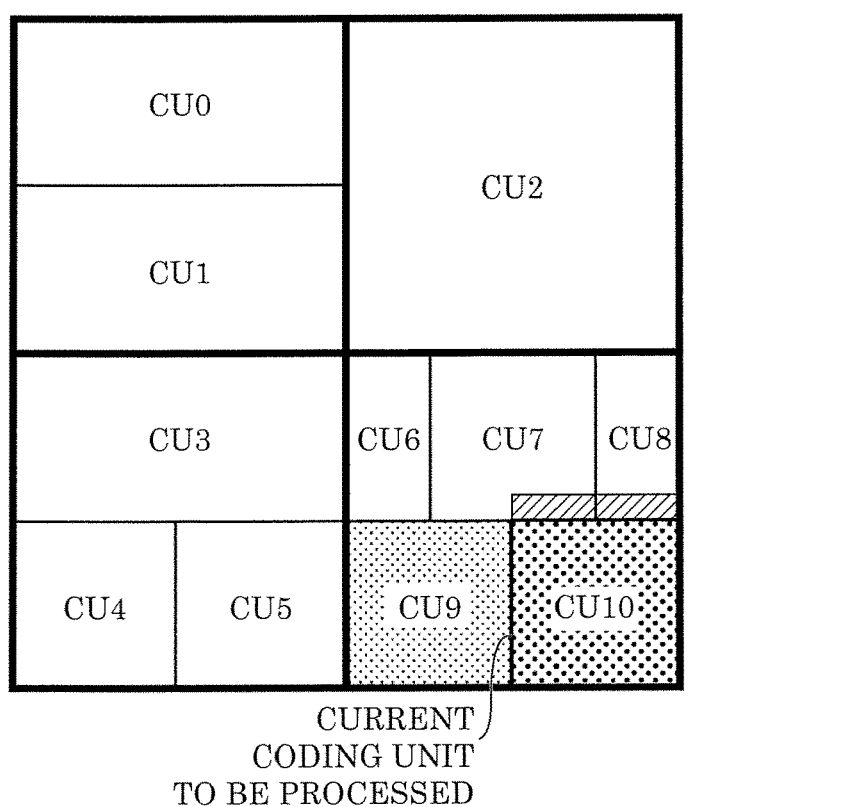

FIG. 20B is a schematic diagram indicating a second example regarding a process for determining that at least one left or upper neighboring coding unit including N processed coding units which immediately precede a current coding unit to be processed cannot be referred to. Also in this case, N is 1.

Processed surrounding coding unit CU9 located to the left of current coding unit CU10 does not include coding unit CU9 which immediately precedes current coding unit CU10. In addition, processed surrounding coding units CU7 and CU8 located above current coding unit CU10 do not include coding unit CU9 which immediately precedes current coding unit CU10. Accordingly, processed surrounding coding unit CU9 located to the left cannot be referred to, and processed neighboring coding units CU7 and CU8 located above can be referred to.

Accordingly, inter predictors 126 and 218 derive a luminance correction parameter by referring to a reconstructed image in a surrounding reference region indicated by diagonal lines in coding units CU7 and CU8 in FIG. 20B.

Figure 20C:
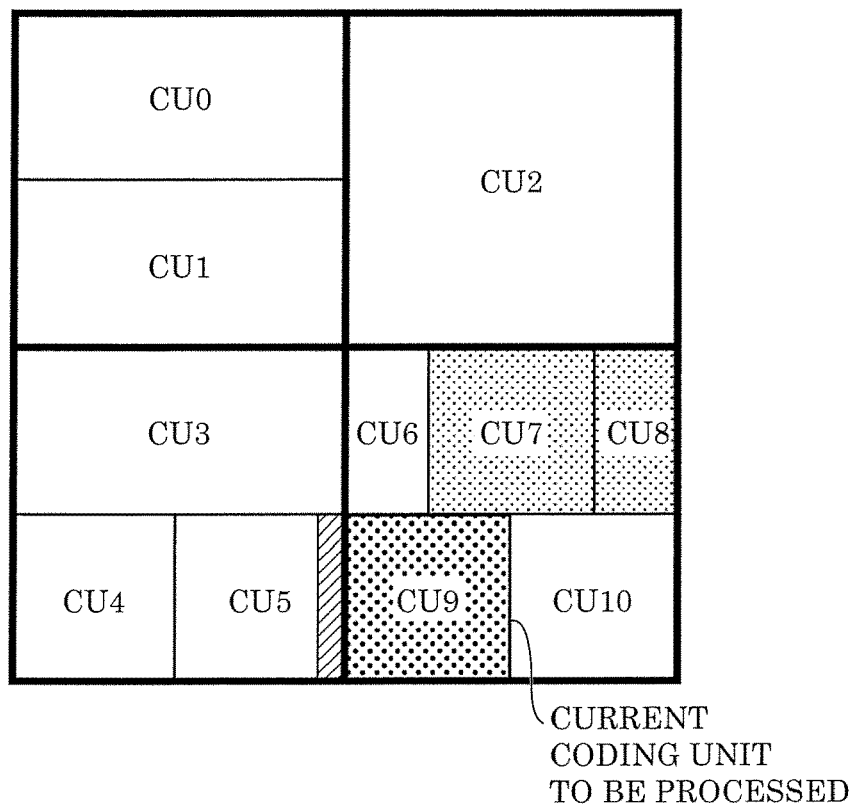

FIG. 20C is a schematic diagram indicating a third example regarding a process for determining that at least one left or upper coding unit including N processed coding units which immediately precede a current coding unit to be processed cannot be referred to. In this case, N is 2.

Processed surrounding coding unit CU5 located to the left of current coding unit CU9 does not include two coding units CU7 and CU8 which immediately precede current coding unit CU9. On the other hand, processed surrounding coding units CU6 and CU7 located above current coding unit CU9 include one of two coding units CU7 and CU8 which immediately precede current coding unit CU9.

Accordingly, processed surrounding coding unit CU5 located to the left can be referred to, but processed surrounding coding units CU6 and CU7 located above cannot be referred to. Accordingly, inter predictors 126 and 218 derive a luminance correction parameter by referring to a reconstructed image in a surrounding reference region indicated by diagonal lines in coding unit CU5 in FIG. 20C.

Figure 20D:
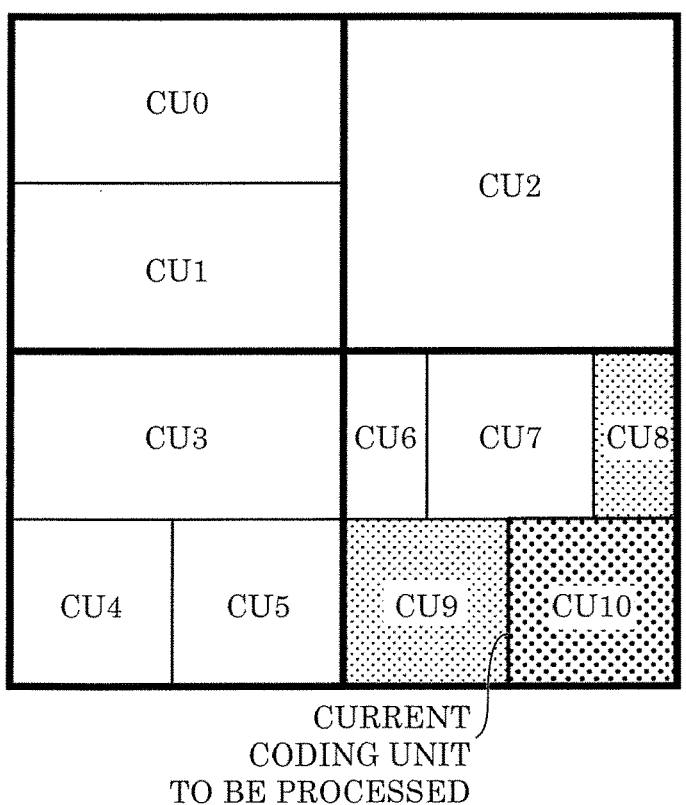

FIG. 20D is a schematic diagram indicating a fourth example regarding a process for determining that at least one left or upper coding unit including N processed coding units which immediately precede a current coding unit to be processed cannot be referred to. In this case, N is 2 as in the case of FIG. 20C.

Processed surrounding coding unit CU9 located to the left of current coding unit CU10 includes one of two coding units CU8 and CU9 which immediately precede current coding unit CU10. On the other hand, processed surrounding coding units CU7 and CU8 located above current coding unit CU10 include one of the two coding units CU8 and CU9 which immediately precede current coding unit CU10.

Accordingly, in this example, all the processed surrounding coding units relative to current coding unit CU10 cannot be referred to. Accordingly, no surrounding reference region is defined, and a LIC process is prohibited.

In this determination method, at each of the left side and the upper side, it is possible to determine reference availability based on whether a current coding unit includes N coding units which immediately precede the current coding unit in processing order. Thus, it is possible to make determinations with a comparatively small amount of processing. In addition, under feedback delay control in which the number corresponding to a delay amount is 1, 2, or another number, it is possible to reduce waiting time in pipeline processing. Accordingly, this increases the possibility that the processing can be completed within a period of time assigned to one picture.

In addition, in the third determination method in FIGS. 20A to 20D, regions available as surrounding reference regions are less limited than in the second determination method in FIGS. 19A and 19B. Accordingly, it is possible to derive a luminance correction parameter more appropriately.

It is to be noted that the first determination method in FIGS. 18A and 18B and the third determination method in FIGS. 20A to 20D can be combined with each other. More specifically, it may be determined that the processed surrounding coding unit located above a coding tree unit can be referred to regardless of whether the processed surrounding coding unit located above is included in N coding units which immediately precede the current coding unit.

[A Fourth Determination Method for Determining Reference Availability in a LIC Process]

Inter predictors 126 and 218 may prohibit reference to N processed coding units which immediately precede a current coding unit to be processed in processing order. Specifically, when the processed surrounding coding unit is included in N temporally close coding units which immediately precede the current coding unit in processing order, the processed surrounding coding unit is prohibited from being referred to.

Figure 21A:
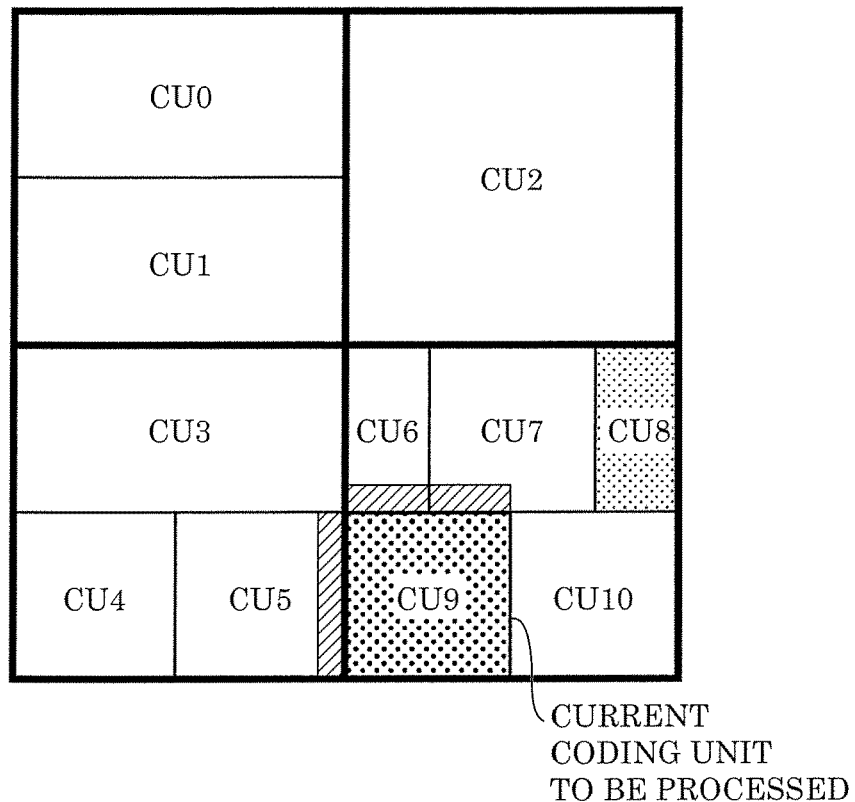

FIG. 21A is a schematic diagram indicating a first example regarding a process for determining that N coding units which immediately precede a current coding unit to be processed cannot be referred to. In this case, N is 1.

Processed surrounding coding unit CU5 located to the left of current coding unit CU9 is not included in coding unit CU8 which immediately precedes current coding unit CU9. In addition, processed surrounding coding units CU6 and CU7 located above current coding unit CU9 are not included in coding unit CU8 which immediately precedes current coding unit CU9. Accordingly, both processed surrounding coding unit CU5 located to the left and processed surrounding coding units CU6 and CU7 located above can be referred to.

Thus, inter predictors 126 and 218 derive a luminance correction parameter by referring to a reconstructed image in a surrounding reference region indicated by diagonal lines in coding units CU5, CU6, and CU7 in FIG. 21A.

Figure 21B:
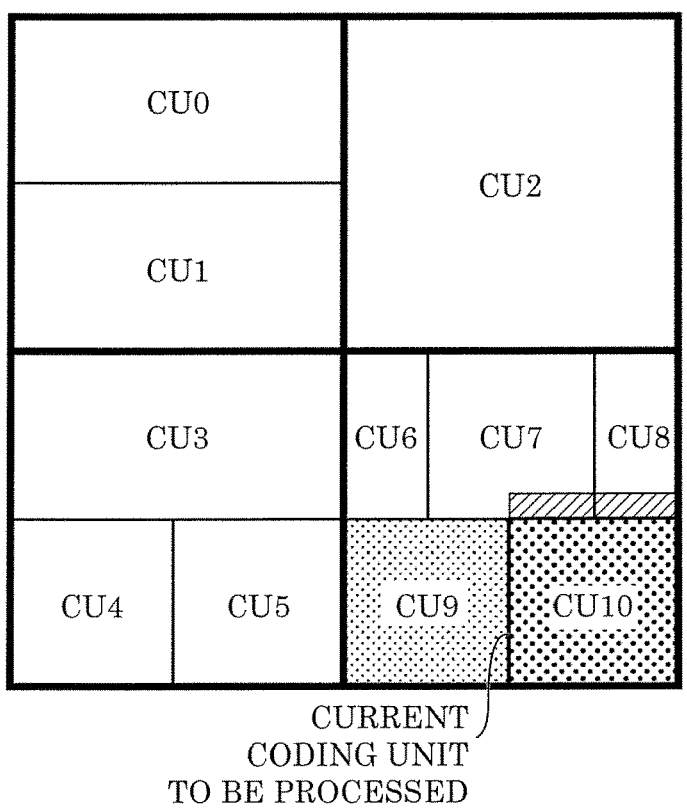

FIG. 21B is a schematic diagram indicating a second example regarding a process for determining that N coding unit which immediately precede a current coding unit to be processed cannot be referred to. Also in this case, N is 1.

Processed surrounding coding unit CU9 located to the left of current coding unit CU10 is included in coding unit CU9 which immediately precedes current coding unit CU10. In contrast, processed surrounding coding units CU7 and CU8 located above current coding unit CU10 are not included in coding unit CU9 which immediately precedes current coding unit CU10. Accordingly, processed surrounding coding unit CU9 located to the left cannot be referred to, and processed surrounding coding units CU7 and CU8 located above can be referred to.

Accordingly, inter predictors 126 and 218 derive a luminance correction parameter by referring to a reconstructed image in a surrounding reference region indicated by diagonal lines in coding units CU7 and CU8 in FIG. 21B.

Figure 21C:
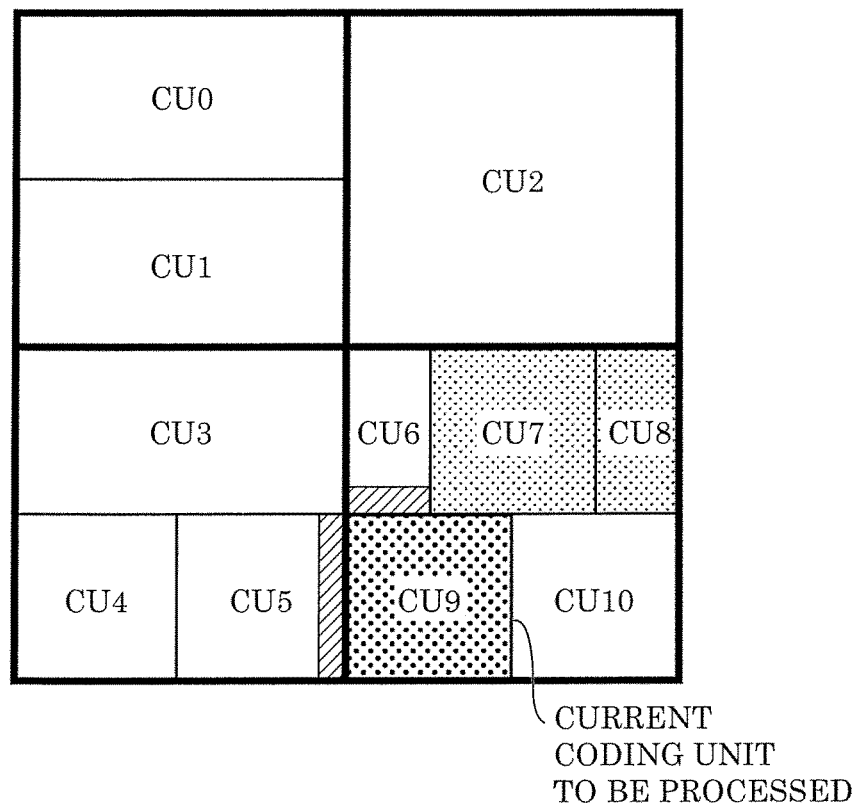

FIG. 21C is a schematic diagram indicating a third example regarding a process for determining that N coding units which immediately precede a current coding unit to be processed cannot be referred to. In this case, N is 2.

Processed surrounding coding unit CU5 located to the left of current coding unit CU9 are not included in two coding units CU7 and CU8 which immediately precede current coding unit CU9.

Processed surrounding coding unit CU6 located above current coding unit CU9 is not included in two coding units CU7 and CU8 which immediately precede current coding unit CU9. Processed surrounding coding unit CU7 located above current coding unit CU9 is included in two coding units CU7 and CU8 which immediately precede current coding unit CU9.

Accordingly, processed surrounding coding unit CU5 located to the left can be referred to, and processed neighboring coding unit CU6 located above can be referred to, but the other CU7 located above cannot be referred to. Accordingly, inter predictors 126 and 218 derive a luminance correction parameter by referring to a reconstructed image in surrounding reference regions indicated by diagonal lines in coding units CU5 and CU 6 in FIG. 21C.

Figure 21D:
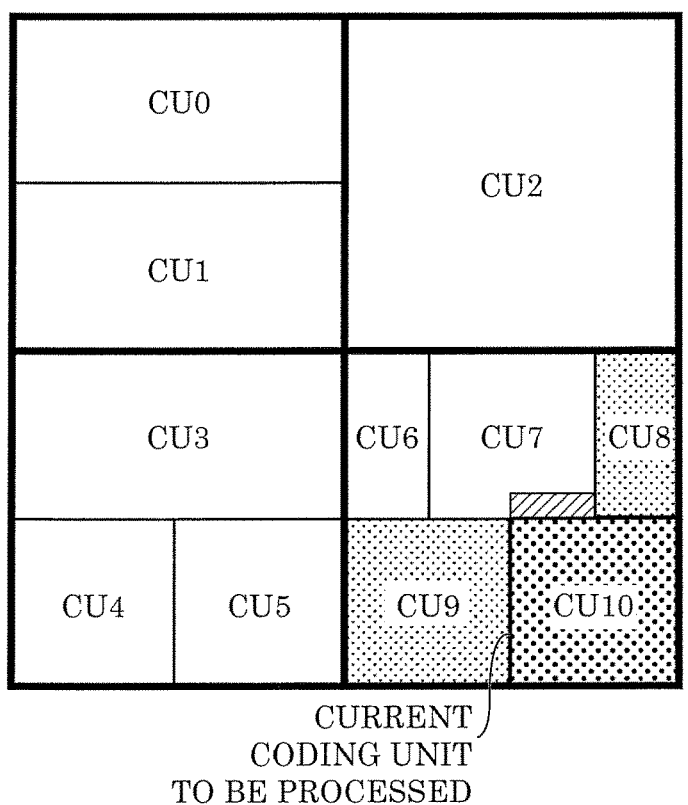

FIG. 21D is a schematic diagram indicating a fourth example regarding a process for determining that N coding units which immediately precede a current coding unit to be processed cannot be referred to. In this case, N is 2 as in the case of FIG. 21C.

Processed surrounding coding unit CU9 located to the left of current coding unit CU10 is included in two coding units CU8 and CU9 which immediately precede current coding unit CU10.

Processed surrounding coding unit CU7 located above current coding unit CU10 is not included in two coding units CU8 and CU9 which immediately precede current coding unit CU10. The other processed surrounding coding unit CU8 located above current coding unit CU10 is included in two coding units CU8 and CU9 which immediately precede current coding unit CU10.

Accordingly, processed surrounding coding unit CU9 located to the left cannot be referred to, processed surrounding coding unit CU7 located above can be referred to, and the other CU8 located above cannot be referred to. Accordingly, inter predictors 126 and 218 derive a luminance correction parameter by referring to a reconstructed image in a surrounding reference region indicated by diagonal lines in coding unit CU7 in FIG. 21D.

In this determination method, reference availability can be determined based on whether a processed surrounding coding unit is included in N temporally close coding units. Thus, it is possible to make determinations only using a comparatively small amount of processing. In addition, under feedback delay control in which the number N corresponding to a delay amount is 1, 2, or another number, it is possible to reduce waiting time in pipeline processing. Accordingly, this increases the possibility that the processing can be completed within a period of time assigned to one picture.

In addition, in the fourth determination method in FIGS. 21A to 21D, regions available as surrounding reference regions are less limited than in the third determination method in FIGS. 20A to 20D. Accordingly, it is possible to derive a luminance correction parameter more appropriately.

It is to be noted that the first determination method in FIGS. 18A and 18B and the fourth determination method in FIGS. 21A to 21D can be combined with each other. More specifically, it may be determined that the processed surrounding coding unit located above a coding tree unit can be referred to regardless of whether the processed surrounding coding unit that neighbors above is N coding units which immediately precede the current coding unit.

In the above descriptions of the respective determination methods, etc., each process has been performed in units of a coding unit, but may be performed in units of a block without being limited to a coding unit. In other words, the coding units in the above descriptions may be replaced with blocks.

[First Variation]

Inter predictors 126 and 218 may derive a luminance correction parameter by referring to only a region in a neighboring coding tree unit located above a current coding tree unit to be processed to which a current coding unit to be processed belongs in a current picture to be processed. Specifically, it is possible that inter predictors 126 and 218 does not prohibit reference to a processed surrounding coding unit in the neighboring coding tree unit located above but prohibits reference to the other processed surrounding coding units in the derivation of the luminance correction parameter.

Furthermore, inter predictors 126 and 218 may derive a common luminance correction parameter for the entire coding tree unit. Inter predictors 126 and 218 may then generate or correct a prediction image using the common luminance correction parameter for each of all the coding units in the current coding tree unit.

Figure 22:
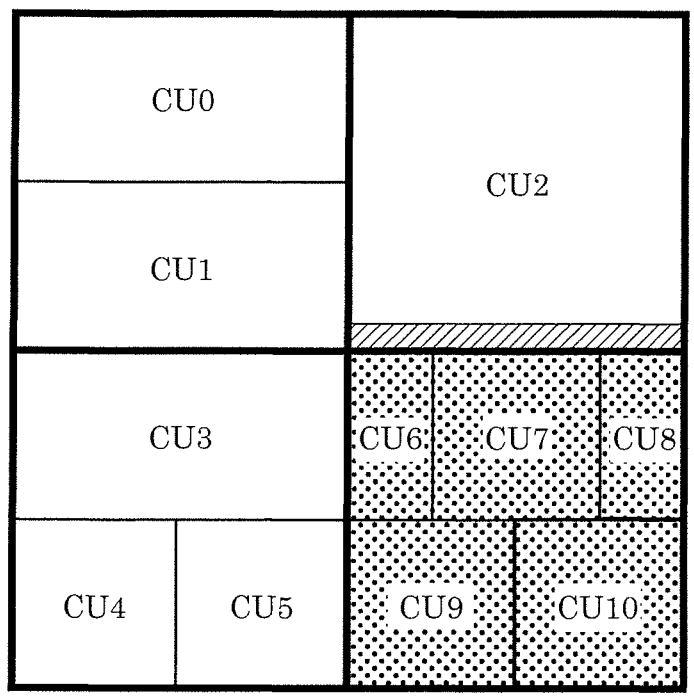
FIG. 22 is a schematic diagram indicating an example of deriving a luminance correction parameter for a current coding tree unit to be processed by referring to a processed surrounding coding unit located above the current coding tree unit.

FIG. 22 is a schematic diagram indicating an example of deriving a luminance correction parameter for a current coding tree unit to be processed by referring to a processed surrounding coding unit located above the current coding tree unit. In FIG. 22, coding units CU6 to CU10 belong to one current coding tree unit. The neighboring coding tree unit located above the current coding tree unit includes coding unit CU2.

In this example, it is conceivable that a process of at least one coding tree unit is performed in a period of time between when a process of a region in the neighboring coding tree unit located above is performed and when processing of coding unit CU6 is performed. Accordingly, it is conceivable that a reconstructed image of the region in the neighboring coding tree unit located above is generated before the start of the processing of coding unit CU6.

Thus, inter predictors 126 and 218 derive the common luminance correction parameter for the current coding tree unit by referring to the reconstructed image of the surrounding reference region in the neighboring coding tree unit located above at the time when processing of coding unit CU6 is started. Specifically, inter predictors 126 and 218 derive the common luminance correction parameter for the current coding tree unit by referring to the reconstructed image in the surrounding reference region indicated by diagonal lines in FIG. 22.

Inter predictors 126 and 218 may then generate or correct a prediction image using the common luminance correction parameter for each of all the coding units CU6 to CU10 in the current coding tree unit.

In this method, it is conceivable that a process of at least one coding tree unit is performed in a period of time between the processing time of the surrounding reference region and the time for processing the current coding unit. Accordingly, it is possible to prevent occurrence of waiting time in pipeline processing. In addition, a luminance correction parameter is derived only once for a coding tree unit. Thus, it is possible to significantly reduce the number of times of memory access related to the surrounding reference region and the computation amount for deriving the luminance correction parameter.

It is to be noted that, when a neighboring coding tree unit located above a current coding tree unit immediately precedes a coding tree unit in processing order, a reconstructed image of a surrounding reference region in the neighboring coding tree unit located above may be prohibited. In this case, a LIC process may be prohibited.

[Second Variation]

When a current coding tree unit to be processed is located to the upper end of a current coding tree unit, inter predictors 126 and 218 may derive a luminance correction parameter by referring to a reconstructed image in a surrounding reference region in the neighboring coding tree unit located above. Inter predictors 126 and 218 then may generate or correct the prediction image for the current coding unit, using the derived luminance correction parameter.

In addition, when a current coding tree unit to be processed is not located to the upper end of a current coding tree unit, inter predictors 126 and 218 may use a luminance correction parameter derived for a processed surrounding coding unit without referring to a reconstructed image in a surrounding reference region. In other words, in this case, inter predictors 126 and 218 may generate or correct a prediction image of a current coding unit by using the luminance correction parameter derived for the processed surrounding coding unit as a luminance correction parameter for the current coding unit.

For example, inter predictors 126 and 218 identify a processed neighboring coding unit for which a prediction image has been generated or corrected using the luminance correction parameter among at least one processed surrounding coding unit. Inter predictors 126 and 218 then generate or correct the prediction image for the current coding unit by re-using the luminance correction parameter derived for the identified processed surrounding coding unit.

Figure 23A:
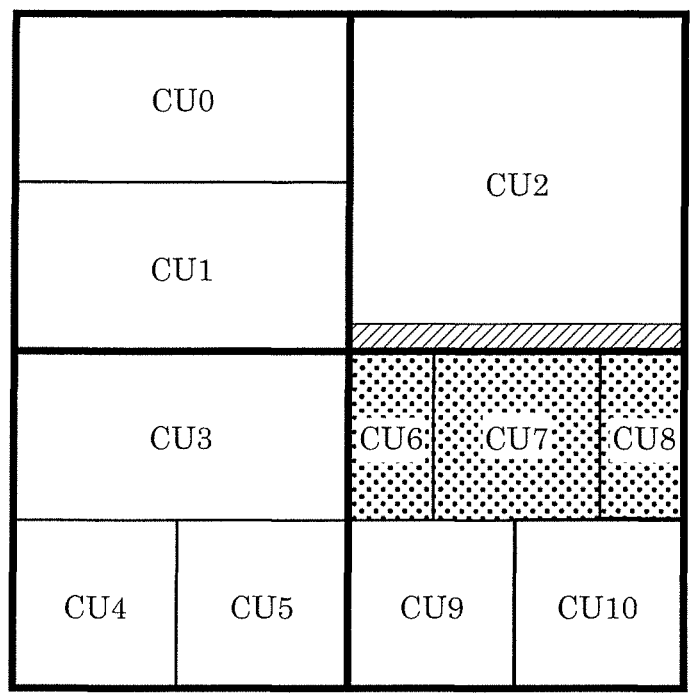
FIG. 23A is a schematic diagram indicating an example of deriving a luminance correction parameter for a current coding unit to be processed located at an upper end of a current coding tree unit to be processed by referring to a processed surrounding coding unit located above the current coding tree unit.

FIG. 23A is a schematic diagram indicating an example of deriving a luminance correction parameter for a current coding unit to be processed located at the upper end of a current coding tree unit to be processed by referring to a processed surrounding coding unit located above the current coding tree unit. In this example, when the current coding unit is one of coding units CU6, CU7, and CU8, a luminance correction parameter is derived by referring to a reference image for a surrounding reference region in coding unit CU2 in the neighboring coding tree unit located above.

Figure 23B:
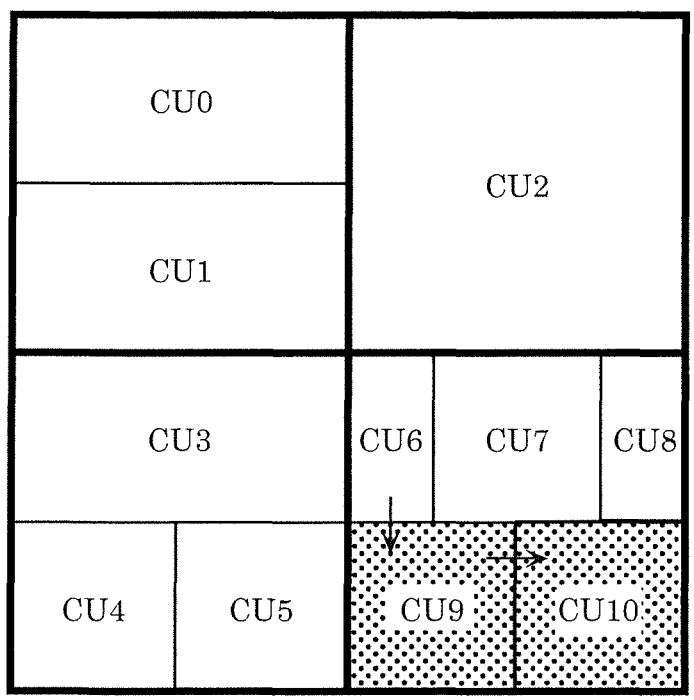
FIG. 23B is a schematic diagram indicating an example of re-using a luminance correction parameter derived for another coding unit.

FIG. 23B is a schematic diagram indicating an example of using a luminance correction parameter derived for another coding unit. In this example, when the current coding unit is coding unit CU9, the luminance correction parameter derived for coding unit CU6 is re-used as it is as the luminance correction parameter for coding unit CU9. In other words, in this case, the luminance correction parameter derived for coding unit CU6 is newly derived as a luminance correction parameter for coding unit CU9.

In this example, when the current coding unit is coding unit CU10, the luminance correction parameter derived for coding unit CU9 is re-used as it is as the luminance correction parameter for coding unit CU10. In other words, in this case, the luminance correction parameter derived for coding unit CU9 is newly derived as a luminance correction parameter for coding unit CU10.

The processed surrounding coding unit used for re-use of a luminance correction parameter may be a processed surrounding coding unit located at a predetermined position relative to the current coding unit. Alternatively, the processed surrounding coding unit used for re-use of a luminance correction parameter may be a most forward processed surrounding coding unit which has been subjected to a LIC process in predetermined order. Alternatively, the processed neighboring coding unit used for re-use of a luminance correction parameter may be a processed surrounding coding unit specified by a merge index used to derive a motion vector for the current coding unit.

In addition, in the case where a LIC process has been performed on a coding unit, inter predictors 126 and 218 may store, in memory, a luminance correction parameter derived for the coding unit. In this way, inter predictors 126 and 218 are capable of re-using the luminance correction parameter stored in the memory in the LIC process of a succeeding coding unit.

In this method, it is conceivable that a process of at least one coding tree unit is performed in a period of time between the processing time of the surrounding reference region in the neighboring coding tree unit located above and the time for processing the current coding unit. Accordingly, it is possible to prevent occurrence of waiting time in pipeline processing.

It is to be noted that, when a neighboring coding tree unit located above a current coding tree unit immediately precedes a current coding tree unit in processing order, a reconstructed image of a surrounding reference region in the neighboring coding tree unit located above may be prohibited. In this case, a LIC process may be prohibited.

Alternatively, in the above case, processes performed on coding units which are not located at the upper end of the coding tree unit may be performed on each of all the coding units in the current coding tree unit. In other words, in this case, a luminance correction parameter derived for a processed surrounding coding unit may be re-used regardless of whether the coding unit is located at the upper end of the coding tree unit.

Stated differently, a luminance correction parameter may be derived by referring to a reconstructed image in a surrounding reference region in a neighboring coding tree unit located above only when the neighboring coding tree unit located above does not immediately precede a current coding tree unit in processing order.

The splitting methods (that is, arrangement of coding tree units and coding units) indicated in FIGS. 18A to 23B) and surrounding reference regions, etc. are examples, and other splitting methods, surrounding reference regions, etc., may be used as appropriate. In addition, the processing methods indicated in FIGS. 18A to 23B are applicable to both an encoding process and a decoding process in the same manner.

[An Example of Mounting an Encoder]

Figure 24:
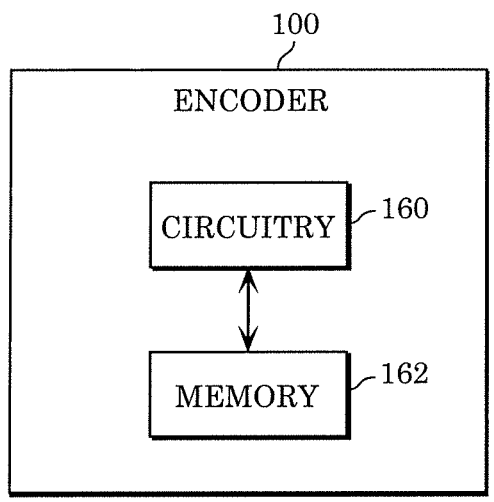
FIG. 24 is a block diagram indicating an example of mounting an encoder according to Embodiment 1.

FIG. 24 is a block diagram indicating an example of mounting encoder 100. Encoder 100 includes circuitry 160 and memory 162. For example, the plurality of constituent elements of encoder 100 indicated in FIG. 1 are mounted on circuitry 160 and memory 162 illustrated in FIG. 24.

Circuitry 160 is electronic circuitry accessible to memory 162, and performs information processing. For example, circuitry 160 is an exclusive or general processor which encodes a video using memory 162. Circuitry 160 may be a processor such as a CPU. In addition, circuitry 160 may be an aggregate of a plurality of electronic circuits.

In addition, for example, circuitry 160 may take the roles of two or more constituent elements other than a constituent element for storing information out of the plurality of constituent elements of encoder 100 indicated in FIG. 1. In other words, circuitry 160 may perform the above-described operations as operations of the two or more constituent elements.

Memory 162 is an exclusive or general memory for storing information that is used by circuitry 160 to encode a video. Memory 162 may be an electronic circuit, may be connected to circuitry 160, or may be included in circuitry 160.

In addition, memory 162 may be an aggregate of electronic circuits, or may be configured with a plurality of sub-memories. In addition, memory 162 may be a magnetic disc, an optical disc, or the like, or may be represented as a storage, a recording medium, or the like. In addition, memory 162 may be a non-volatile memory or a volatile memory.

For example, memory 162 may take the role of a constituent element for storing information out of the plurality of constituent elements of encoder 100 indicated in FIG. 1. Specifically, memory 162 may take the roles of block memory 118 and frame memory 122 indicated in FIG. 1.

In addition, memory 162 may store a video to be encoded or a bitstream corresponding to the video to be encoded. In addition, memory 162 may store a program for causing circuitry 160 to encode a video.

It is to be noted that, in encoder 100, all of the plurality of constituent elements indicated in FIG. 1 may not be implemented, and all the processes described above may not be performed. Part of the constituent elements indicated in FIG. 1 may be included in another device, or part of the processes described above may be performed by another device. The part of the constituent elements indicated in FIG. 1 is implemented in encoder 100, and the part of the processes described above is performed by encoder 100. This may reduce the processing delay.

Figure 25:
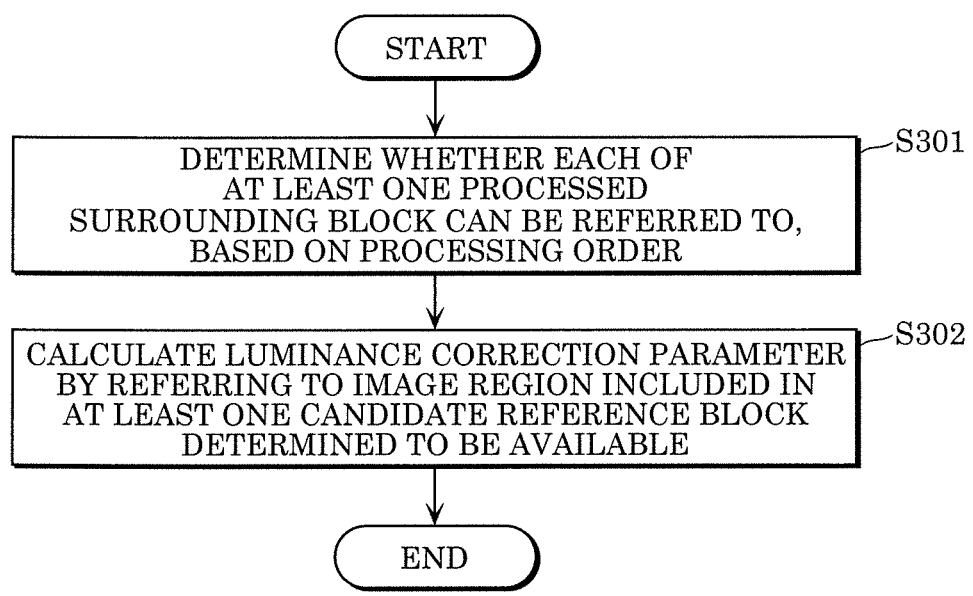
FIG. 25 is a block diagram indicating a first example of operations performed by the encoder according to Embodiment 1.

FIG. 25 is a flowchart indicating a first example of operations performed by encoder 100 indicated in FIG. 24. For example, encoder 100 encodes an image by causing circuitry 160 in encoder 100 to perform the operations indicated in FIG. 25 using memory 162.

At the time, encoder 100 processes a plurality of blocks in processing order using, for at least one of a plurality of blocks, a method for correcting a prediction image for a current block to be processed using a luminance correction parameter. The luminance correction parameter is derived by referring to an image region around the current block among the plurality of blocks in the image.

Specifically, based on the processing order, circuitry 160 determines reference availability of each of at least one processed surrounding block which is one of the plurality of processed blocks and is at least one block around the current block (S301). Circuitry 160 then derives a luminance correction parameter by referring to an image region included in at least one reference block determined to be available among the at least one processed surrounding block (S302).

In this way, encoder 100 is capable of supporting the reduction in coding amount using the correction process. In addition, encoder 100 is capable of appropriately determining the processed surrounding block to be used to derive the luminance correction parameter, based on the processing order which affects the temporal difference between the timing for processing the current block and the processing timing of the processed surrounding block. Accordingly, encoder 100 is capable of reducing occurrence of waiting time for obtaining a reconstructed image.

Thus, encoder 100 is capable of reducing the processing delay while supporting the reduction in coding amount.

For example, an image may be composed of a plurality of coding tree units which are equal in size. Here, each of the plurality of coding tree units includes at least one block among a plurality of blocks in the image. In addition, for example, each of at least one processed surrounding block may be either one of at least one processed surrounding block located to the left of a current block to be processed or one of at least one processed surrounding block located above the current block.

In addition, for example, when the at least one processed surrounding block located above is included in at least one outside block, circuitry 160 may determine that the at least one processed surrounding block located above can be referred to. Here, the at least one outside block is at least one block which is located outside the current coding tree unit including the current block among the plurality of blocks, and which precedes the current block by at least one block corresponding to a coding tree unit in processing order. In addition, for example, circuitry 160 may determine that the at least one processed surrounding block located left cannot be referred to. In addition, when the at least one processed surrounding block located above is not included in at least one outside block, circuitry 160 may determine that the at least one processed surrounding block located to the upper side cannot be referred to. In addition, for example, circuitry 160 may determine that one of at least one processed surrounding block located to the left side and at least one processed surrounding block located to the upper side which succeeds the other in processing order cannot be referred to. In addition, for example, circuitry 160 may determine that the at least one processed surrounding block located to the other side which precedes in processing order can be referred to.

In addition, for example, when the at least one processed surrounding block located to the upper side is included in at least one outside block, circuitry 160 may determine that the at least one processed surrounding block located to the left side cannot be referred to, and that the at least one processed surrounding block located to the upper side can be referred to. In addition, when the at least one processed surrounding block located to the upper side is not included in at least one outside block, circuitry 160 may determine that the at least one processed surrounding block located to either the left side or the upper side cannot be referred to, and that the at least one processed surrounding block located to the other side can be referred to.

In addition, for example, when at least one processed surrounding block located to the left side includes at least one of N temporally close blocks, circuitry 160 may determine that the at least one processed surrounding block located to the left side cannot be referred to. In addition, when at least one processed surrounding block located to the upper side includes at least one of the N temporally close blocks, circuitry 160 may determine that the at least one processed surrounding block located to the upper side cannot be referred to.

Here, the N temporally close blocks are N blocks which have been processed among the plurality of blocks and which immediately precede the current block in processing order. N may be 1, 2, or another natural number.

In addition, for example, when at least one processed surrounding block located to the left side does not include any of the N temporally close blocks, circuitry 160 may determine that the at least one processed surrounding block located to the left side can be referred to. In addition, for example, when at least one processed surrounding block located to the upper side does not include any of the N temporally close blocks, circuitry 160 may determine that the at least one processed surrounding block located to the upper side can be referred to.

In addition, when at least one processed surrounding block located to the upper side includes at least one of N temporally close blocks, and is not included in at least one outside block, circuitry 160 may determine that the at least one processed surrounding block located to the upper side cannot be referred to. In addition, when at least one processed surrounding block located to the upper side does not include any of the N temporally close blocks, or is included in the at least one outside block, circuitry 160 may determine that the at least one processed surrounding block located to the upper side can be referred to.

In addition, for example, as for each of at least one processed surrounding block located to the left side, circuitry 160 may determine that the processed surrounding block cannot be referred to when the processed surrounding block is included in N temporally close blocks. In addition, as for each of at least one processed surrounding block located to the upper side, circuitry 160 may determine that the processed surrounding block cannot be referred to when the processed surrounding block is included in the N temporally close blocks.

In addition, for example, as for each of at least one processed surrounding block located to the left side, circuitry 160 may determine that the processed surrounding block can be referred to when the processed surrounding block is not included in N temporally close blocks. In addition, for example, as for each of at least one processed surrounding block located to the upper side, circuitry 160 may determine that the processed surrounding block can be referred to when the processed surrounding block is not included in the N temporally close blocks.

In addition, for example, as for each of at least one processed surrounding block located to the upper side, circuitry 160 may determine that the processed surrounding block cannot be referred to when the processed surrounding block is included in N temporally close blocks and the processed surrounding block is not included in at least one outside block. In addition, as for each of at least one processed surrounding block located to the upper side,
circuitry 160 may determine that the processed surrounding block can be referred to when the processed surrounding block is not included in the N temporally close blocks or when the processed surrounding block is included in the at least one outside block.

In addition, for example, circuitry 160 may encode an image by a pipeline structure including mutually different two stages which are a correction stage in which a prediction image is corrected using a luminance correction parameter and a reconstruction stage in which a reconstructed image is generated. Circuitry 160 may delay input of a reconstructed image of a current block to a correction stage for another block by a period of time from the end of the process in the correction stage for the current block to the end of the processes in M stages for the current block.

Here, the other block is a block which is different from the current block and which succeeds the current block in processing order. M may be a natural number equal to N, or a natural number smaller than N. In addition, for example, M may be a number obtainable by subtracting 1 from the number of a plurality of stages from the correction stage to the reconstruction stage including the correction stage and the reconstruction stage.

In addition, for example, circuitry 160 may encode a parameter related to a determination on reference availability in either a sequence header area, a picture header area, a slice header area, or a supplemental information area.

Here, the sequence header area is a region in which a common parameter is stored in an image stream. The picture header area is a region in which a common parameter is stored in a picture of an image. The slice header area is a region in which a common parameter is stored in a slice of the image. The supplemental information area is a region which stores a parameter other than a plurality of parameters stored in the sequence header area, picture header area, and slice header area.

In addition, for example, circuitry 160 may determine a parameter related to a determination on reference availability according to the size of a current picture including a current block.

In addition, for example, circuitry 160 may obtain information indicating the processing capability of decoder 200, and determine a parameter related to a determination on reference availability according to the processing capability of decoder 200.

In addition, for example, circuitry 160 may determine a parameter related to a determination on reference availability according to a profile or a level determined for an image stream. Here, the profile indicates technical requirements, and the level indicates parameter requirements.

In addition, the parameter related to a determination on reference availability may indicate whether a determination on reference availability is made, a method for determining reference availability, the above-indicated N, or the above-indicated M.

Figure 26:
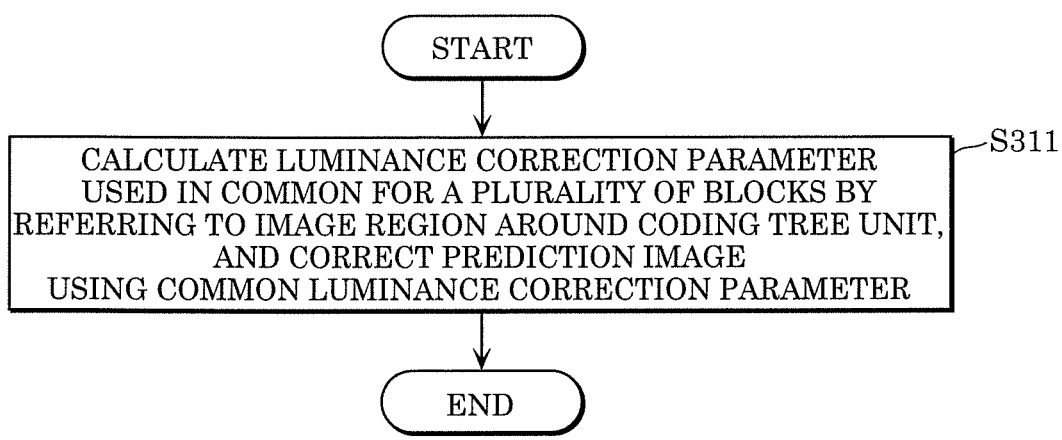
FIG. 26 is a block diagram indicating a second example of operations performed by the encoder according to Embodiment 1.

FIG. 26 is a flowchart indicating a second example of operations performed by encoder 100 indicated in FIG. 24. For example, circuitry 160 in encoder 100 performs the operations indicated in FIG. 26 using memory 162.

Specifically, circuitry 160 derives a luminance correction parameter which is used in common for a plurality of blocks by referring to an image region around a current coding tree unit to be processed including a plurality of blocks. Circuitry 160 then corrects, for each of the plurality of blocks, a prediction image to be used to encode the block using the common luminance correction parameter (S311).

In this way, encoder 100 is capable of supporting the reduction in coding amount using the correction process. In addition, encoder 100 is capable of reducing the number of times of derivation of a luminance correction parameter. Accordingly, encoder 100 is capable of reducing occurrence of waiting time for obtaining a reconstructed image. Thus, encoder 100 is capable of reducing the processing delay while supporting the reduction in coding amount. Furthermore, encoder 100 is capable of reducing the computation amount.

For example, an image region may be a region in a neighboring coding tree unit located above a current coding tree unit to be processed.

In addition, for example, when a neighboring coding tree unit located above the current coding tree unit is a coding tree unit which immediately precedes the current coding tree unit in processing order, circuitry 160 may encode a block without correcting a prediction image. In other words, in this case, circuitry 160 may encode each of a plurality of blocks without correcting the prediction image to be used to encode the block.

In addition, for example, circuitry 160 may encode an image by a pipeline structure including mutually different two stages which are a correction stage in which a prediction image is corrected using a common luminance correction parameter and a reconstruction stage in which a reconstructed image is generated.

Circuitry 160 may delay input of a reconstructed image of a current block to the correction stage for another block by a period of time from the end of the process in the correction stage for the current block to the end of the processes in M stages for the current block. Here, M is a natural number.

The current block is a block included in a current coding tree unit. The other block is a block which succeeds the current block in processing order. In addition, for example, M may be a number obtainable by subtracting 1 from the number of a plurality of stages from the correction stage to the reconstruction stage including the correction stage and the reconstruction stage.

Figure 27:
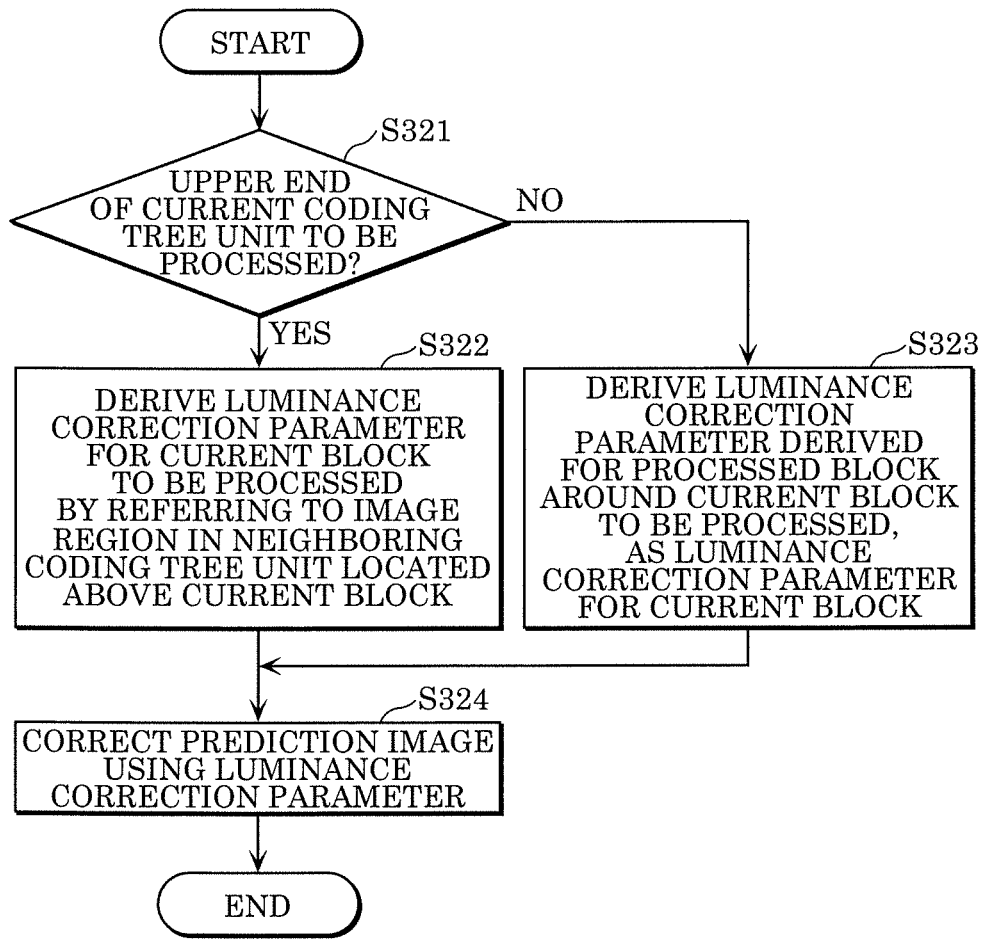
FIG. 27 is a block diagram indicating a third example of operations performed by the encoder according to Embodiment 1.

FIG. 27 is a flowchart indicating a third example of operations performed by encoder 100 indicated in FIG. 24. For example, circuitry 160 in encoder 100 corrects a prediction image to be used to encode a current block by using a luminance correction parameter which is derived for the current block, by performing the operations indicated in FIG. 27 using memory 162.

Specifically, in the case where the current block is located to the upper end of a current coding tree unit including the current block (Yes in S321), circuitry 160 derives a luminance correction parameter for the current block by referring to an image region (S322). This image region is an image region in a neighboring coding tree unit located above the current coding tree unit.

In the opposite case where the current block is not located at the upper end of a current coding tree unit including the current block (No in S321), circuitry 160 derives the luminance correction parameter derived for a processed block as a luminance correction parameter for the current block (S323). This processed block is a processed block around the current block.

Circuitry 160 then corrects a prediction image to be used to encode the current block using the luminance correction parameter for the current block (S324).

In this way, encoder 100 is capable of supporting the reduction in coding amount using the correction process. In addition, encoder 100 is capable of using a region in a coding tree unit which is located above a current block and is considered to be sufficiently distant from the current block in processing order, to derive a luminance correction parameter. Alternatively, encoder 100 is capable of using a luminance correction parameter derived for another block. Accordingly, encoder 100 is capable of appropriately reducing the processing delay.

Thus, encoder 100 is capable of reducing the processing delay while supporting the reduction in coding amount.

For example, a processed block may be a processed block located at a predetermined position relative to the current block. In addition, for example, the processed block may be a most forward processed block for which a prediction block has been corrected using a luminance correction parameter in predetermined processing order among processed blocks around the current block. In addition, for example, the processed block may be a processed block which is specified by a merge index used to derive a motion vector for the current block.

In addition, for example, when the neighboring coding tree unit located above the current coding tree unit is the coding tree unit which immediately precedes the current coding tree unit in processing order, circuitry 160 does not need to correct a prediction image for the current block. In other words, in this case, circuitry 160 may encode the current block without correcting the prediction image for the current block.

In addition, for example, when the neighboring coding tree unit located above the current coding tree unit is the coding tree unit which immediately precedes the current coding tree unit in processing order, circuitry 160 may re-use a luminance correction parameter for all the blocks. In other words, in this case, circuitry 160 may derive, for each of all the blocks in the current coding tree unit, the luminance correction parameter derived for a processed block around the block as a luminance parameter for the block.

In addition, for example, circuitry 160 may store, in memory 162, the luminance correction parameter derived for the current block.

In addition, for example, circuitry 160 may encode an image by a pipeline structure including mutually different two stages which are a correction stage in which a prediction image is corrected using a luminance correction parameter and a reconstruction stage in which a reconstructed image is generated.

Circuitry 160 may delay input of a reconstructed image of a current block to the correction stage for another block by a period of time from the end of the process in the correction stage for the current block to the end of the processes in M stages for the current block. Here, M is a natural number. The current block is a block included in a current coding tree unit. The other block is a block which succeeds the current block in processing order.

In addition, for example, M may be a number obtainable by subtracting 1 from the number of a plurality of stages from the correction stage to the reconstruction stage including the correction stage and the reconstruction stage.

Figure 28:
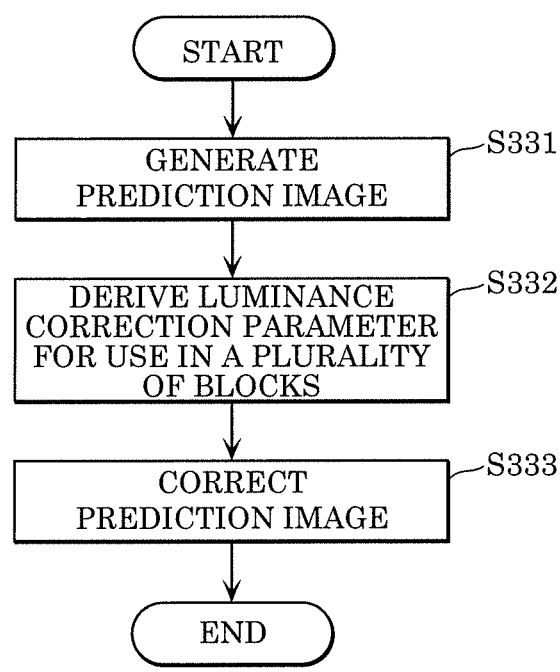
FIG. 28 is a block diagram indicating a fourth example of operations performed by the encoder according to Embodiment 1.

FIG. 28 is a flowchart indicating a fourth example of operations performed by encoder 100 indicated in FIG. 24. For example, circuitry 160 in encoder 100 performs the operations indicated in FIG. 28 using memory 162.

Specifically, circuitry 160 generates a prediction image to be used to encode a current block (S331). Circuitry 160 derives a luminance correction parameter by referring to an image region (S332). Here, the image region is a region which is included in an image including the current block and is outside the current block. Circuitry 160 then corrects a prediction image to be used to encode the current block using the luminance correction parameter (S333). The luminance correction parameter is used in common for a plurality of blocks.

In this way, encoder 100 is capable of supporting the reduction in coding amount using the correction process. In addition, encoder 100 is capable of reducing the number of times of derivation of a luminance correction parameter. Accordingly, encoder 100 is capable of reducing occurrence of waiting time for obtaining a reconstructed image. Thus, encoder 100 is capable of reducing the processing delay while supporting the reduction in coding amount. Furthermore, encoder 100 is capable of reducing the computation amount.

For example, circuitry 160 may derive a luminance correction parameter by referring to an image region around a current coding tree unit including a plurality of blocks including a current block. Circuitry 160 then corrects a prediction image to be used to encode each of the plurality of blocks included in the current coding tree unit, using the luminance correction parameter.

For example, an image region may be a region in a neighboring coding tree unit located above a current coding tree unit.

In addition, for example, when the neighboring coding tree unit located above the current coding tree unit is the coding tree unit which immediately precedes the current coding tree unit in processing order, circuitry 160 does not need to correct a prediction image for the current block. Specifically, in this case, circuitry 160 may encode each of the plurality of blocks included in the current coding tree unit without correcting the prediction image to be used to encode the block.

In addition, for example, in the case where the current block is located at the upper end of the current coding tree unit including the current block, circuitry 160 may derive a luminance correction parameter for the current block. Specifically, in this case, circuitry 160 may derive the luminance correction parameter for the current block by referring to an image region in the neighboring coding tree unit located above the current coding tree unit.

In the opposite case where the current block is not located at the upper end of the current coding tree unit including the current block, circuitry 160 may determine the luminance correction parameter derived for a processed block around the current block as a luminance correction parameter for the current block.

Circuitry 160 then may correct a prediction image to be used to encode the current block using the luminance correction parameter for the current block.

For example, a processed block may be a processed block located at a predetermined position relative to the current block. In addition, for example, the processed block may be a most forward processed block for which a prediction block has been corrected using a luminance correction parameter in predetermined processing order among a plurality of processed blocks around the current block. In addition, for example, the processed block may be a processed block which is specified by a merge index used to derive a motion vector for the current block.

In addition, for example, when the neighboring coding tree unit located above the current coding tree unit is the coding tree unit which immediately precedes the current coding tree unit in processing order, circuitry 160 does not need to correct a prediction image for the current block. In other words, in this case, circuitry 160 may encode the current block without correcting the prediction image for the current block.

In addition, for example, circuitry 160 may store, in memory 162, the luminance correction parameter derived for the current block.

In addition, for example, circuitry 160 may encode an image by a pipeline structure including mutually different two stages which are a correction stage in which a prediction image is corrected using a luminance correction parameter and a reconstruction stage in which a reconstructed image is generated.

Circuitry 160 may delay input of a reconstructed image of a current block to the correction stage for another block by a period of time from the end of the process in the correction stage for the current block to the end of the processes in M stages for the current block. Here, M is a natural number. The other block is a block which succeeds the current block in processing order.

In addition, for example, M may be a number obtainable by subtracting 1 from the number of a plurality of stages from the correction stage to the reconstruction stage including the correction stage and the reconstruction stage.

[An Example of Mounting a Decoder]

Figure 29:
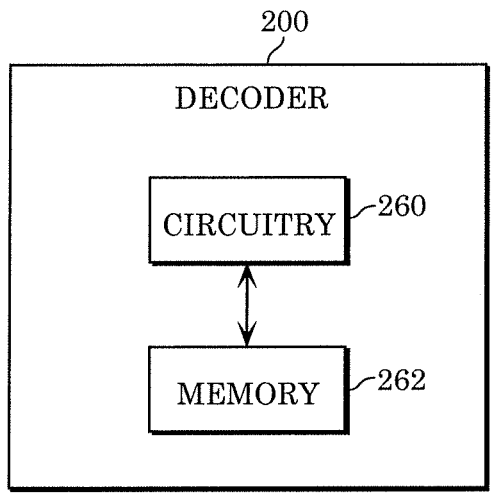
FIG. 29 is a block diagram indicating an example of mounting a decoder according to Embodiment 1.

FIG. 29 is a block diagram indicating an example of mounting decoder 200. Decoder 200 includes circuitry 260 and memory 262. For example, the plurality of constituent elements of decoder 200 indicated in FIG. 10 are mounted on circuitry 260 and memory 262 illustrated in FIG. 29.

Circuitry 260 is electronic circuitry accessible to memory 262, and performs information processing. For example, circuitry 260 is an exclusive or general processor which decodes a video using memory 262. Circuitry 260 may be a processor such as a CPU. In addition, circuitry 260 may be an aggregate of a plurality of electronic circuits.

In addition, for example, circuitry 260 may take the roles of two or more constituent elements other than a constituent element for storing information out of the plurality of constituent elements of decoder 200 indicated in FIG. 10. In other words, circuitry 260 may perform the above-described operations as operations of the two or more constituent elements.

Memory 262 is an exclusive or general memory for storing information that is used by circuitry 260 to decode a video. Memory 262 may be an electronic circuit, may be connected to circuitry 260, or may be included in circuitry 260.

In addition, memory 262 may be an aggregate of electronic circuits, or may be configured with a plurality of sub-memories. In addition, memory 262 may be a magnetic disc or an optical disc, or the like, or may be represented as a storage, a recording medium, or the like. In addition, memory 262 may be a non-volatile memory or a volatile memory.

For example, memory 262 may take the role of a constituent element for storing information out of the plurality of constituent elements of decoder 200 indicated in FIG. 10. Specifically, memory 262 may take the roles of block memory 210 and frame memory 214 indicated in FIG. 10.

In addition, memory 262 may store a bitstream corresponding to an encoded video, or a decoded video, in addition, memory 262 may store a program for causing circuitry 260 to decode a video.

It is to be noted that, in decoder 200, all of the plurality of constituent elements indicated in FIG. 10 may not be implemented, and all the processes described above may not be performed. Part of the constituent elements indicated in FIG. 10 may be included in another device, or part of the processes described above may be performed by another device. The part of the constituent elements indicated in FIG. 10 is implemented in decoder 200, and the part of the processes described above is performed by decoder 200. This may reduce the processing delay.

Figure 30:
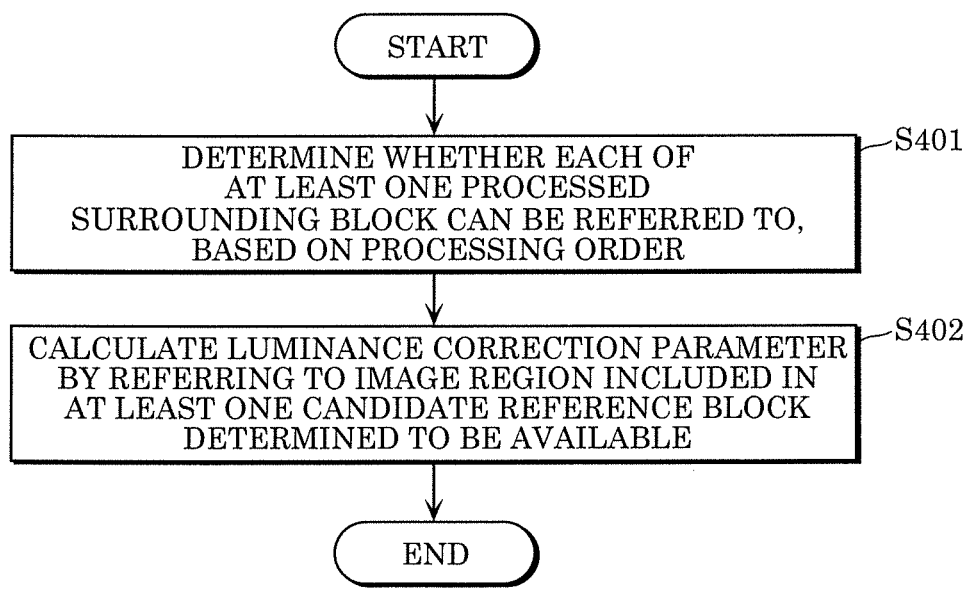
FIG. 30 is a block diagram indicating a first example of operations performed by the decoder according to Embodiment 1.

FIG. 30 is a flowchart indicating a first example of operations performed by decoder 200 indicated in FIG. 29. For example, decoder 200 decodes an image by causing circuitry 260 in decoder 200 to perform the operations indicated in FIG. 30 using memory 262.

At the time, decoder 200 processes a plurality of blocks in processing order using, for at least one of a plurality of blocks, a method for correcting a prediction image for a current block to be processed using a luminance parameter. The luminance correction parameter is derived by referring to an image region around the current block among the plurality of blocks in the image.

Specifically, based on the processing order, circuitry 260 determines reference availability of each of at least one processed surrounding block which is one of the plurality of processed blocks and is at least one block around the current block (S401). Circuitry 260 then derives the luminance correction parameter by referring to the image region included in the at least one reference block determined to be available among the at least one processed surrounding block (S402).

In this way, decoder 200 is capable of supporting the reduction in coding amount using the correction process. In addition, decoder 200 is capable of appropriately determining a processed surrounding block to be used to derive a luminance correction parameter, based on a processing order which affects the temporal difference between the timing for processing a current block and the processing timing of a processed surrounding block. Accordingly, decoder 200 is capable of reducing occurrence of waiting time for obtaining a reconstructed image.

Thus, decoder 200 is capable of reducing the processing delay while supporting the reduction in coding amount.

For example, an image may be composed of a plurality of coding tree units which are equal in size. Here, each of the plurality of coding tree units includes at least one block among a plurality of blocks in the image, in addition, for example, each of at least one processed surrounding block may be either one of at least one processed surrounding block located to the left of a current block to be processed or one of at least one processed surrounding block located above the current block.

In addition, for example, when the at least one processed surrounding block located above is included in at least one outside block, circuitry 260 may determine that the at least one processed surrounding block located above can be referred to. Here, the at least one outside block is at least one block which is located outside the current coding tree unit including the current block among the plurality of blocks, and which precedes the current block by at least one block corresponding to a coding tree unit in processing order.

In addition, for example, circuitry 260 may determine that the at least one processed surrounding block located left cannot be referred to. In addition, when the at least one processed surrounding block located above is not included in at least one outside block, circuitry 260 may determine that the at least one processed surrounding block located above cannot be referred to.

In addition, for example, circuitry 260 may determine that one of at least one processed surrounding block located to the left side and at least one processed surrounding block located to the upper side which succeeds the other in processing order cannot be referred to. In addition, for example, circuitry 260 may determine that the at least one processed surrounding block located to the other side which precedes in processing order can be referred to.

In addition, for example, when the at least one processed surrounding block located above is included in at least one outside block, circuitry 260 may determine that the at least one processed surrounding block located to the left cannot be referred to, and that the at least one processed surrounding block located above can be referred to. In addition, when the at least one processed surrounding block located above is not included in at least one outside block, circuitry 260 may determine that the at least one processed surrounding block located to either the left side or the upper side cannot be referred to, and that the at least one processed surrounding block located to the other side can be referred to.

In addition, for example, when at least one processed surrounding block located to the left side includes at least one of N temporally close blocks, circuitry 260 may determine that the at least one processed surrounding block located to the left side cannot be referred to. In addition, when at least one processed surrounding block located to the upper side includes at least one of the N temporally close blocks, circuitry 260 may determine that the at least one processed surrounding block located to the upper side cannot be referred to.

Here, the N temporally close blocks are N blocks which have been processed among the plurality of blocks and which immediately precede the current block in processing order. N may be 1, 2, or another natural number.

In addition, for example, when at least one processed surrounding block located to the left side does not include any of N temporally close blocks, circuitry 260 may determine that the at least one processed surrounding block located to the left side can be referred to. In addition, for example, when at least one processed surrounding block located to the upper side does not include any of the N temporally close blocks, circuitry 260 may determine that the at least one processed surrounding block located to the upper side can be referred to.

In addition, when at least one processed surrounding block located to the upper side includes at least one of N temporally close blocks, and is not included in at least one outside block, circuitry 260 may determine that the at least one processed surrounding block located to the upper side cannot be referred to. In addition, when at least one processed surrounding block located to the upper side does not include any of the N temporally close blocks, and is not included in the at least one outside block, circuitry 260 may determine that the at least one processed surrounding block located to the upper side can be referred to.

In addition, for example, as for each of at least one processed surrounding block located to the left side, circuitry 260 may determine that the processed surrounding block cannot be referred to when the processed surrounding block is included in N temporally close blocks. In addition, as for each of at least one processed surrounding block located to the upper side, circuitry 260 may determine that the processed surrounding block cannot be referred to when the processed surrounding block is included in the N temporally close blocks.

In addition, for example, as for each of at least one processed surrounding block located to the left side, circuitry 260 may determine that the processed surrounding block can be referred to when the processed surrounding block is not included in N temporally close blocks. In addition, for example, as for each of at least one processed surrounding block located to the upper side, circuitry 260 may determine that the processed surrounding block can be referred to when the processed surrounding block is not included in the N temporally close blocks.

In addition, for example, as for each of at least one processed surrounding block located to the upper side, circuitry 260 may determine that the processed surrounding block cannot be referred to when the processed surrounding block is included in N temporally close blocks and the processed surrounding block is not included in at least one outside block. In addition, as for each of at least one processed surrounding block located to the upper side, circuitry 260 may determine that the processed surrounding block can be referred to when the processed surrounding block is not included in the N temporally close blocks or when the processed surrounding block is included in the at least one outside block.

In addition, for example, circuitry 260 may decode an image by a pipeline structure including mutually different two stages which are a correction stage in which a prediction image is corrected using a luminance correction parameter and a reconstruction stage in which a reconstructed image is generated. Circuitry 260 may delay input of a reconstructed image of a current block to a correction stage for another block by a period of time from the end of the process in the correction stage for the current block to the end of the processes in M stages for the current block.

Here, the other block is a block which is different from the current block and which succeeds the current block in processing order. M may be a natural number equal to N, or a natural number smaller than N. For example, M may be a number obtainable by subtracting 1 from the number of a plurality of stages from the correction stage to the reconstruction stage including the correction stage and the reconstruction stage.

In addition, for example, circuitry 260 may decode a parameter related to a determination on reference availability from either a sequence header area, a picture header area, a slice header area, or a supplemental information area.

Here, the sequence header area is a region in which a common parameter is stored in an image stream. The picture header area is a region in which a common parameter is stored in a picture of an image. The slice header area is a region in which a common parameter is stored in a slice of the image. The supplemental information area is an area which stores a parameter other than a plurality of parameters stored in the sequence header area, picture header area, and slice header area.

In addition, for example, circuitry 260 may determine a parameter related to a determination on reference availability according to the size of a current picture including a current block.

In addition, for example, circuitry 260 may obtain information indicating the processing capability of decoder 200, and determine a parameter related to a determination on reference availability according to the processing capability of decoder 200.

In addition, for example, circuitry 260 may determine a parameter related to a determination on reference availability according to a profile or a level determined for an image stream. Here, the profile indicates technical requirements, and the level indicates parameter requirements.

In addition, the parameter related to a determination on reference availability may indicate whether a determination on reference availability is made, a method for determining reference availability, the above-indicated N, or the above-indicated M.

Figure 31:
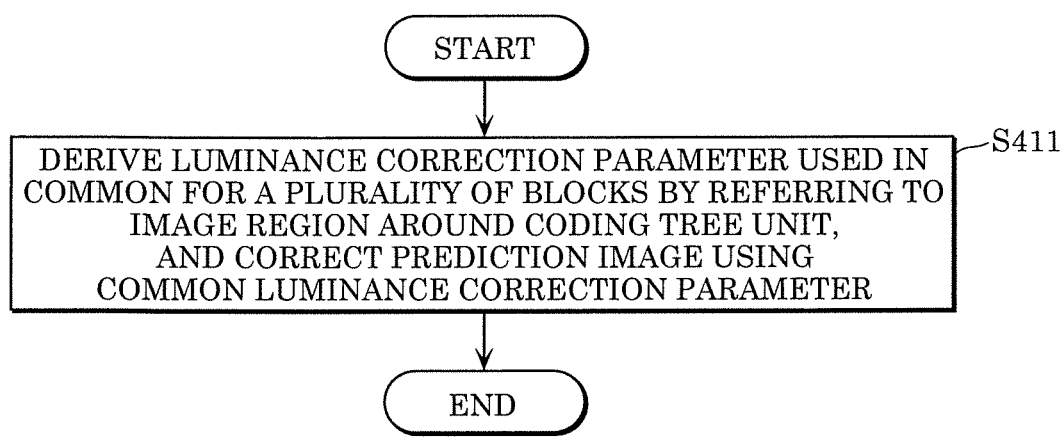
FIG. 31 is a block diagram indicating a second example of operations performed by the decoder according to Embodiment 1.

FIG. 31 is a flowchart indicating a second example of operations performed by decoder 200 indicated in FIG. 29. For example, circuitry 260 in decoder 200 performs the operations indicated in FIG. 31 using memory 262.

Specifically, circuitry 260 derives a common luminance correction parameter which is used in common for a plurality of blocks by referring to an image region around a current coding tree unit to be processed including a plurality of blocks. Circuitry 260 then corrects, for each of the plurality of blocks, a prediction image to be used to decode the block using the common luminance correction parameter (S411).

In this way, decoder 200 is capable of supporting the reduction in coding amount using the correction process. In addition, decoder 200 is capable of reducing the number of times of derivation of a luminance correction parameter. Accordingly, decoder 200 is capable of reducing occurrence of waiting time for obtaining a reconstructed image. Thus, decoder 200 is capable of reducing the processing delay while supporting the reduction in coding amount. Furthermore, decoder 200 is capable of reducing the computation amount.

For example, an image region may be a region in a coding tree unit located above a current coding tree unit to be processed.

In addition, for example, when a neighboring coding tree unit located above the current coding tree unit is a coding tree unit which immediately precedes the current coding tree unit in processing order, circuitry 260 may decode a block without correcting a prediction image. In other words, in this case, circuitry 260 may decode each of a plurality of blocks without correcting the prediction image to be used to decode the block.

In addition, for example, circuitry 260 may decode an image by a pipeline structure including mutually different two stages which are a correction stage in which a prediction image is corrected using a common luminance correction parameter and a reconstruction stage in which a reconstructed image is generated.

Circuitry 260 may delay input of a reconstructed image of a current block to the correction stage for another block by a period of time from the end of the process in the correction stage for the current block to the end of the processes in M stages for the current block. Here, M is a natural number. The current block is a block included in a current coding tree unit. The other block is a block which succeeds the current block in processing order.

In addition, for example, M may be a number obtainable by subtracting 1 from the number of a plurality of stages from the correction stage to the reconstruction stage including the correction stage and the reconstruction stage.

Figure 32:
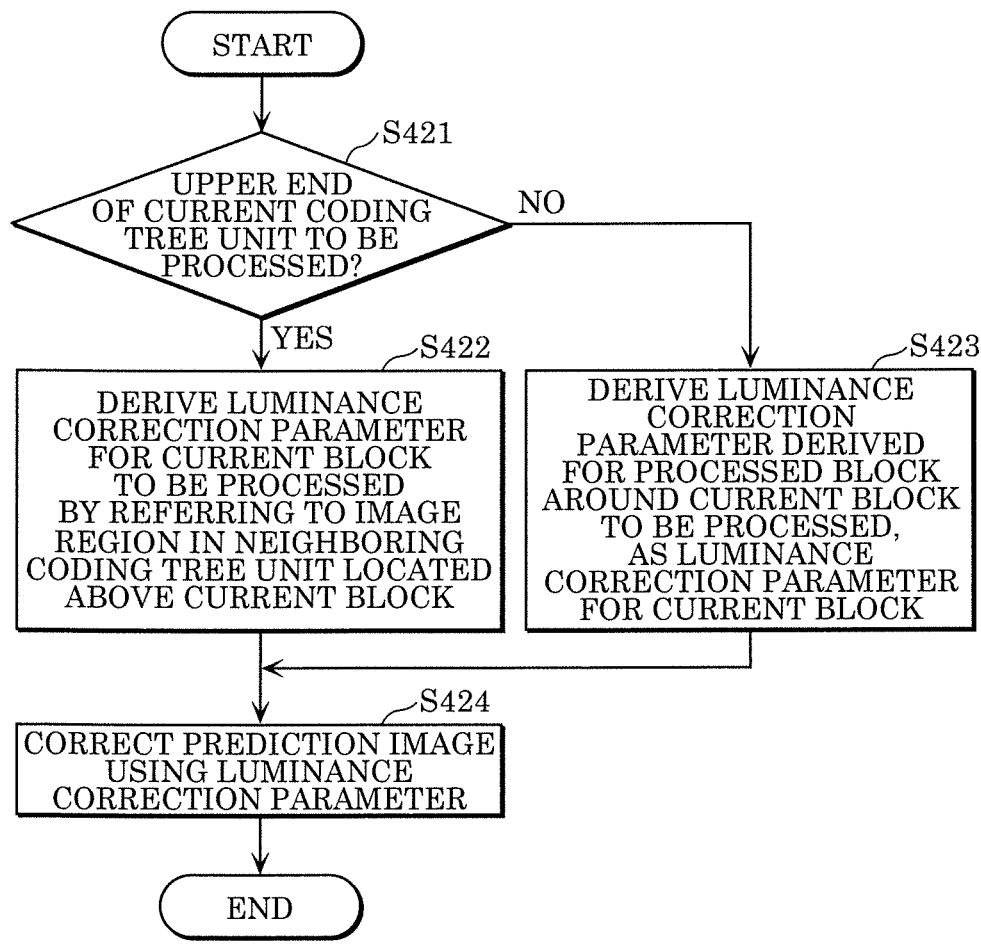
FIG. 32 is a block diagram indicating a third example of operations performed by the decoder according to Embodiment 1.

FIG. 32 is a flowchart indicating a third example of operations performed by decoder 200 indicated in FIG. 29. For example, circuitry 260 in decoder 200 corrects a prediction image to be used to decode a current block by using a luminance correction parameter which is derived for the current block, by performing the operations indicated in FIG. 32 using memory 262.

Specifically, in the case where the current block is located at the upper end of a current coding tree unit including the current block (Yes in S421), circuitry 260 derives a luminance correction parameter for the current block by referring to an image region (S422). This image region is an image region in a neighboring coding tree unit located above the current coding tree unit.

In the opposite case where the current block is not located at the upper end of a current coding tree unit including the current block (No in S421), circuitry 260 derives the luminance correction parameter derived for a processed block as a luminance correction parameter for the current block (S423). This processed block is a processed block around the current block.

Circuitry 260 then corrects a prediction image to be used to decode the current block using the luminance correction parameter for the current block (S424).

In this way, decoder 200 is capable of supporting the reduction in coding amount using the correction process. In addition, decoder 200 is capable of using a region in a coding tree unit which is located above the current block and is considered to be sufficiently distant from the current block, to derive a luminance correction parameter. Alternatively, decoder 200 is capable of using a luminance correction parameter derived for another block. Accordingly, decoder 200 is capable of appropriately reducing the processing delay.

Thus, decoder 200 is capable of reducing the processing delay while supporting the reduction in coding amount.

For example, a processed block may be a processed block located at a predetermined position relative to the current block. In addition, for example, the processed block may be a most forward processed block for which a prediction block has been corrected using a luminance correction parameter in predetermined processing order among a plurality of processed blocks around the current block. In addition, for example, the processed block may be a processed block which is specified by a merge index used to derive a motion vector for the current block.

In addition, for example, when the neighboring coding tree unit located above the current coding tree unit is the coding tree unit which immediately precedes the current coding tree unit in processing order, circuitry 260 does not need to correct a prediction image for the current block. In other words, in this case, circuitry 260 may decode the current block without correcting the prediction image for the current block.

In addition, for example, when the neighboring coding tree unit located above the current coding tree unit is the coding tree unit which immediately precedes the current coding tree unit in processing order, circuitry 260 may re-use a luminance correction parameter for all the blocks. In other words, in this case, circuitry 260 may derive, for each of all the blocks in the current coding tree unit, the luminance correction parameter derived for a processed block around the block as a luminance parameter for the block.

In addition, for example, circuitry 260 may store, in memory 262, the luminance correction parameter derived for the current block.

In addition, for example, circuitry 260 may decode an image by a pipeline structure including mutually different two stages which are a correction stage in which a prediction image is corrected using a luminance correction parameter and a reconstruction stage in which a reconstructed image is generated.

Circuitry 260 may delay input of a reconstructed image of a current block to the correction stage for another block by a period of time from the end of the process in the correction stage for the current block to the end of the processes in M stages for the current block. Here, M is a natural number. The current block is a block included in a current coding tree unit. The other block is a block which succeeds the current block in processing order.

In addition, for example, M may be a number obtainable by subtracting 1 from the number of a plurality of stages from the correction stage to the reconstruction stage including the correction stage and the reconstruction stage.

Figure 33:
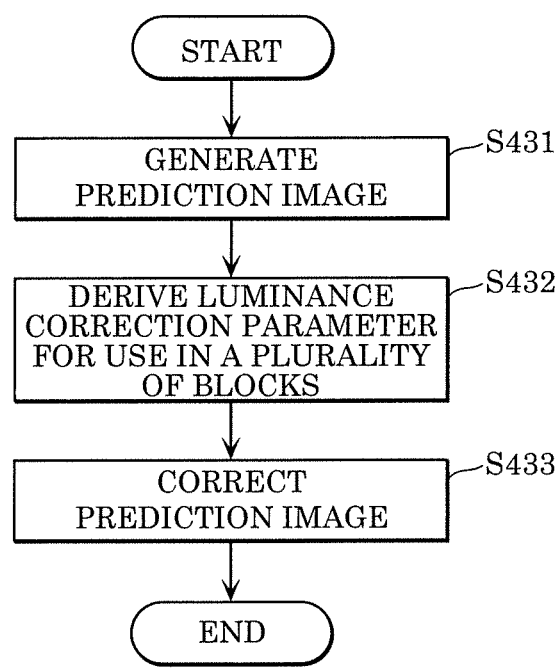
FIG. 33 is a block diagram indicating a fourth example of operations performed by the decoder according to Embodiment 1.

FIG. 33 is a flowchart indicating a fourth example of operations performed by decoder 200 indicated in FIG. 29. For example, circuitry 260 in decoder 200 performs the operations indicated in FIG. 33 using memory 262.

Specifically, circuitry 260 generates a prediction image to be used to decode a current block (S431). Circuitry 260 derives a luminance correction parameter by referring to an image region (S432). Here, the image region is a region which is included in an image including the current block and is outside the current block. Circuitry 260 then corrects a prediction image to be used to decode the current block using the luminance correction parameter (S433). The luminance correction parameter is used in common for a plurality of blocks.

In this way, decoder 200 is capable of supporting the reduction in coding amount using the correction process. In addition, decoder 200 is capable of reducing the number of times of derivation of a luminance correction parameter. Accordingly, decoder 200 is capable of reducing occurrence of waiting time for obtaining a reconstructed image. Thus, decoder 200 is capable of reducing the processing delay while supporting the reduction in coding amount. Furthermore, decoder 200 is capable of reducing the computation amount.

For example, circuitry 260 may derive a luminance correction parameter by referring to an image region around a current coding tree unit including a plurality of blocks including a current block. Circuitry 260 then corrects a prediction image to be used to decode each of the plurality of blocks included in the current coding tree unit, using the luminance correction parameter.

For example, an image region may be a region in a neighboring coding tree unit located above a current coding tree unit.

In addition, for example, when the neighboring coding tree unit located above the current coding tree unit is the coding tree unit which immediately precedes the current coding tree unit in processing order, circuitry 260 does not need to correct a prediction image for the current block. Specifically, in this case, circuitry 260 may decode each of the plurality of blocks included in the current coding tree unit without correcting the prediction image to be used to decode the block.

In addition, for example, when the current block is located at the upper end of the current coding tree unit including the current block, circuitry 260 may derive a luminance correction parameter for the current block. Specifically, in this case, circuitry 260 may derive the luminance correction parameter for the current block by referring to an image region in the neighboring coding tree unit located above the current coding tree unit.

In the opposite case where the current block is not located at the upper end of the current coding tree unit including the current block, circuitry 260 may determine the luminance correction parameter derived for a processed block around the current block as a luminance correction parameter for the current block.

Circuitry 260 then may correct a prediction image to be used to decode the current block using the luminance correction parameter for the current block.

In addition, for example, a processed block may be a processed block located at a predetermined position relative to the current block. In addition, for example, the processed block may be a most forward processed block for which a prediction block has been corrected using a luminance correction parameter in predetermined processing order among processed blocks around the current block. In addition, for example, the processed block may be a processed block which is specified by a merge index used to derive a motion vector for the current block.

In addition, for example, when the neighboring coding tree unit located above the current coding tree unit is the coding tree unit immediately precedes the current coding tree unit in processing order, circuitry 260 does not need to correct a prediction image for the current block. In other words, in this case, circuitry 260 may decode the current block without correcting the prediction image for the current block.

In addition, for example, circuitry 260 may store, in memory 262, the luminance correction parameter derived for the current block.

In addition, for example, circuitry 260 may decode an image by a pipeline structure including mutually different two stages which are a correction stage in which a prediction image is corrected using a luminance correction parameter and a reconstruction stage in which a reconstructed image is generated.

Circuitry 260 may delay input of a reconstructed image of a current block to the correction stage for another block by a period of time from the end of the process in the correction stage for the current block to the end of the processes in M stages for the current block. Here, M is a natural number. The other block is a block which succeeds the current block. In processing order.

In addition, for example, M may be a number obtainable by subtracting 1 from the number of a plurality of stages from the correction stage to the reconstruction stage including the correction stage and the reconstruction stage.

[Supplement]

Encoder 100 and decoder 200 according to the embodiments can be used as an image encoder and an image decoder, respectively. Alternatively, each of encoder 100 and decoder 200 can be used as an inter predictor. In other words, encoder 100 and decoder 200 may correspond only to inter predictor 126 and inter predictor 218, respectively.

In addition, in the above descriptions, the process corresponding to a current block to be processed, a processed block, a processed surrounding block, etc. may be, for example, a LIC process which is specifically a process for correcting a prediction image using a luminance correction parameter. In addition, this process may be a process in a stage including a process for correcting a prediction image using a luminance correction parameter. In addition, the processed block and the processed surrounding block may be blocks which have been processed by skipping a process.

In addition, a range corresponding to a surrounding region of a block may be a range corresponding to a predetermined number of pixels from the block.

In addition, in each of the embodiments, each of the constituent elements may be configured with exclusive hardware, or may be implemented by executing a software program suitable for each constituent element. Each constituent element may be implemented by means of a program executor that is a CPU, a processor, or the like reading and executing a software program stored in a recording medium that is a hard disc, a semiconductor memory, or the like.

Specifically, each of encoder 100 and decoder 200 may include processing circuitry and storage electrically connected to the processing circuitry and accessible from the circuitry. For example, the processing circuitry corresponds to circuitry 160 or 260, and the storage corresponds to memory 162 or 262.

The processing circuitry includes at least one of the exclusive hardware and the program executor, and executes the process using the storage. In addition, when the processing circuitry includes the program executor, the storage stores a software program that is executed by the program executor.

Here, the software which implements encoder 100, decoder 200, etc., according to the embodiments is a program as indicated below.

For example, the program may cause a computer to execute an encoding method including: generating a prediction image to be used to encode a current block to be processed; deriving a luminance correction parameter by referring to an image region which is included in an image including the current block and is outside the current block; and correcting the prediction image to be used to encode the current block, using the luminance correction parameter, herein the luminance correction parameter is used in common between a plurality of blocks included in the image.

For example, the program may cause a computer to execute a decoding method, including: generating a prediction image to be used to decode a current block to be processed; deriving a luminance correction parameter by referring to an image region which is included in an image including the current block and is outside the current block; and correcting the prediction image to be used to decode the current block, using the luminance correction parameter, wherein the luminance correction parameter is used in common between a plurality of blocks included in the image.

In addition, for example, the program may cause a computer to execute an encoding method for: processing, in processing order, a plurality of blocks in an image according to, for at least one of the plurality of blocks, a method for correcting a prediction image for a current block to be processed, using a luminance correction parameter which is derived by referring to an image region around the current block among the plurality of blocks; and encoding the image. The encoding method includes: determining, based on the processing order, reference availability of each of at least one processed surrounding block which is the at least one block processed among the plurality of blocks and is located around the current block; and deriving the luminance correction parameter by referring to the image region included in the at least one reference block determined to be available among the at least one processed surrounding block.

In addition, for example, the program may cause a computer to execute an encoding method for deriving a common luminance correction parameter for a plurality of blocks by referring to an image region around a current coding tree unit including the plurality of blocks, and correcting a prediction image to be used to encode the block using the common luminance correction parameter.

In addition, for example, the program may cause a computer to execute an encoding method for: correcting a prediction image to be used to encode a current block to be processed, using a luminance correction parameter which is derived for the current block. The encoding method includes: deriving the luminance correction parameter for the current block by referring to an image region in a coding tree unit located above the current coding tree unit when the current block is located at the upper end of the coding tree unit including the current coding unit; and derives, as the luminance correction parameter for the current block, a luminance correction parameter derived for a processed block around the current block when the current block is not located at the upper end of the coding tree unit including the current coding unit, and correcting the prediction image to be used to encode the current block, using the luminance correction parameter for the current block.

In addition, for example, the program causes a computer to execute a decoding method for: processing, in processing order, a plurality of blocks in an image according to, for at least one of the plurality of blocks, a method for correcting a prediction image for a current block to be processed, using a luminance correction parameter which is derived by referring to an image region around the current block among the plurality of blocks; and decoding the image. The decoding method includes: determining, based on the processing order, reference availability of each of at least one processed surrounding block which is the at least one block processed among the plurality of blocks and is located around the current block; and deriving the luminance correction parameter by referring to the image region included in the at least one reference block determined to be available among the at least one processed surrounding block.

In addition, for example, the program may cause a computer to execute a decoding method for deriving a common luminance correction parameter for a plurality of blocks by referring to an image region around a current coding tree unit including the plurality of blocks, and correcting a prediction image to be used to decode the block using the common luminance correction parameter.

In addition, for example, the program may cause a computer to execute a decoding method for correcting a prediction image for a current block to be processed, using a luminance correction parameter which is derived for the current block. The decoding method includes: deriving the luminance correction parameter for the current block by referring to an image region in a coding tree unit located above the current coding tree unit when the current block is located at the upper end of the current coding tree unit including the current block; and deriving the luminance correction parameter derived for the current block around the current block as the luminance correction parameter for the current block when the current block is not located at the upper end of the current coding tree unit including the current block, and correcting the prediction image to be used to decode the current block using the luminance correction parameter for the current block.

In addition, each constituent element may be circuitry as described above. Circuits may compose circuitry as a whole, or may be separate circuits. Alternatively, each constituent element may be implemented as a general processor, or may be implemented as an exclusive processor.

In addition, the process that is executed by a particular constituent element may be executed by another constituent element. In addition, the processing execution order may be modified, or a plurality of processes may be executed in parallel. In addition, an encoder and decoder may include encoder 100 and decoder 200.

In addition, the ordinal numbers such as "first" and "second" used for explanation may be arbitrarily changed. A new ordinal number may be attached to a constituent element, or an ordinal number attached to a constituent element may be removed.

Although some aspects of encoder 100 and decoder 200 have been explained based on the above embodiments, aspects of encoder 100 and decoder 200 are not limited to these embodiments. The scope of the aspects of encoder 100 and decoder 200 may encompass embodiments obtainable by adding, to any of these embodiments, various kinds of modifications that a person skilled in the art would arrive at without deviating from the scope of the present disclosure and embodiments configurable by arbitrarily combining constituent elements in different embodiments.

One of the aspects may be performed by combining at least part of the other aspects in the present disclosure. In addition, one of the aspects may be performed by combining part of the processing indicated in any of the flowcharts according to one of the aspects, part of the configuration of any of the devices, part of syntaxes, etc.

One of the aspects may be performed by combining at least part of the other aspects in the present disclosure. In addition, one of the aspects may be performed by combining part of the processing indicated in any of the flowcharts according to one of the aspects, part of the configuration of any of the devices, part of syntaxes, etc.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

[Usage Examples]

Figure 34:
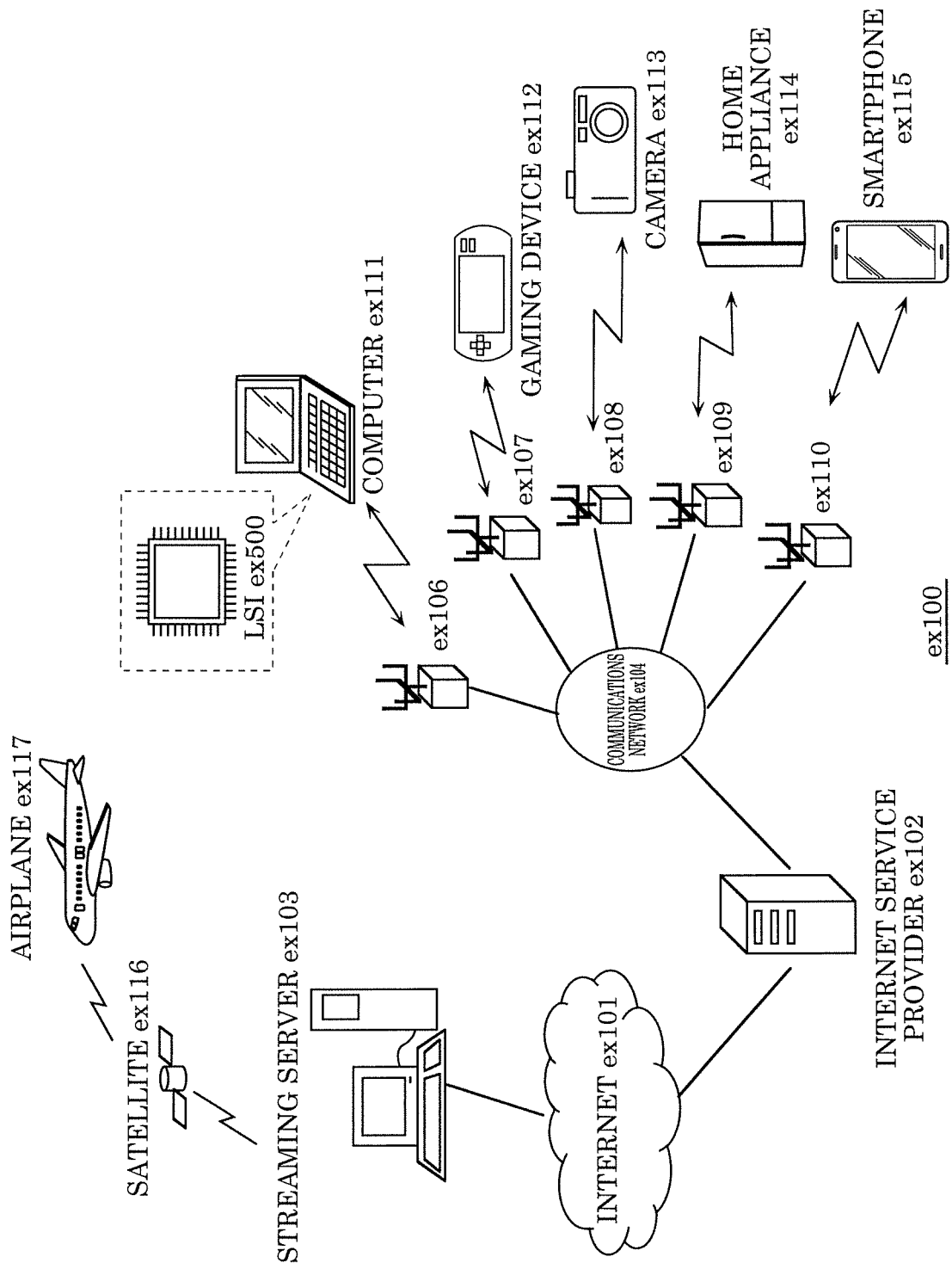
FIG. 34 illustrates an overall configuration of a content providing system for implementing a content distribution service.

FIG. 34 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaining device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114 and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an α value indicating transparency, and the server sets the α value for sections other than the object generated from three-dimensional data to, for example, 0, and may perform the encoding while those sections are transparent. Alternatively, the server may set the background to a predetermined RGB value such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 35:
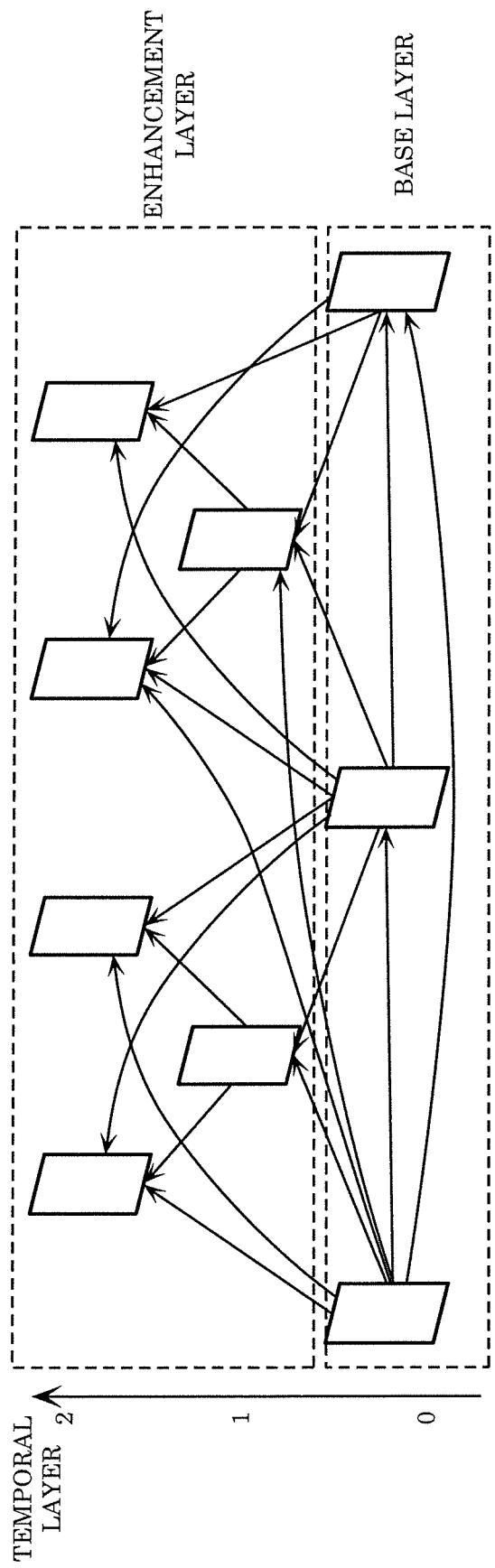
FIG. 35 illustrates one example of an encoding structure in scalable encoding.

The switching of content will be described with reference to a scalable stream, illustrated in FIG. 35, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 35. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 36:
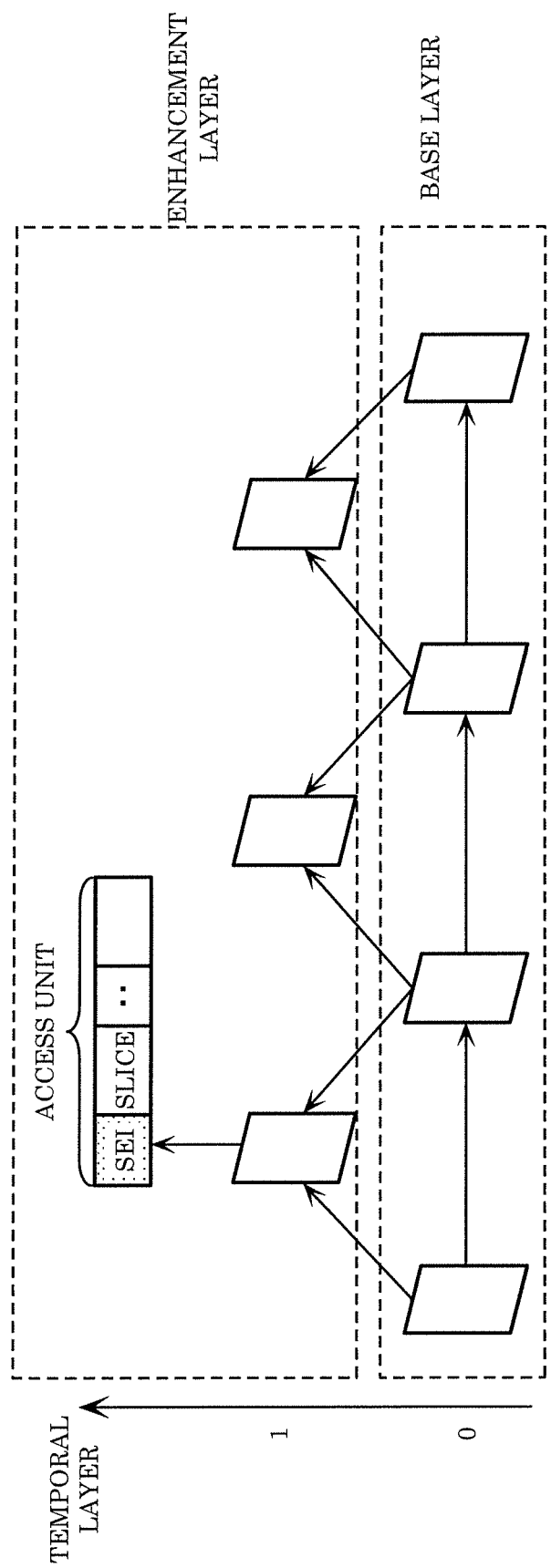
FIG. 36 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 36, metadata is stored using a data storage structure different from pixel data such as an SEI message HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture

[Web Page Optimization]

Figure 37:
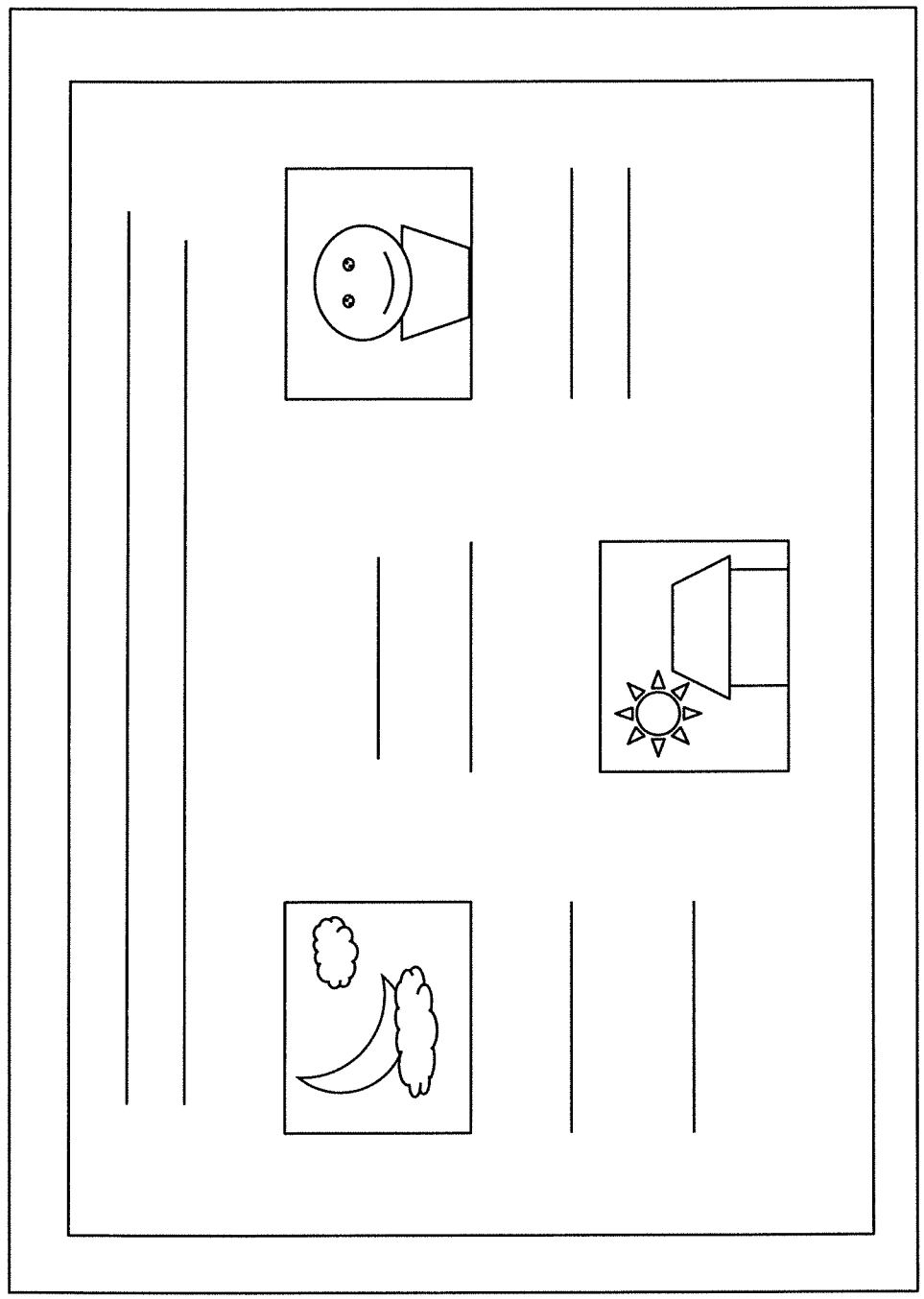
FIG. 37 illustrates an example of a display screen of a web page.
Figure 38:
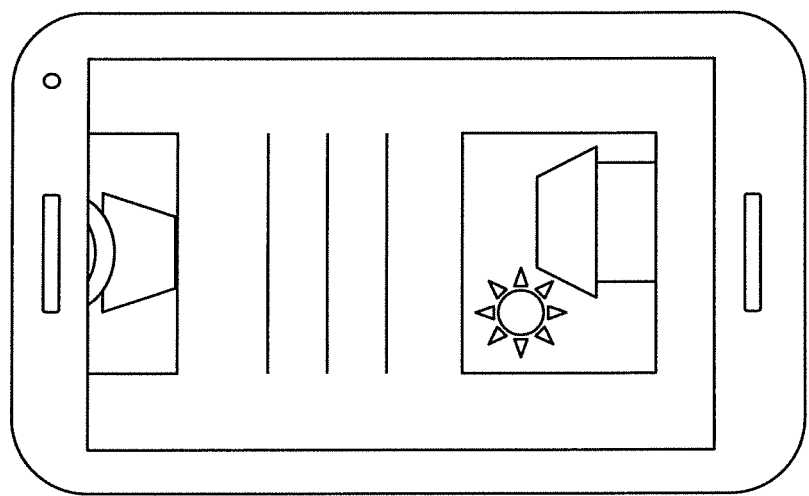
FIG. 38 illustrates an example of a display screen of a web page.

FIG. 37 illustrates an example of a display screen of a web page on, for example, computer ex111. FIG. 38 illustrates an example of a display screen of a web page on, for example, smartphone ex115. As illustrated in FIG. 37 and FIG. 38, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select, to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person.

Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio leaves superimposed with multiplexed audio and video data using, for example, a satellite, even though this is geared toward multicast whereas unicast is easier with content providing system ex100.

[Hardware Configuration]

Figure 39:
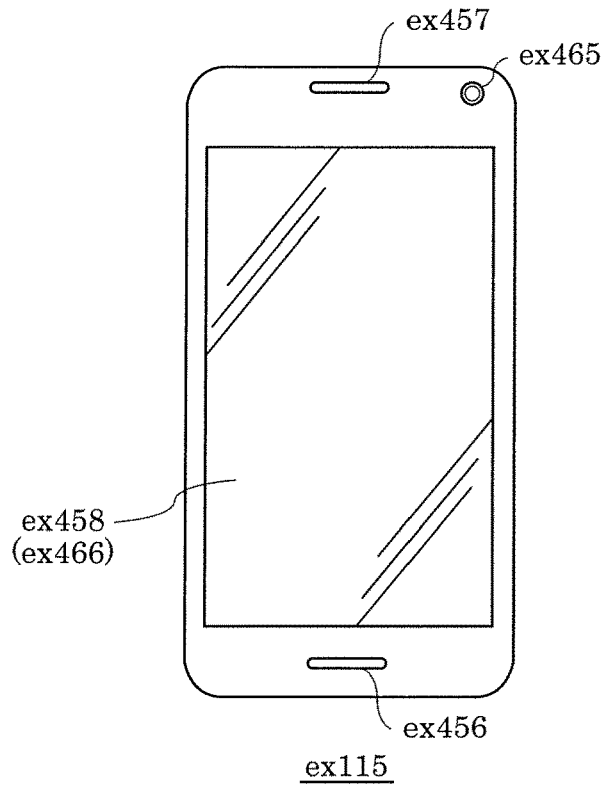
FIG. 39 illustrates one example of a smartphone.
Figure 40:
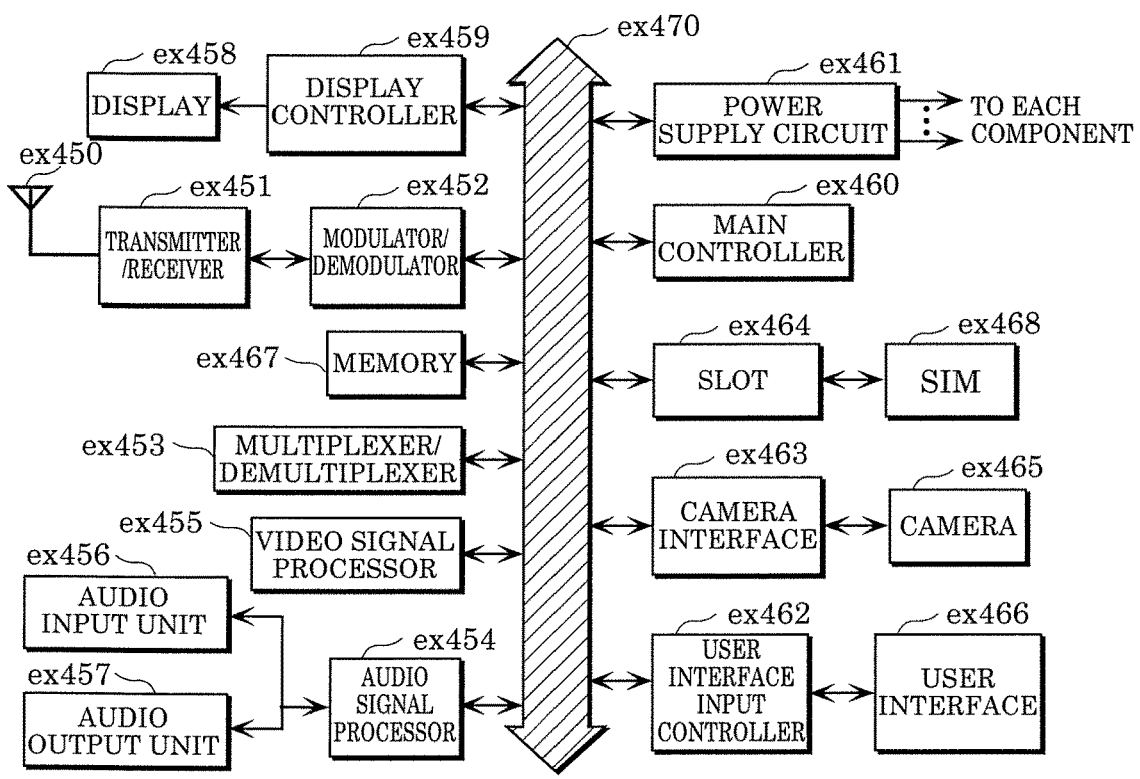
FIG. 40 is a block diagram illustrating a configuration example of a smartphone.

FIG. 39 illustrates smartphone ex115. FIG. 40 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack. Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex457 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include CPUs. Accordingly, a configuration is acceptable in which a large area is processed at once by making use of the performance ability of the GPU via memory shared by the CPU and GPU sir memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

INDUSTRIAL APPLICABILITY

The present disclosure is applicable to, for example, television receivers, digital video recorders, car navigation systems, mobile phones, digital cameras, digital video cameras, teleconferencing systems, electronic mirrors, etc.

The invention claimed is:

1. An encoder, comprising:
   circuitry; and
   memory,
   wherein, using the memory, the circuitry:
      generates a prediction image to encode a current block;
      derives a luminance correction parameter by referring to an image region which is located around a current coding tree unit including the plurality of coding units, one of the plurality of coding units being the current block; and
      corrects the prediction image using the luminance correction parameter, and
   the luminance correction parameter is used in common between the plurality of coding units.

2. The encoder according to claim 1,
   wherein the image region is a region in a neighboring coding tree unit located above the current coding tree unit.

3. The encoder according to claim 2,
   wherein, when the neighboring coding tree unit located above the current coding tree unit is a coding tree unit which immediately precedes the current coding tree unit in processing order, the circuitry encodes each of the plurality of blocks without correcting the prediction image.

4. The encoder according to claim 1,
   wherein the circuitry stores, in the memory, the luminance correction parameter derived for the current block.

5. The encoder according to claim 1,
   wherein the circuitry:
      encodes the image by a pipeline structure including, as two different stages, a correction stage in which the prediction image is corrected using the luminance correction parameter and a reconstruction stage in which a reconstructed image is generated; and
      delays input of a reconstructed image of the current block into the correction stage for another block located after the current block in processing order by a period of time from an end of a process in the correction stage for the current block to an end of all processes in M stages for the current block, M being a natural number.

6. The encoder according to claim 5,
   wherein M is a number obtainable by subtracting 1 from the number of stages from the correction stage to the reconstruction stage including the correction stage and the reconstruction stage.

7. A decoder, comprising:
   circuitry; and
   memory,
   wherein, using the memory, the circuitry:
      generates a prediction image to decode a current block;
      derives a luminance correction parameter by referring to an image region which is located around a current coding tree unit including the plurality of coding units, one of the plurality of coding units being the current block; and
      corrects the prediction image using the luminance correction parameter, and
   the luminance correction parameter is used in common between the plurality of coding units.

8. The decoder according to claim 7,
   wherein the image region is a region in a neighboring coding tree unit located above the current coding tree unit.

9. The decoder according to claim 8,
   wherein, when the neighboring coding tree unit located above the current coding tree unit is a coding tree unit which immediately precedes the current coding tree unit in processing order, the circuitry decodes each of the plurality of blocks without correcting the prediction image.

10. The decoder according to claim 7,
    wherein the circuitry stores, in the memory, the luminance correction parameter derived for the current block.

11. The decoder according to claim 7,
    wherein the circuitry:
       decodes the image by a pipeline structure including, as two different stages, a correction stage in which the prediction image is corrected using the luminance correction parameter and a reconstruction stage in which a reconstructed image is generated; and
       delays input of a reconstructed image of the current block into the correction stage for another block located after the current block in processing order by a period of time from an end of a process in the correction stage for the current block to an end of all processes in M stages for the current block, M being a natural number.

12. The decoder according to claim 11, wherein M is a number obtainable by subtracting 1 from the number of stages from the correction stage to the reconstruction stage including the correction stage and the reconstruction stage.

13. An encoding method, comprising:
generating a prediction image to encode a current block;
deriving a luminance correction parameter by referring to an image region which is located around a current coding tree unit including the plurality of coding units, one of the plurality of coding units being the current block; and
correcting the prediction image using the luminance correction parameter,
wherein the luminance correction parameter is used in common between the plurality of coding units.

14. The encoding method according to claim 13, comprising:
when the current block is located at an upper end of a current coding tree unit including the current block, deriving the luminance correction parameter for the current block by referring to the image region which is in a neighboring current coding tree unit located above the current coding tree unit;
when the current block is not located at the upper end of the current coding tree unit, deriving a luminance correction parameter derived for a processed block located around the current block in the image as the luminance correction parameter for the current block; and
correcting the prediction image using the luminance correction parameter for the current block.

15. A decoding method, comprising:
generating a prediction image to decode a current block;
deriving a luminance correction parameter by referring to an image region which is located around a current coding tree unit including the plurality of coding units, one of the plurality of coding units being the current block; and
correcting the prediction image using the luminance correction parameter,
wherein the luminance correction parameter is used in common between the plurality of coding units.

16. The decoding method according to claim 15, comprising:
when the current block is located at an upper end of a current coding tree unit including the current block, deriving the luminance correction parameter for the current block by referring to the image region which is in a neighboring current coding tree unit located above the current coding tree unit;
when the current block is not located at the upper end of the current coding tree unit, deriving a luminance correction parameter derived for a processed block located around the current block in the image as the luminance correction parameter for the current block; and
correcting the prediction image using the luminance correction parameter for the current block.

* * * * *